United States Patent
Gilg et al.

(10) Patent No.: US 12,321,532 B2
(45) Date of Patent: *Jun. 3, 2025

(54) SYSTEM AND METHOD FOR AN END-DEVICE MODULATION BASED ON A HYBRID TRIGGER

(71) Applicant: Whirlwind VR, Inc, Burlingame, CA (US)

(72) Inventors: Matthew Ryan Gilg, Billings, MT (US); Timothy Chia-Chieh Sun, Atherton, CA (US)

(*) Notice: Subject to any disclaimer, the term of this patent is extended or adjusted under 35 U.S.C. 154(b) by 66 days.

This patent is subject to a terminal disclaimer.

(21) Appl. No.: 16/953,069

(22) Filed: Nov. 19, 2020

(65) Prior Publication Data

US 2021/0096656 A1    Apr. 1, 2021

Related U.S. Application Data

(63) Continuation-in-part of application No. 16/705,846, filed on Dec. 6, 2019, now Pat. No. 11,452,187, which is a continuation-in-part of application No. 16/522,245, filed on Jul. 25, 2019, now Pat. No. 11,294,468, which is a continuation-in-part of application No. 16/387,236, filed on Apr. 17, 2019, now Pat. No. 11,023,048, which is a (Continued)

(51) Int. Cl.
| | |
|---|---|
| G06F 3/02 | (2006.01) |
| A63F 13/285 | (2014.01) |
| G06F 3/01 | (2006.01) |
| G06F 13/10 | (2006.01) |
| G08B 7/06 | (2006.01) |
| A63F 13/98 | (2014.01) |

(52) U.S. Cl.
CPC .......... *G06F 3/0219* (2013.01); *A63F 13/285* (2014.09); *G06F 3/016* (2013.01); *G06F 13/102* (2013.01); *G08B 7/06* (2013.01); *A63F 13/98* (2014.09)

(58) Field of Classification Search
CPC ...... G06F 3/0219; G06F 3/016; G06F 13/102; A63F 13/285; A63F 13/98; G08B 7/06
See application file for complete search history.

(56) References Cited

U.S. PATENT DOCUMENTS

2017/0061696 A1*  3/2017  Li .................. G02B 27/017
2017/0206054 A1*  7/2017  Wiggemans ........... A63F 13/22

OTHER PUBLICATIONS

CalcProgrammer1. "RGB Keyboard Music Visualizer—New and Improved Version!" Sep. 23, 2015. https://www.youtube.com/watch?v=OsxzAOYoaAY (Year: 2015).*

* cited by examiner

*Primary Examiner* — Benjamin C Lee
*Assistant Examiner* — Nathan P Brittingham
(74) *Attorney, Agent, or Firm* — Mohamed C. Azeez

(57) ABSTRACT

A system for end-device modulation by a hybrid trigger comprising at least one end-device (E-D) in communication with at least a first device (D1) outputting audio/video (a/v) programming; a processor; a memory element coupled to the processor; a program executable by the processor to: position a virtual representation of the E-D on a digital canvas displayed on a D1-coupled display representing a user's physical and virtual space; and capture from a corresponding region of the virtual space for modulating an effect on a corresponding portion of the canvas-positioned E-D based on a combination of at least two different triggers recognizing at least one of an a/v element or a/v event from the a/v program.

25 Claims, 31 Drawing Sheets

Related U.S. Application Data continuation-in-part of application No. 16/196,254, filed on Nov. 20, 2018, now Pat. No. 10,768,704.

SYSTEM AND METHOD FOR AN END-DEVICE MODULATION BASED ON A HYBRID TRIGGER

BACKGROUND

Field

The field of the invention relates to sensory delivery systems, and more particularly, relates to a precise automated haptic system with programmable logic for the latent-free and target specific delivery of variable air flow and temperature to mimic a realistic somatosensory experience in an immersive entertainment environment. More specifically, the invention relates to actuating any number of peripheral devices based on an unscripted feed using computer vision logic. Even more specifically, the invention relates to delivering a customizable immersive experience from peripheral devices based on end-user scripted (EUS) effects on a rendered web-browser page.

Related Art

Virtual Reality (VR) aims to simulate a user's physical presence in a virtual environment. Over the past decade, with the rapid development of computer-generated graphics, graphics hardware, and modularization of processing elements and system components, VR has been ushered into the next revolution—Immersive Multimedia. Small-form factor devices, such as data gloves, haptic wearables, and head-mounted gear, have all enhanced the immersive experience in the virtual reality environment. Now, with the advent of sophisticated tracking technology, this immersive experience has even extended to the cinema experience; viewers will be able to change their perspective on a scene based on the position tracking of their eye, head, or body. This immersive and active viewing experience is poised to alter the way in which we will consume content in the future.

Along with a number of immersive developments in the virtual reality industry, there have been a number of developments in enhancing the sensory experience for a user. For example, force feedback in medical, gaming, and military technology is very well known in the art. 4-D movie theaters, replete with motion rocking, have long been providing viewers with a life-like experience. Developers have increased the sensory definition by stimulating a plurality of senses with an exceptionally high degree of realism.

Scientists from York and Warwick in England have developed a virtual reality cage called a Virtual Cocoon, in which a user is enveloped by a planetarium-style screen, not only surrounded by a stereoscopic visual and sound, but also by a sense of smell, touch, and even taste. This fully immersive, perceptual experience blurs the line between what is real and what is not. Holovis manufactures full motion domes—immersive and interactive platforms designed primarily for gaming, but can be scaled up for group interactive experiences. Stereoscopic projectors are edge blended and synchronized with ride motion technology, along with delivering a range of other sensory stimulants, such as smell and heat.

Likewise, there are a number of patent references providing for VR systems that deliver haptics. However, much like the Cocoon and Holovis, the background patent references provide a plurality of sensory mechanisms integrated with a user-surrounding platform or rig. The use of VR or entertainment platforms featuring a plurality of sensory mechanisms is well established in the background art, but not as individualized devices with home-use and universal integration capabilities. Moreover, there are no claims or disclosure in the prior art addressing individualized units coupled to a code instructing variable air intensity and temperature, stimulating a wide range of variable haptic situations in a virtual reality environment.

What's more, none of the extant systems teach a system or method for processing the audio/video input for generating a real-time haptic command output, wherein the said output drives a variety of haptic effects from the modular haptic tower: wind effects, velocity, sudden impact, blast, water misting, and, or strike impact or pressure. As the foregoing illustrates, there is currently a gaping void for a home-use, stand—alone device, that may integrate into a variety of experience systems, and deliver target specific haptics with next generation realism and with virtually zero latency. Users no longer will have to rely on attending a VR convention or gaming room in order to experience this heightened immersion and sensory experience. No longer will they have to commit to large and cumbersome installations and platforms. Finally, with targeted haptics delivery, the sense of realism and immersion will be taken to the next level—all from the convenience of one's own home, and most importantly, free from content support hurdles trapping content within provider and developer silos.

Extant systems do not employ learning based approaches to complement the user input or virtual environmental input in order to provide additional context for a haptic command. Extant systems do not continuously learn and update a deep neural network or discriminative library, which attempts to dynamically learn the haptic-commanding events in a user's surrounding, in order to create shortcuts in the input processing. Such shortcuts may cut down on latency between input and haptic output, providing for a substantially more real-time experience. Moreover, such shortcuts may reduce the load bearing of the system and increase overall compute efficiencies. Learning based approaches may additionally predict for location of an event at time interval t, and furthermore, predict a variety of coefficients based on a reference parameter, and command for a specific haptic output. However, extant solutions for reactively and predictively tracking events in a virtual environment are lacking, and therefore, there is a need for a computationally efficient solution for solving the problem of event tracking (reactively and predictively) in a virtual environment, and coupling to a haptic command/output with virtually no latency.

Nothing in the prior art teaches for directly integrating a peripheral device to audio or video signals from an original programming feed or a live feed to trigger or control at least one of actuation or haptic effect based on computer vision processing of said audio or video signals. In other words, the actuation or haptic effect is not triggered by embedding triggering cues via a developer kit or after-market coding (scripted programming feed), but rather, directly integrative to the original programming feed or live feed in a plug-n-play fashion via computer vision processing (unscripted programming feed)—thereby obviating content hurdles and opening the full library of a/v based programming in communication with a peripheral device, whether it be a endoscope, security surveillance, television show, video clip, audio clip, social media integration, electronic communications featuring audio/video/emojis, movie, sporting event, gaming, virtual environment, augmented environment, real environment, etc. Examples of peripheral devices may be any device capable of an actuation or haptic effect and may be in contact with a user or free from a user, such as, watches, gloves, wrist bracelets, pants, shoes, socks, head gear, wearables, sleeves, vests, jackets, heat lamps, haptic towers, light fixtures, speakers, medical interventional tools, mobile phones, tablets, display screens, remote controllers, game controllers, 4-D movie theater seats, stadium seats, etc. Users may now finally be free from content support hurdles trapping content within provider and developer silos and unlock the fourth dimension of the immersive experience by simply plugging and playing.

Nothing in the prior art teaches for offering customizable effects from end-peripheral devices beyond standard user-interface controls for delivering a more customized and immersive viewing or interactive experience. Moreover, the prior art does not teach for a basic, low-level script input by an end-user for customizing effects controls based on a user preference concomitantly with the viewing or interactive experience. Currently, effects driven on end peripherals require sophisticated front-end programming (C+/C++) to code for mapping the effects on end-peripherals; not providing a low-coding barrier option for end-users to script customized immersive effects and render the scripted webpage to effect-ripple the end-peripheral accordingly.

Finally, the prior art is silent on solutions for eliminating false positives and/or latency in the delivery of end-device modulation (inter alia, lighting effects) during a gaming/viewing experience. Furthermore, the prior art is silent on providing solutions for combinatorial/layered effects as a result of a combination of scripted/unscripted triggers from an audio/video output corresponding to the viewing/gaming experience. Eliminating false positives and latency, in addition to providing combinatorial end-device effects, is critical in the enhancement of an immersive experience for a viewer/gamer—as they forge deeper into the virtual realm in the wake of physical distancing measures due to COVID-19.

SUMMARY

These and other features and improvements of the present application will become apparent to one of ordinary skill in the art upon review of the following detailed description when taken in conjunction with the several drawings and the appended claims. This invention relates to the next generation of Immersion Multimedia, in which variable air flow and temperature haptics delivery is targeted to specific portions of the user corresponding to the user in the Virtual Space. Moreover, the apparatus, system, and method, do not rely on an installation or platform, but rather, is modularized for universalized integration. The present invention fills a void left behind by the currently existing Immersion Multimedia products and references. The present invention provides for an apparatus, system, and method for the precise haptic targeting of specific portions of a user—mimicking conditions of the Virtual Space—in a modularized, universally integratable form.

In one generalized aspect of the invention, the air haptic device simulates variably intense wind, heating and cooling from the virtual space to enhance the user's sense of immersion. The hardware will include hot, cold and ambient settings with variable intensities for hot and cold based on power input and desired output temperature.

The apparatus may comprise a housing; at least one fan assembly; at least one duct; at least one temperature element; a processor; a memory element coupled to the processor; encoded instructions; wherein the apparatus is further configured to: receive data input from a user; receive data input from a program coupled to an experience; based on the received input data, control an air flow intensity; based on the received input data, direct air flow through at least one duct; based on the received input data, control a temperature element for heating or cooling the said air flow; and deliver a haptic output to a user.

In one preferred embodiment, the apparatus may be in the form of a haptic tower that individually has the capability to blow air at hot and cool temperatures with variable intensity. The fan assembly will have the capability to create a smooth, uniform flow of air, as opposed to an axial-style fan, which "chops" the air, resulting in a non-uniform flow of air. In one preferred embodiment, a variable control of air flow may be created by a variable controlled speed output from a motor actuated from a series of sensor-captured and code-instructed data inputs. In another embodiment, a variable controlled electro mechanical valve can vary intensity of air flow and pressure. Some embodiments may include the motor output to be coupled to a brake for tight control of the haptic air flow.

In one aspect of the invention, air temperature may be created by controlling the redirected air flow through heat sinks of hot and cool temperatures. Servo motors control dampers, flat plastic shutters, and these shutters will open and close controlling the air flow through different temperature ducts. After redirecting the air into one of the three separate ducts, each duct has either cold, hot or no temperature treatment to the out-flow of air. In this particular embodiment, the air flows through the "hot" duct with an exposed heating element. In some embodiments, for the hot duct, the air may flow through an exposed Positive Temperature Coefficient (PTC) ceramic heater element. In other embodiments, the heating element may be a condenser heat sink in a vapor-compression cycle, thermoelectric heating using Peltier plates, Ranque-Hilsch vortex tube, gas-fire burner, quartz heat lamps, or quartz tungsten heating, without departing from the scope of the invention. For the "cold" duct, the air flows through a cooling element. In some aspects of the invention, for the cold duct, the air may flow through a traditional finned air conditioning evaporator in a vapor-compression cycle. Alternate embodiments of the cooling element may include thermoelectric cooling using the Peltier effect, chilled water cooler, Ranque-Hilsch vortex tube, evaporative cooling, magnetic refrigeration, without departing from the scope of the invention. The last duct has ambient air bypassing both the heating and cooling elements. In another aspect of the invention, heating and cooling elements are integrated into a single duct providing for heated air, cooled air, and ambient air. In yet another aspect of the invention, more than three ducts may be provided in order to create heated air, cooled air, and ambient air.

It is a further object of the invention to provide an apparatus that may have an integrated air bursting element, delivering high velocity air flow directed at the user. In one embodiment, an array of miniature speakers may be used to create a large enough volume of air displacement within a chamber to generate a miniature air vortex. Another embodiment for the air bursting effect may entail air displacement with the use of a larger speaker or a sub-woofer. These are able to displace more air in an electromechanical fashion. Other embodiments may include air vortices to create air bursting effects by attaching a rod supported by a rail system powered by a motor assembly. In yet another embodiment, an air compressor coupled to an electromechanical valve may be used to create the air bursting effect.

In a preferred embodiment, target specificity for haptic delivery may be achieved using servo motors to pivot in place. In other embodiments, target specificity may be enhanced by using head tracking or full body tracking sensors. In yet another embodiment, this body tracking can also be used for the control and aiming of the dispensing nozzle at particular tracked body locations. An alternate embodiment may include nozzles that may shift the diameter of an outlet in order to alter the air flow pressure and haptic effect. The system may comprise a processor; a memory element coupled to the processor; encoded instructions; at least one sensing means configured for detecting data related to a user's orientation and position, environmental conditions in user's real environment, and user's input signal; wherein the computer system is further configured to: receive data input from a user; receive data input from a program coupled to an experience; based on the received input data, control an air flow intensity; based on the received input data, direct the air flow through at least one duct; based on the received input data, control a temperature element for heating or cooling the air flow; and deliver a haptic output to a user.

In a preferred embodiment, a system configuration may comprise a modular surround haptic system with multiple towers. The multiple tower configuration may have a micro controller controlling all of the towers. In some embodiments, communication between the micro controller and the CPU will be USB. Other embodiments may allow communication between the micro controller and CPU by other known methods in the art. In some embodiments, the towers will be in direct communication with the CPU via any known communication protocol.

In one aspect of the invention, a system configuration may comprise a sensor to detect data related to a user's orientation and position, environmental conditions in user's real environment, and users input signal. In another aspect of the invention, a user may be surrounded by a plurality of sensors to detect data related to a user's orientation and position, environmental conditions in user's real environment, and users input signal. In other embodiments, the sensors may also include body-tracking, hand-tracking, head-tracking, or eye-tracking technology to be used for the control and aiming of the tower and nozzle at particular track body locations in order to achieve high resolution target specificity for haptic delivery. In further embodiments, sensor-captured data may communicate directly with the micro controller. In yet further embodiments, sensor-captured data may communicate directly with the towers, bypassing the micro controller.

It is yet a further object of the invention to provide a system and method that may comprise receiving data input from a user; receiving data input from a virtual environment comprising the user; and said data processed and converted for commanding control of any one of, or combination of, an air flow intensity from a fan assembly and, or air displacement chamber; directing the air flow through at least one duct; controlling a temperature element for heating or cooling the air flow; controlling a water mist unit for wet effects; and, or controlling a tactile member for delivering a strike or pressure impact to the user.

In yet another object of the invention, the system may be coupled to a neural network or machine learning approach, whereby the system continuously learns and updates a deep neural network or discriminative library. By doing so, the system may dynamically learn the haptic-commanding events in a user's surrounding and create reference parameters in order to create shortcuts in the input processing. Such shortcuts may cut down on latency between input and haptic output, providing for a substantially more real-time experience. Moreover, such shortcuts may reduce the load bearing of the system and increase overall compute efficiencies. Learning based approaches may additionally predict for location of an event at time interval t, and furthermore, predict a variety of coefficients based on a reference parameter, and command for a specific haptic output. Therefore, there is a need for a computationally efficient solution for solving the problem of event tracking (reactively and predictively) in a virtual environment, and coupling the tracked event to a haptic command/output. Aspects and advantages of this invention may be realized in other applications, aside from the intended application of gaming/interactive story telling/cinema/passive story telling. Other pertinent applications that may exploit the aspects and advantages of this invention are: tourism—simulation of the environment that is being digitally visited. For example, simulating the hot sun of the Gobi Desert or the warm sea breeze of Hawaii's beaches. Dating—simulating a method of signaling a potential dating match, such as by simulating a blown kiss. Architecture, design and real estate—the ability to simulate the use of an object that requires air flow to enhance the simulation. For example, designing or test driving a new motor cycle design and creating the unique experience of driving the motorcycle. Education—the haptic tower system will help reinforce learning of various subjects, making learning a visceral experience, as opposed to relying on the traditional methods of rote memorization. E-commerce—the ability to experience how a piece of clothing looks and feels in a certain temperature or air flow environment. For example, a specific piece of clothing that looks particularly good with a light breeze or movement by the user can be experienced in the particular setting. This would allow the user to experience the item in the particular setting without having to purchase the item and physically wear or use it in the setting.

It is another object of the invention to provide for a system and method that triggers or controls at least one of a modulation (actuation or haptic effect, for instance) for a peripheral device based on computer vision processing of audio or video signals from an unscripted programming feed. As a result, obviating content hurdles and opening the full library of a/v based programming in communication with a peripheral device. In one aspect, the system may process at least one of an audio or video input for direct integration actuation or haptic effect from a peripheral device. The peripheral device may be in physical contact with a user or free from the user and in direct integration with an original programming feed or live feed comprising native audio or video input. The system may further comprise a processor; a memory element coupled to the processor; a program executable by the processor to: recognize at least one of the native audio or video input from the original programming feed or live feed, and determine for at least one tagged event, at least one of a pixel color score, a pixel velocity score, an event proximity score or an audio score; and convert the at least one scored event into at least one of an actuation output command or a haptic output command and based on the output command, trigger or control at least one of a haptic effect or actuation for the peripheral device in physical contact or free from the user and in direct integration with the original programming feed or live feed comprising the native audio or video input, whereby the user is not limited to a library of content wherein each content is coded with distinct actuation or haptic triggers corresponding to the content and direct integration with any audio or video content for at least one of an actuation or haptic effect is enabled.

In one other aspect, a method is provided for processing at least one of an audio or video input for direct integration actuation or haptic effect from a peripheral device. The method may comprise the steps of: First, recognizing at least one of the native audio or video input from a feed, and determining for at least one tagged event, at least one of a pixel color score, a pixel velocity score, an event proximity score or an audio score and finally; converting the at least one scored event into at least one of an actuation output command or a haptic output command and based on the output command, triggering or controlling at least one of a haptic effect or actuation for the peripheral device in direct integration with the feed comprising the native audio or video input. Content no longer needs to be limited to within provider and developer silos in order to be coupled to a fully immersive experience.

Another aspect of the invention is a method for controlling a light effect based on a rendering of a web-page providing a script layer configured for scripting more customized effects from end peripheral devices, enabling a more personalized and immersive experience. Generally, the method entails the steps of: Providing a web-browser page interface configured for script input for adjusting any one of an aspect of the immersive light effect from the at least one LEPD; rendering the script-inputted web-browser page to an off-screen buffer visualized as at least a two-dimensional effects plane; applying a geo-positional transform and scaling of virtual LEPD's within the effects plane and capturing at least a region of the rendered webpage; and controlling a light effect emitted from the at least one LEPD corresponding to the effects plane transformed/scaled virtual LEPD and captured region of the rendered web-browser page.

In yet other aspects, the rendered web-browser page for applying the transform/scaling may be based on any of, or combination of, a customizable script layer, standard UI layer, static or dynamic content. A system for rendering/transforming/scaling in the delivery of the customizable/immersive effects experience may also be provided, wherein the system comprises a rendering module and a transform/scale module, and optionally, a peripheral device controller or control system. Collectively, the system or method provides for coordinated delivery of effects onto an end peripheral device based on a captured region and transformed/scaled application of a rendered web-browser page. The end peripheral device, or effects-emitting peripheral device (EEPD), may encompass the LEPD (light-diode strip, bulb), along with any one of a haptic device, such as a controlled air-dispensing device, haptic vest, etc. As a result, an end-user, with just minimal low-level coding, may script customized and complex effects that deliver an immersive physical experience mirroring a grabbed region of the rendered, transformed, and scaled web-page.

In one other aspect, a solution is provided for countering issues of false positives and latency of effects from an end-device during a viewing/gaming experience-both of which severely restrain a user from experiencing total immersion. To this end, the solution additionally offers options for delivery of complex combinatorial/layered effects that may be rippled from end-devices mirroring/corresponding to key elements/events from the engaged content. The solution comprises a system for end-device modulation by a hybrid trigger comprising: at least one end-device (E-D) in communication with at least a first device (D1) outputting audio/video programming; a processor; a memory element coupled to the processor; a program executable by the processor to: position a virtual representation of the E-D on a digital canvas displayed on a D1-coupled display representing a user's physical and virtual space; and capture from a corresponding region of the virtual space for modulating an effect on a corresponding portion of the E-D based on a combination of at least two different triggers recognizing the a/v element and/or a/v event.

In another aspect of the hybrid trigger approach for end-device modulation, a method is provided comprising the steps of: positioning a virtual representation of the E-D on a digital canvas displayed on a D1-coupled display representing a user's physical and virtual space; and capturing from a corresponding region of the virtual space for modulating an effect on a corresponding portion of the E-D based on at least one of a triggering a/v element or triggering a/v event trigger.

Other aspects and advantages of the invention will be apparent from the following description and the appended claims.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments.

However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

Figure 1:
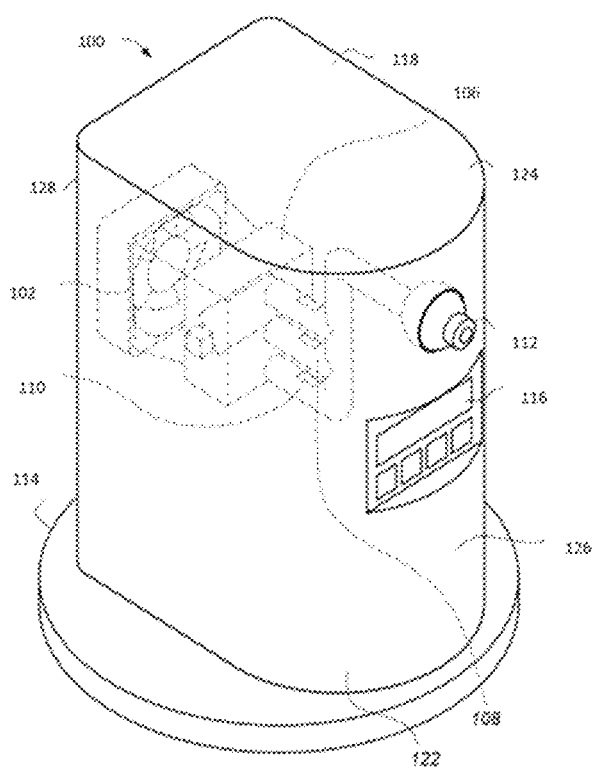
FIG. 1 is a front perspective view diagram of an apparatus in accordance with an aspect of the invention.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present embodiments disclose apparatus, systems and methods for allowing users to receive targeted delivery of haptic effects—air flow of variable intensity and temperature—from a single tower or surround tower configuration. Each tower housing may have an integrated fan assembly creating air flow of variable intensity, along with an integrated temperature element within a duct, which treats the air flow with variable temperature. The haptic tower may have an enclosed, modular assembly that manipulates air flow, fluid flow, scent, or any other haptic or sensation, for an immersed user. The fan assembly may be any device for producing a current of air by movement of a broad surface or a number of such surfaces. The duct may be any channel, tube, pipe or conduit, by which air, fluid, scented air, or any other substances may be conducted or conveyed—and may or may not house the temperature element. The temperature element may be a heat exchanger that changes the temperature of air, fluid, scented air, or any other substance. Moreover, the system has an application of sensor technology to capture data regarding a user's body positioning and orientation in the real environment. This data, along with the data from a program coupled to the system, is relayed to the micro controller with instructions coded thereon to instruct the relevant towers to direct air flow, variable intensity of air flow, variable temperature of air flow, and targeted dispensing of haptic effect. These features expand the sense of realism and immersion of a user in a virtual space. Various other back-end functionalities may be taken advantage of by a user through an interactive mobile app or from the high-resolution, easy-to-use user-interface display. Aside from the sophisticated components and electronics delivering precision haptics, the intelligent and contextually-aware system also easily integrates with any home automated system via Wi-Fi, ZigBee, or Bluetooth 4.0. The system also easily connects to a cloud-based server allowing it to interface with the mobile app, enabling the user to choose from a variety of informative dashboard alerts and features. Moreover, a peer-sharing tool allows for users to share aspects of their immersive experience.

With reference now to the drawings, and in particular to FIGS. 1 through 5 thereof, a haptic delivery apparatus, system, and method embodying the principles and concepts of the present invention and generally designated by the reference numeral 100 will be described.

FIG. 1 is a front perspective view diagram illustrating an apparatus for the automated dispensing of targeted and precise haptics, in accordance with one embodiment of the present invention. A housing unit 100 dispenses air of precise air flow and temperature to targeted portions of a user based on data from a user in the virtual and real space. In the present example, the housing unit 100 may be a haptic tower 408 resting on the floor or a countertop device, configured to house a fan assembly 102, but any number of fan assemblies 102 may be added, without departing from the scope of the invention. Likewise, while in the present example, the housing unit 100 may have a separate shutter 106, duct 108, and temperature element 110, depending on the desired temperature range, any number of shutters 106, ducts 108, and temperature elements 110 may be used, without departing from the scope of the invention. Other embodiments may be a stand-up haptic tower 408, although any size housing unit 100 is disclosed, including smaller, portable devices for on-the-go individual use, or larger units, with increased number of system components or more industrial strength components, appropriate for group applications.

The preferred embodiment of the housing unit 100 may have an integrated fan assembly 102, motor output 104, shutter 106, duct 108, temperature element 110, dispensing nozzle 112, rotatable base 114, and interface display 116. Housing unit 100 may encompass a housing top wall 118, bottom wall, and side walls 122, 124 that wrap around to meet the front wall 126 and back wall 128. Front wall 126 may have a dispensing nozzle 112 for targeted delivery of precise haptics onto a user. Front wall 126 may also have a user interface display 116 for mediating user interaction with dispensing device.

In other embodiments, though not shown in FIG. 1, the housing unit 100 may have flat side walls 122, 124 and flat front and back walls 126, 128. The front wall 126 may have a dispensing nozzle 112 hidden behind a flush wall with the means of opening and closing. The dispensing nozzle 112 may have separate outlets for air, fog, and mist. Additionally, the dispensing nozzle 112 may have the ability to rotate, or change the diameter of the inlet, in order to target the direction of the air flow, as well as alter the intensity of the air flow. Although not shown in FIG. 1, the housing unit 100 may have a front wall 126 void of dispensing nozzles, rather, the haptic delivery may be via a vent system, or any other outlet. The front wall 126 may be void of the user interface display 116, and rather, may be included in the mobile device application.

In further detail, still referring to FIG. 1, a housing unit 100 may have a rotatable base 114, which may pivot the housing unit 100 in at least one axis of motion. A rotating base 114 allows for the housing unit 100 to rotate on its base to allow for more targeted delivery of haptic effects. More particularly, a rotating base 114 may allow for the housing unit 100 to rotate on its base in at least one axis of motion to provide for a panning air flow effect. In other embodiments, the rotatable base 114 may allow for motion along multiple axis of rotation. In one embodiment, pivoting and targeted haptic delivery may be further enhanced by using head tracking or full body tracking system. Other embodiments may include a housing unit 100 with a dispensing nozzle 112, the pivoting and rotation of which may be also enhanced with the addition of head tracking or full body tracking systems.

With continuing reference to FIG. 1, a housing unit 100 may include a user interface display 116, wherein the user interface may be integrated as a built-in console display. While in the present example, a built-in console display is shown, any type of user interface display 116 may be disclosed, including a mobile device display, a wearable device display, monitors, or any type of access device, without departing from the scope of the invention. In a preferred embodiment, the user interface display 116 may include a display page for receiving a request for a haptic output selection. The request being from a menu, a haptic suggestion engine, or user-initiated. The display page may then prompt a user to confirm the request. Other embodiments may include a display page that does not require a user to confirm the request, and instead, signals confirmation of the request and initialization.

Alternate embodiments may involve a user interface display 116 authenticating a user by any form of short-range or long-range wireless protocol standards, without departing from the scope of the invention. In authenticating a user, an authentication module may be further caused to recognize the user device at a particular haptic tower housing a unique short-range communication tag. The module may identify and authenticate the particular tower and user device by recognizing the unique tag, and then, authenticate the user by identifying the user device located at the particular tower. The unique, short-range tag may be a NFC tag, RFID chip, Bluetooth, ZigBee, or any short-range or long-range communication protocol standard. Additional methods of authentication may be accomplished via user input.

In yet another embodiment, the user interface display 116 may include a voice—activated request option receiving a request voice command, whereby the request voice command may be in communication with a voice-activated module querying at least one pre-defined database based on the request voice command. The voice-activated module may be in communication with a natural language module, whereby the request voice command is sent from the voice-activated module to the natural language module. The natural language module may be configured to convert the request voice command into a haptic output instruction querying at least one pre-defined database based on the request voice command.

In yet another embodiment, the user interface display 116 may receive a request voice command for a haptic output selection and interact with a user via voice response by having a voice activated module in communication with the natural language module and the voice activated module in communication with a voice response module, whereby the voice response module alerts the user of the various stages of the haptic output selection via the voice-activated user interface using natural language to describe the various stages of processing, from an introduction and identification of a user; to a haptic output selection inquiry or request or suggestion; to confirmation of a haptic output selection; and finally, initialization.

Still referring to the user interface display 116, the user may calibrate the maximum and minimum temperatures based on the user's preference. For example, if the user is hot, the user may calibrate the system to emit only cool air and not activate the hot side at all, and vice versa, for a cold user. If the user does not want to have air haptic sensation as a part of the virtual experience, the user may override the software experience and use the system as a normal heating, cooling or fan system. A manual system override feature may be present on the interface display 116 for the haptic system control.

Although not shown in FIG. 1, some embodiments may include a housing unit 100 that includes an air bursting effect system. The air bursting effect system delivers high velocity air flow directed at the user. According to one embodiment, the air bursting effect is created by the use of air vortices. Rather than using a manually actuated bag attached to bungee cord, a handle may be attached to an actuating rod supported by a rail system powered by a motor assembly. The rail system may have a spur gear with only half the teeth around the perimeter so that when the rack on the slider is no longer in contact with the gear teeth, the slider is pulled forward by the spring.

In other embodiments, an array of miniature speakers to create a large enough volume of air displacement within a chamber to generate a miniature air vortex may be used. Another air bursting effect system may create air displacement via the use of a larger speaker or a sub-woofer. Some embodiments may include creating air bursting effects through the use of compressed air. Using an air compressor with an air tank, fitted with an electro mechanical valve, aimed at the user, a burst of compressed air can be used to enhance the users sense of presence. A variable controlled electro mechanical valve can vary intensity of air flow and pressure. While in the present examples, the air bursting effect system may be integrated within the housing unit 100, air bursting effect systems not integrated within the housing unit 100, but rather, as a separate unit is disclosed, without departing from the scope of the invention.

Although not shown in FIG. 1, in yet another aspect of the invention, a housing unit 100 may include a fog and mist dispensing system. In an exemplary embodiment, a sprinkler or misting system may be connected to a water pump attached to an electric controlled check valve to allow the precise release of water in a mist-like fashion. In another embodiment, the fog and dispensing system may include at least one fluid supply line in fluid communication with at least one fluid supply and with at least one outlet; condensing means for air and fluid from the fluid supply; and dispensing fog or mist via an outlet. In some embodiments, the outlet may be a dispensing nozzle 112 or vent. In some other aspects, the fluid supply line may be in direct communication with the dispensing nozzle 112 emitting air flow as well, or the fluid supply line may be in direct communication with a dispensing nozzle 112 exclusive to the fog or mist. In other embodiments, water misting device or water jet attachment subsystems can be attached to the haptic tower, much like the modularized air bursting effect systems attached to the haptic tower. Using misting systems connected to a water pump attached to an electric controlled check valve, the system may allow for the precise release of water in a mist like fashion. Likewise, in some embodiments, a scent system including a scented-air supply connected to a pump, attached to an electric controlled check valve, may allow for the precise delivery of scented-air.

Figure 2:
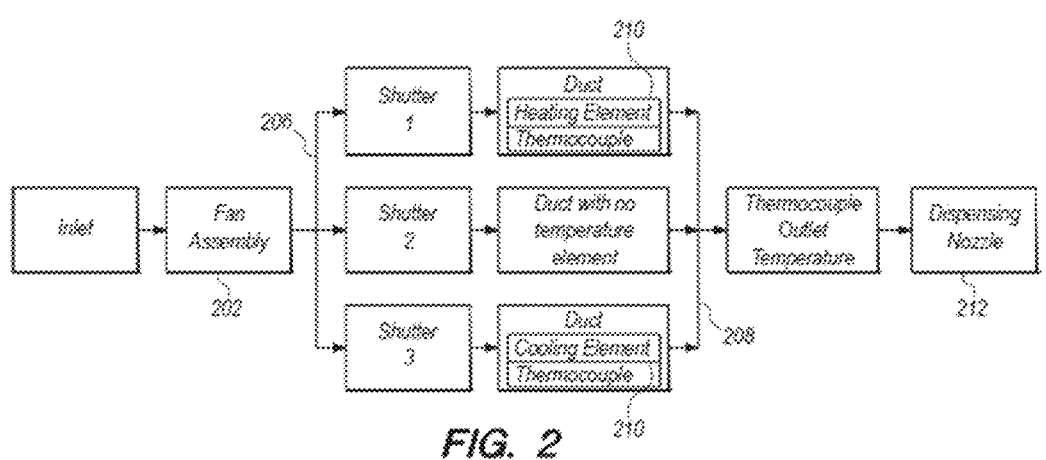
FIG. 2 is a block diagram of the air flow configuration in accordance with an aspect of the invention.

FIG. 2 shows a block diagram of the air flow configuration in accordance with one embodiment of the invention. The fan assembly 202, controlled by a motor output 204, creates air flow of variable intensity, and the air flow is directed through either hot, cold, or ambient shutters 206, whereby the air is directed through a respective temperature duct 208. Air flow is treated with variable temperature by a temperature element 210. Air flow of variable intensity and temperature are then directed out of an outlet 212.

In one exemplary embodiment, the fan assembly 202 may be a blower fan (also known as a squirrel cage) to produce a smooth, uniform flow of air. Traditional axial desk fans "chop" the air up and produce a non-uniform flow of air, which is not ideal for this application. The motor output 204 powering the blower fan assembly 202 will have a variable controlled speed output. In other exemplary embodiments, the fan assembly 202 will be an impeller design, or any design that may create a smooth, uniform flow of air. Other embodiments may include a brake for tight control of the output air flow from the fan assembly 202. Airflow will have a range of approximately 0 to 200 CFM.

In yet another exemplary embodiment, the air flow is directed to specific shutters 206, whereby it is channeled into respective ducts 208, and appropriately treated with temperature by temperature element 210. Servo motors may control dampers or flat shutters 206, and these shutters 206 will open and close, controlling the air flow through different temperature ducts 208. After redirecting the air into one of the three separate ducts 208, each duct 208 has either a hot, cold or no temperature element 210. After redirecting the air into one of the three separate ducts 208, each duct 208 has either cold, hot or no temperature treatment to the out-flow of air. For heated air, the air flows through the "hot" duct 208 with an exposed heating element 210. In a preferred embodiment, the air may flow through an exposed Positive Temperature Coefficient (PTC) ceramic heater element, or any thermistor with a high non-linear thermal response, such as barium titanate or lead titanate composites. In other embodiments, the heating element 210 may be a condenser heat sink in a vapor-compression cycle, thermoelectric heating using Peltier plates, Ranque-Hilsch vortex tube, gas-fire burner, quartz heat lamps, or quartz tungsten heating, without departing from the scope of the invention. For the "cold" duct 208, the air flows through a cooling element 210. In a preferred embodiment, the air may flow through a traditional finned air conditioning evaporator in a vapor-compression cycle. Alternate embodiments of the cooling element 210 may include thermoelectric cooling using the Peltier effect, chilled water cooler, Ranque-Hilsch vortex tube, evaporative cooling, magnetic refrigeration, without departing from the scope of the invention. For the ambient duct 208, air bypasses both the heating and cooling temperature elements 210. In alternate embodiments, the air from the fan assembly 202 is directed into a single temperature duct 208, where the air is exposed to both heating and cooling temperature elements 210 integrated into the single temperature duct 208. Other embodiments may include heating or cooling the air flow into any number of shutters 206, temperature ducts 208, and temperature elements 210, without departing from the scope of the invention.

Figure 3A:
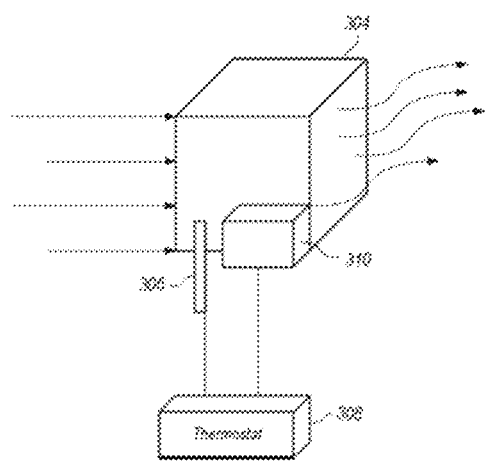
FIG. 3a is a block diagram of the cooling temperature feedback loop in accordance with an aspect of the invention.

FIG. 3a shows a block diagram of the temperature feedback loop for a cooling element. In one preferred embodiment, the finned condenser or any cooling element 304 requires a temperature sensor 302, such as a thermocouple, in contact with each cooling element 304 to monitor the temperature of the temperature ducts 306. These temperature sensors 302 may be an infrared sensor, bimetallic thermocouple sensor, pressure spring thermometers, or infrared camera. Any one of these temperature sensors 302 may keep the temperature of the temperature ducts 304 at a constant temperature, through a feedback loop with the micro control board. In this exemplary embodiment, a thermostat 308 is set to a specific temperature range that it desires to reach using software signals from the CPU 406. The thermostat 308 then measures the temperature using the temperature sensor 302. Based on what the measured temperature is compared to the set temperature range, the thermostat 308 acts as a relay device that sends an on/off signal to the cooling compressor 310 to turn on/off. As more air flows through the cooling element 304, more air is cooled and the cooling element 304 will heat up in temperature, triggering the thermostat 308 to turn on the cooling compressor 310.

Figure 3B:
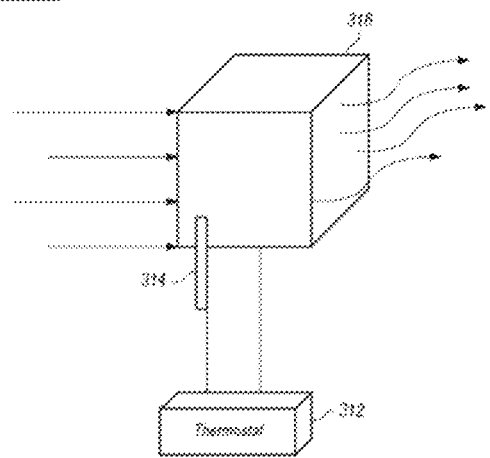
FIG. 3b is a block diagram of the heating temperature feedback loop in accordance with an aspect of the invention.

FIG. 3b illustrates a block diagram for the temperature feedback loop for a heating element. In accordance with an exemplary embodiment, the thermostat 312 is set to a specific temperature range that it desires to reach using software signals from a CPU 406. The thermostat 312 then measures the temperature using the temperature sensor 314. Temperature sensors 314 may include infrared sensors, bimetallic thermocouple sensors, pressure spring thermometers, or infrared cameras. Based on what the measured temperature is compared to the set temperature range, the thermostat 312 acts as a relay device that sends an on/off signal to a switch that allows current to flow through the heater element 316 which heats the heater element 316. As more air flows through the heater element 316, more air is heated and the heating element 316 will cool down in temperature, triggering the thermostat to power the heater element.

Pre-heated and pre-cooled temperature ducts 304, in combination with shutters 206, will help maintain the low latency of the virtual environment demands. Low latency of the environmental simulation is important to the experience of the user because when the user sees visual cues, the environmental simulator needs to respond immediately, otherwise a lag between the sense of feeling and environment can have an undesirable effect. Latency is the interval between the stimulation and response, or also known as the time delay between the cause and effect of some physical change in the system being observed. For example, the user raises his arm in the physical world and his arm in the virtual world raises with an obvious delay representing high latency of the system.

Figure 4:
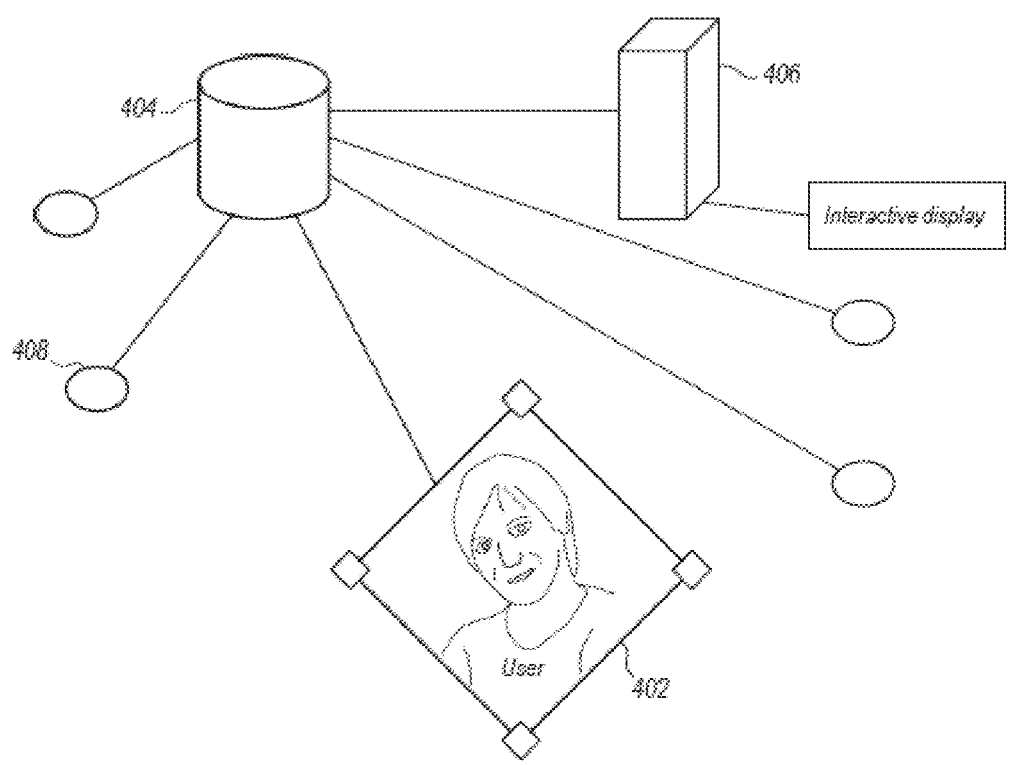
FIG. 4 is a system diagram of the system configuration in accordance with an aspect of the invention.

FIG. 4 shows a system diagram of the surround haptic system configuration. In one general aspect of the invention, a system may comprise of a sensor or a series of sensors 402 to detect a user's body position and orientation. Although not shown in FIG. 4, in other embodiments, a higher resolution of data capture related to user position and orientation may be achieved using body-tracking, hand-tracking, head-tracking, or eye-tracking sensors. Tracking enables the measuring of simple behaviors of a user in the physical world. For example, the user took one step forward in the physical world and the distance of one step was measured and tracked by a computer system with precise coordinates. When tracking, data is available in the system computer, it can be used to generate the appropriate computer-generated imagery (CGI) for the angle-of-look at the particular time. For example, when a user's head is tracked, the computer system renders the corresponding computer-generated imagery to represent the digital world. Examples of tracking may be the use of a depth sensing camera for hand tracking; electromagnetic motion tracking for limb and body tracking; LED array tracking; accelerometer tracking; eye tracking; and eye-tracking with infrared and near-infrared non-collimated light to create corneal reflections. Audio sensor data may also be a part of the user input data.

Another feature to enhance presence is to control the direction of the haptic tower 408 using motors which allow haptic towers 408 to pivot in place by its rotatable base 114 and most mimic the virtual environment the user is in. This can be further enhanced by using head track or full body tracking. This body tracking may also be used for the control and aiming of the rotatable dispensing nozzle 112 at particular track body locations. Additionally, in an alternative embodiment, spacialization software within the virtual experience with adaptive algorithms may change the intensity of air flow based on tracking of the users position in the virtual space. These features effectuate targeted delivery of haptic effects, enhancing the immersive VR experience for the user.

In other embodiments, user environment sensors, either attached to the user or placed near the user, give the system an initial temperature reading to customize the experience to the user's environment state. For example, if the ambient temperature near the haptic towers 408 is cold, the system can compensate by setting the temperature experience to omit cold temperature output. In yet another embodiment, flow sensors at the user's location or at the outlet of the haptic towers 408 measure and control the flow output of the fan assembly 202, mist output and burst output. Alternative embodiments may include measuring the flow output of the fan assembly 202 by measuring the rotating speed of a motor in a fan assembly 202. Other embodiments include audio sensor data as being a part of the user input data.

Still referring to FIG. 4, the user data captured by the sensor or sensors 402 related to user body position and orientation, may be communicated to the micro controller 404, which will relay input signals from sensors 402 and relay output commands to the haptic towers 408, via a CPU 406. The micro controller 404 may be a small computer or a single integrated circuit containing a processor core, memory and programmable input. The micro controller 404 codes the data from the CPU 406, including user data from the sensors and program content data, to actuate the haptic towers 408 to deliver the haptic effects. In one embodiment, system configuration may include haptic towers 408 that wirelessly communicate with the CPU 406 through any short-range mode of wireless communication, such as Wi-Fi, UWB, Bluetooth, ZigBee, or any protocol standards for short range wireless communications with low power consumption. Each haptic tower 408 may send and receive commands to the CPU controlling the experience. Another embodiment of the system may have the haptic towers 408 connect to the CPU 406, directly without a micro controller 404, through USB, or any cable, connector and communication protocols used in a bus for connections, communications, and power supply for electronic devices. The CPU 406 would communicate directly with each haptic tower 408 sending and receiving data in coordination with the sensor user data and coded experience data. This configuration would have each haptic tower 408 powered independently or through a power controller where each additional haptic tower 408 would connect to the power controller.

In another configuration, the flow of data communication may be the through a wired connection where each haptic tower 408 would be wired to a micro controller 404, and the micro controller 404 is wired to the CPU 406, through USB, or any cable, connector and communication protocols used in a bus for connections, communications, and power supply for electronic devices. The haptic towers 408 would send sensor data to the micro controller 404, which would relay the data to the CPU 406. The CPU 406 would interpret the data and respond accordingly by sending commands to the micro controller 404, which would relay the commands to the associated haptic tower 408. In yet another embodiment, the haptic towers 408 may wirelessly communicate with the micro controller 404, bypassing the CPU 406, by any of the known method of short-range wireless connection, such as Wi-Fi, UWB, Bluetooth, ZigBee, or any protocol standards for short range wireless communications with low power consumption. Each haptic tower 408 can be powered through the micro controller 404, or independently powered. The micro controller 404 may be placed on a computer desk near the CPU 406. A USB connection may connect the micro controller 404 to the CPU 406. Additionally, a power cord may be plugged into a standard AC120V socket, which is attached to the microcontroller 404. In one embodiment, the haptic tower 408 may have a power cord or control wire that will plug into the micro controller 404. While in the present example, the haptic tower 408 and micro controller 404 are networked via a cord or wire, other embodiments may include communicating over wireless short-range or long-range networks.

In one preferred embodiment, not shown in FIG. 4, a high-level initialization protocol may begin with establishing a micro controller and CPU connection and confirming power of the micro controller. In another embodiment, the system may establish connection with each haptic towers' individually in a configuration void of a micro controller hub. Next, the initialization protocol may confirm if each haptic tower is upright and in the right orientation; read initial temperature readings from all thermometers; confirm user positioning—location relative to haptic towers; read initial positions of all servo motors, damper shutter motors, tower positioning motors, nozzle motors; confirm motors are operational; next, set all servo motors to default positions; confirm motor positions with output position; confirm minimum distance between user/object and the haptic tower outlet; confirm the functionality of the heating and cooling temperature elements; confirm with thermometer reading max/min temperature with the max power to heating/cooling element relative to room temperature; then, safely confirm no overloading of circuitry or overheating; and confirm fan motor functionality and confirm command speed with tachometer input speed.

In another preferred aspect, also not shown in FIG. 4, a high-level communication protocol may include a CPU communicating with a haptic tower library to create a programmed experience of specific output haptics. The CPU may then send instructions to a haptic tower micro controller (MCU) via USB, USCI, I2C, SPI, UART, or other wireless communications protocols, which may, in turn, coordinate actuation of motors in series, or in parallel, to deliver the latent-free haptic experience. The use of a micro controller hub, as opposed to a haptic tower micro controller, may also be used to coordinate function of motors, without departing from the scope of the invention. The haptic micro controllers may drive actuation of motors using pulse-width modulation (PWM). Pulse-width modulation signals result in latent-free responses and allow for variable control of a driver and actuator.

More particularly, still referring to a preferred embodiment of the communication protocol, simultaneous control of the haptic experience will be integrated into the onboard micro controller (MCU). For example, the CPU sends the coordinates of the haptic experience to the MCU through a dedicated communication line. The combination of predictive algorithms integrated into the MCU and the communication protocol from the CPU, allows the MCU to predictively lower haptic experience latency to generate a unique and specific entertainment experience. The MCU is configured to interpret the positional data and simultaneously coordinate the actuator array to precisely deliver the haptic output. Typical CPU loads are high due to the graphical intensity and computing power required to create low latency virtual reality experience. As a result, allowing the MCU to interpret and drive the haptic experience in an autonomous manner offloads the CPU requirements and decrease latency between the visual image and haptic experiences. Alternatively, series control of the haptic experience may be integrated into the on-board MCU to off-load CPU demands and decrease latency as well. An additional dedicated communication line between the CPU and on-board MCU may embody the user profile and contextual information. This user profile and contextual information may be a combination of data points ranging from local weather, wearable temperature data, user preferences, user health data, etc. This data may then be used to augment the sensor data and content data to drive an even more personalized haptic experience—in a low-demand and low latency environment.

While not shown in FIG. 4, in yet another configuration of the communication protocol, the on-board MCU may be an autonomous power management tool that can ultimately determine the power requirements for each element. For example, if specific haptic towers will not require the cooling requirement, the MCU can autonomously control the power supply to the cooling temperature element. This improves the overall power efficiency of the system without losing the required low latency experience. Another embodiment of a communication protocol may be for a comprehensive safety monitoring system. Each haptic tower is fitted with moving motors, heating and cooling temperature elements that can create a number of hazards. The continuous communication between the CPU and MCU is required due to a need to protect the user from any hazard. Continuous monitoring of circuit behavior, thermometers, motor output, and complex simultaneous and series systems are important for user safety and hazard mitigation. This dedicated line will communicate with a dedicated line to ensure the CPU knows when to halt any virtual experience and draw attention to the user in case of an emergency in the form of a dashboard alert formatted for an interface display.

According to one embodiment, the system will be a modular surround haptic system, as shown in FIG. 4. The system may include either the two or four haptic tower 408 configurations with a micro controller 404 controlling all of the haptic towers 408. The user may then set up each haptic tower 408 approximately three feet distance from the user's torso depending on how many haptic towers 408 are set up. The user may orient each haptic tower 408 such that the air outlet or dispensing nozzle 112 may be pointed towards the user's torso/head area. In some embodiments, height may be adjustable via either sliding the system up or down on a tripod system. The user may be able to manually adjust the dispensing nozzle 112 direction in the desired angle for the user. Automated head/body tracking may allow the system to automatically aim at the user. Some embodiments may include haptic towers that move dynamically within a confined space to simulate wind or other air displacement from multiple points of origin, greatly expanding the degree of locational specificity, as compared to static towers. Alternate embodiments may include system configurations with any number of haptic towers, featuring at least a single haptic tower.

In some aspects of the invention, the location of the individual haptic towers 408 within the surround system configuration may be calibrated. Software and hardware may recognize the location of each haptic tower 408 to accurately simulate the virtual environment. The location may be fixed for each haptic tower 408, where each haptic tower 408 will be manually labeled with a location of where that haptic tower 408 is intended to be oriented relative to the user. In another aspect, calibration of the location of each haptic tower 408 may not need a fixed set location, rather the user may set each haptic tower 408 to a location using software confirming each haptic tower location. In yet another aspect, calibration of tower location may be automated, obviating the need for user input. In continuing reference to FIG. 4, a system may include an interactive display, wherein the interactive display may be any one of the following: a head-mounted display; a display screen; a 3-D projection; and a holographic display.

While not shown in FIG. 4, embodiments may include the addition of a remote server to provide for back-end functionality and support. The server may be situated adjacent or remotely from the system and connected to each system via a communication network. In one embodiment, the server may be used to support verification or authentication of a user and a mobile device application function. In authenticating a user, a server may be further caused to recognize the user device at a particular system component, whether it is a haptic tower, micro controller, or any other system component that may be able to house a unique short-range communication tag. The server may identify and authenticate the particular component and user device by recognizing the unique tag, and then, authenticate the user by identifying the user device located at the particular component. The unique, short-range tag may be a NFC tag, RFID chip, Bluetooth, ZigBee, or any short-range communication protocol standard. The remote server may be further configured to support a user haptic output history function; help support a network sharing function; and support a haptic output selection search engine. The remote server may be further configured to provide a user-control system, which authenticates the user and retrieves usage data of the user and applies the data against predefined criteria of use.

Other embodiments may include a remote server that is configured to provide a contextually-aware haptic output suggestion engine, which may access the user haptic output history function and at least one user contextual information to cause the processor to display a suggested haptic output on at least one display interface 116. Provisioning of the remote server may be delivered as a cloud service. In yet other embodiments, a haptic tower 408 may be associated with an Internet of Things, whereby the haptic tower 408 is fully integrated into a user's home automation system, thereby providing additional contextual information for a contextually-aware haptic output suggestion engine.

Figure 5:
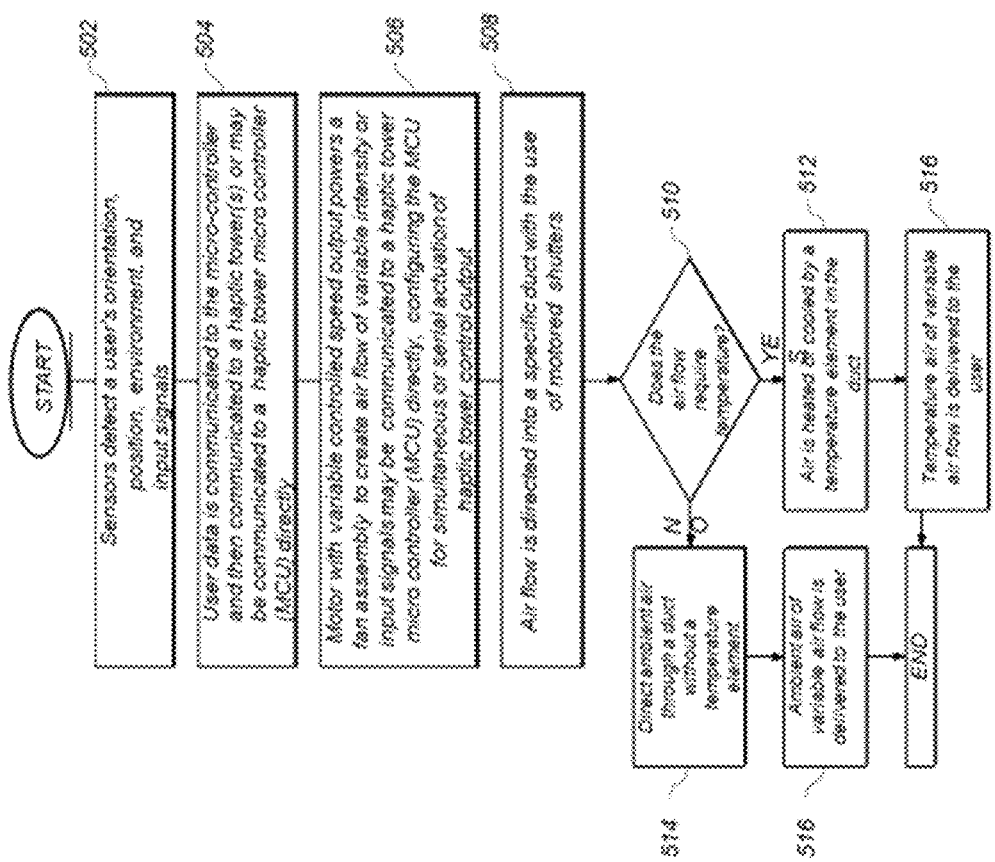
FIG. 5 is a method flow diagram of the method of delivering haptics in accordance with an aspect of the invention.

FIG. 5 shows a method flow diagram for the method of delivering precise and targeted haptic effects of variable air flow and temperature to a user. The preferred components, or steps, of the inventive method are as follows: first, in step 1502, sensor or sensors 402 may detect user position and orientation. The user data captured by the sensor or sensors 402 related to a user body position and orientation, may be communicated to the micro controller 404, which relays the signal to the CPU 406. Alternatively, a higher resolution of data capture related to user position and orientation may be achieved using body-tracking, hand-tracking, head-tracking, or eye-tracking sensors. Tracking enables the measuring of simple behaviors of a user in the physical world, in order to virtualize the user and further actuate rotation of the base, as well as nozzles 112, for precise and targeted delivery of haptics onto a user. Examples of tracking may be the use of a depth sensing camera for hand tracking; electromagnetic motion tracking for limb and body tracking; LED array tracking; accelerometer tracking; eye tracking; and eye-tracking with infrared and near-infrared non-collimated light to create corneal reflections. Audio sensor data may also be a part of the user input data.

Step 2 504, user data may be communicated to the micro controller 404 and then communicated to the haptic towers 408. The micro controller 404 may code the data from the CPU 406, including user data from the sensors 402 and program content data, to actuate the haptic towers 408 to deliver the haptic effects. The user data captured by the sensor or sensors 402 related to user body position and orientation, may be communicated to the micro controller 404, which relays the signal to the CPU 406. The micro controller 404 codes the data from the CPU 406, including user data from the sensors 402 and program content data, to actuate the haptic towers 408 to deliver the haptic effects. One embodiment may include haptic towers 408 that wirelessly communicate with the CPU 406 through any short-range mode of wireless communication, such as Wi-Fi, UWB, Bluetooth, ZigBee, or any protocol standards for short range wireless communications with low power consumption. Each haptic tower 408 may send and receive commands to the CPU 406 controlling the experience.

Another embodiment may have the haptic towers 408 connect to the CPU 406, directly without a micro controller 404, through USB, or any cable, connector and communication protocols used in a bus for connections, communications, and power supply for electronic devices. The CPU 406 would communicate directly with each haptic tower 408 sending and receiving data in coordination with the sensor user data and coded experience data. This configuration would have each haptic tower 408 powered independently or through a power controller where each additional haptic tower 408 would connect to the power controller.

In another configuration, the flow of data communication may be the through a wired connection where each haptic tower 408 would be wired to a micro controller 404, and the micro controller 404 is wired to the CPU 406, through USB, or any cable, connector and communication protocols used in a bus for connections, communications, and power supply for electronic devices. The haptic towers 408 would send sensor data to the micro controller 404 which would relay the data to the CPU 406. The CPU 406 would interpret the data and respond accordingly by sending commands to the micro controller 404, which would relay the commands to the associated haptic tower 408.

In yet another embodiment, the haptic towers 408 may wirelessly communicate with the micro controller 404, bypassing the CPU 406, by any of the known method of short-range wireless connection, such as Wi-Fi, UWB, Bluetooth, ZigBee, or any protocol standards for short range wireless communications with low power consumption. Each haptic tower 408 can be powered through the micro controller 404, or independently powered. Alternatively, step 2 504 may involve a micro controller 404 that only codes data from a program content data store in the CPU 406, and not require sensor 402 captured user data. The coded signal from the micro controller 404 actuates the haptic tower 408 to perform the process of delivering targeted air flow of variable intensity and temperature. Still referring to FIG. 5, step 3 506 describes the micro controller 404 instructing the haptic tower 408 to actuate a power output to control variability of air flow rate. In a preferred embodiment, the micro controller 404 instructs the haptic tower 408 to actuate a motor 204 with variable controlled speed output for powering a fan assembly 202. In alternative embodiments, the air flow results in air flow of variable intensity by the micro controller 404 instructing the haptic tower 408 to actuate a valve in creating variable air flow rate. In yet another embodiment, a brake for tight control of the output air flow from the fan assembly 202 may result in the variability of air flow rate. In yet another configuration of the communication protocol, the CPU may send the coordinates of the haptic experience to an on-board micro-controller (MCU) through a dedicated communication line. The combination of predictive algorithms integrated into the MCU and the communication protocol from the CPU, allows the MCU to predictively lower haptic experience latency to generate a unique and specific entertainment experience. The MCU is configured to interpret the positional data and simultaneously coordinate the actuator array to precisely deliver the haptic output. As a result, allowing the MCU to interpret and drive the haptic experience in an autonomous manner offloads the CPU requirements and decreases latency between the visual image and haptic experiences. Alternatively, series control of the haptic experience may also be integrated into the MCU to off-load CPU demands and decrease latency as well.

Step 4 508 describes a preferred embodiment of the method in which the air flow of variable flow rate may be directed into a specific temperature duct 208 with the use of motored shutters 206. The air flow may be directed to specific shutters 206, whereby it is channeled into respective ducts 208, and appropriately treated by a temperature element 210. Servo motors may control dampers or flat shutters 206, and these shutters 206 will open and close controlling the air flow through different temperature ducts 208.

In continuing reference to FIG. 5, step 5 510 describes an exemplary embodiment of the method in which air flow is directed into either a temperature duct 208 or ambient duct 208, depending on the need for temperature treatment based on a data signal. If temperature treatment is required, step 6 512 describes treating the air by a temperature element 210 in a respective duct 208. After redirecting the air into one of the separate temperature ducts 208, each duct 208 has either a hot or cold temperature element 210. For heated air, the air flows through the "hot" duct 208 with an exposed heating element 210. In a preferred embodiment, the air may flow through an exposed Positive Temperature Coefficient (PTC) ceramic heater element, or any thermistor with a high non-linear thermal response, such as barium titanate or lead titanate composites. In other embodiments, the heating element 210 may be a condenser heat sink in a vapor-compression cycle, thermoelectric heating using Peltier plates, Ranque-Hilsch vortex tube, gas-fire burner, quartz heat lamps, or quartz tungsten heating, without departing from the scope of the invention. For the "cold" duct 208, the air flows through a cooling element 210. In a preferred embodiment, the air may flow through a traditional finned air conditioning condenser in a vapor-compression cycle. Alternate embodiments of the cooling element 210 may include an evaporator heat sink in a vapor-compression cycle or thermoelectric cooling using the Peltier effect, chilled water cooler, Ranque-Hilsch vortex tube, evaporative cooling, magnetic refrigeration, without departing from the scope of the invention. In alternate embodiments, the air from the fan assembly 202 is directed into a single temperature duct 208, where the air is exposed to both heating and cooling temperature elements 210 integrated into the single temperature duct 208. Other embodiments may include heating or cooling the air flow into any number of shutters 206, temperature ducts 208, and temperature elements 210.

Step 7 514 describes directing ambient air through a duct 208 without a temperature element 210. In alternate embodiments, the redirected air flow may be all directed into a single duct 208, regardless of the requirement for ambient or temperature treatment. In accordance, with this embodiment, the air from the fan assembly 202 may be directed into a single duct 208, where the air may be exposed to either heating or cooling temperature elements 210 integrated into the single duct 208, depending on the temperature requirement. Ambient air may bypass both temperature elements 210 integrated into the single duct 208. Other embodiments may include heating or cooling the air flow into any number of shutters 206, temperature ducts 208, and temperature elements 210, without departing from the scope of the invention.

In yet another reference to FIG. 5, step 8 516 describes the delivery of air flow of variable flow rate and temperature-exposed air or ambient air onto the user. In an exemplary aspect, delivery of temperature-treated or ambient air may be via dispensing nozzles 112 on the front wall 126 of the haptic tower 408. The front wall 126 may have a dispensing nozzle 112 hidden behind a flush wall with the means of opening and closing. The dispensing nozzle 112 may have separate outlets for air, fog, and mist. Additionally, the dispensing nozzle 112 may have the ability to rotate, or change the diameter of the inlet, in order to target the direction of the air flow, as well as alter the intensity of the air flow. The haptic tower 408 may have a front wall 126 void of dispensing nozzles 112, rather, the haptic delivery may be via a vent system, or any other outlet.

In further detail, still referring to step 8 516 of FIG. 5, the haptic tower 408 may have a rotatable base 114, which may pivot the haptic tower 408 in at least one axis of motion. A rotating base 114 allows for the haptic tower 408 to rotate on its base to allow for more targeted delivery of haptic effects. More particularly, a rotating base 114 may allow for the haptic tower 408 to rotate on its base in at least one axis of motion to provide for a panning air flow effect. In other embodiments, the rotatable base 114 may allow for motion along multiple axis of rotation. In one embodiment, pivoting and targeted haptic delivery may be further enhanced by using head tracking or full body tracking system. Other embodiments may include a haptic tower 408 with a dispensing nozzle 112, the pivoting and rotation of which may be also enhanced with the addition of head tracking or full body tracking systems.

Figure 6:
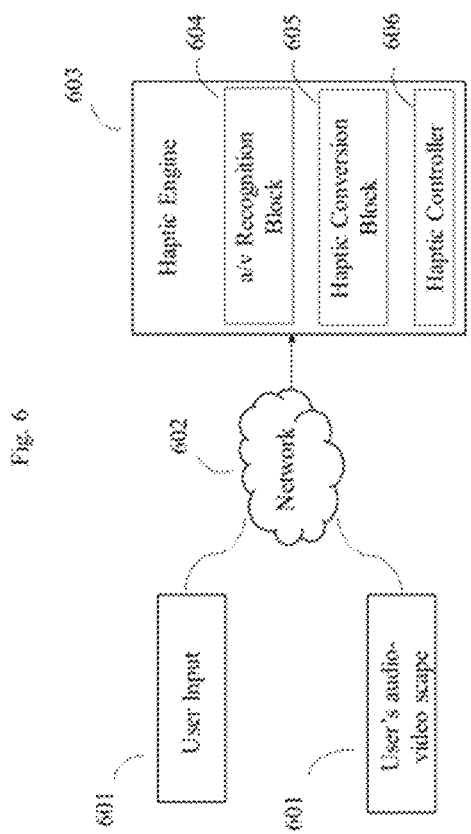
FIG. 6 is a system block diagram of the haptic engine in an exemplary environment according to an aspect of the invention.
Figure 7:
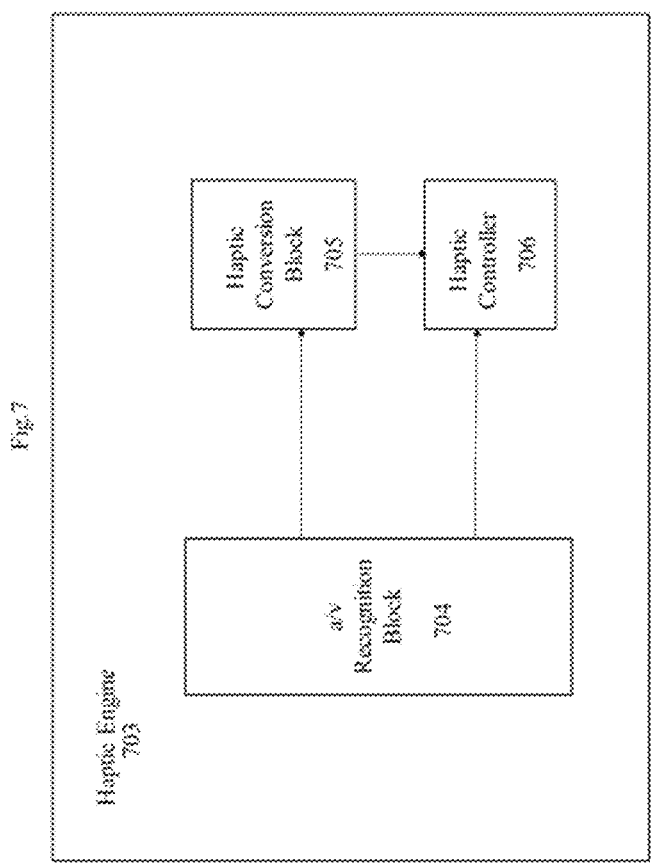
FIG. 7 is a system block diagram of the haptic engine isolated in accordance with an aspect of the invention.

FIG. 6 and FIG. 7 are a system block diagram of the haptic engine in an exemplary environment according to an aspect of the invention. In an exemplary embodiment, a system for processing an audio and video input in a point of view program for haptic delivery, comprises of, at least one modular haptic tower 408. The haptic tower 408 further comprises of, at least one fan assembly, at least one duct, at least one outlet, a processor and a memory element coupled to the processor. Further yet, in another preferred embodiment of the invention, a haptic engine 603,703 comprises of an audio and video (a/v) buffer recognition block 604, 704; a haptic conversion block 605, 705 and a program executable by the haptic engine 603, 703.

The haptic engine 603, 703 is further configured via a network 602, to recognize at least one of a data input from a user 601 and, or a virtual environment comprising the user 601, and determine for at least one event: any one of, or combination of, an event proximity score, a pixel color score of the event, a pixel velocity score of the event, and an audio score of the event by the a/v buffer recognition block 604 704, apply a scoring rule for conversion of an at least one threshold-grade scored event into a haptic output command by the haptic conversion block 605, 705.

Further yet, in an embodiment of the invention based on the haptic output command, the intensity of an actuator coupled to the at least one fan assembly and, or temperature element is controlled, resulting in a variable displacement and, or temperature of air through at least one duct and at least one outlet of the modular haptic tower corresponding to the virtual environment 601 comprising the user 601. Alternatively, in an embodiment of the invention, the haptic output command controls the intensity of an actuator is by a haptic controller 606, 706 further controlling the intensity of the fan assembly and, or the temperature element. In yet another embodiment of the invention, an odor recognition tag may be further incorporated into the a/v recognition block to score a smell sensation event.

Further yet, the network 602 may be any other type of network that is capable of transmitting or receiving data to/from/between user devices: computers, personal devices, telephones or any other electronic devices and user's audio-video environment. Moreover, the network 602 may be any suitable wired network, wireless network, a combination of these or any other conventional network, including any one of, or combination of a LAN or wireless LAN connection, an Internet connection, a point-to-point connection, or other network connection—either local, regional, or global. As such, the network 602 may be further configured with a hub, router, node, and, or gateway to serve as a transit point or bridge to pass data between any of the at least networks. The network 602 may include any software, hardware, or computer applications that implement a communication protocol (wide or short) or facilitate the exchange of data in any of the formats known in any art, at any time. In some embodiments, any one of a hub, router, node, and, or gateway may additionally be configured for receiving wearable or IoT data of a member/user of a group session, and such data may be saved, shared, or embedded within the session. Additionally, such personalized or contextual data may further inform the suggestion tool layer or automation tool layer on suggesting reactive or proactive routines within the workflow.

In a continuing reference to FIGS. 6 and 7, the network-coupled server 602, cloud-based server, or haptic engine controller 603, 703 may be a device capable of processing information received from at least one of, the user input 601 or user's surrounding audio-video environment 601. Other functionalities of the server or haptic engine 603, 703 may include providing a data storage, computing, communicating and searching. As shown in FIGS. 6 and 7, the server or haptic engine 603, 703 processes the input, recognizes and scores the event, and converts it into a haptic output command for further dynamic provisioning by the haptic controller 606, 706.

Further yet, in an embodiment of the present invention, the data input is from at least one of, device that outputs an audio and, or video signal during operation. The audio, video outputs may be from any one of, devices including, but not limited to, Closed-Circuit Television (CCTVs) cameras, High Definition (HD) cameras, non-HD cameras, handheld cameras, or any other video/image receiving units as well as the users' surrounding environments. The haptic engine 603, 703 may be configured to receive a dynamic imagery, audio or video footage from the audio/video receiving devices, and transmit the associated data to the a/v recognition block 604, 704 for further dynamic provisioning. In an embodiment, the memory element coupled to the processor may maintain the dynamic audio/video footage as received from the video/image receiving devices. Alternatively, the audio/video inputs may be archived and stored in data storage element coupled to a processor that is configured to store pre-recorded or archived audios/videos. The audio/video inputs may be stored in any suitable formats as known in the art or developed later. The audio/video input archive may include a plurality of local databases or remote databases. The databases may be centralized and/or distributed. In an alternate scenario, the audio/video input archives may store data using a cloud based scheme.

Figure 8:
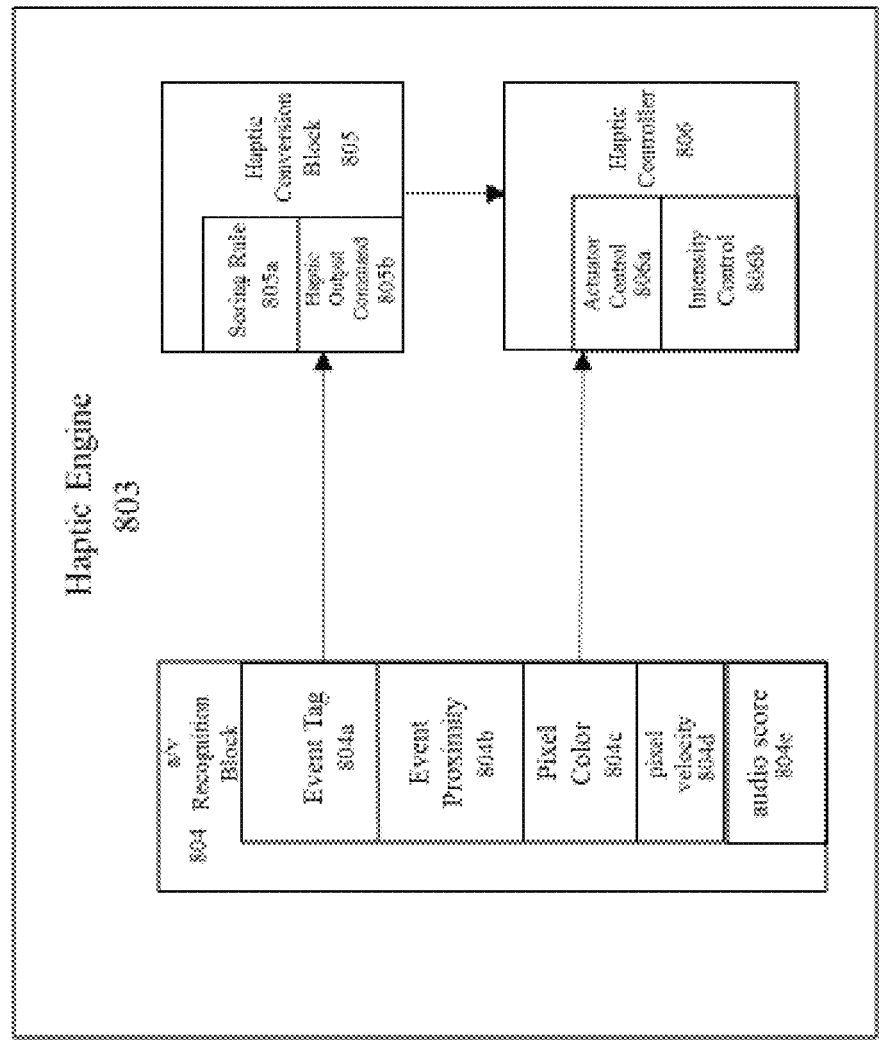
FIG. 8 is a system block diagram in accordance with an aspect of the invention.

Now with reference to FIG. 8, in an embodiment of the invention, the haptic engine 803 comprises of at least one of, an a/v recognition block 804, a haptic conversion block 805 and a haptic controller 806. The haptic engine 803 may be further configured to recognize at least one of, a data input from a user and, or a virtual environment comprising the user. Further yet, the a/v recognition block 804 tags at least one event 804a for scoring by at least one of, or a combination of, motion, color and, or sound.

Further yet, the a/v recognition block 804 determines a proximity score 804b of the tagged event 804a by determining the distance from any one of, a selected target zone comprising the event and, or a selected destination zone comprising the user, within a matrix of zones that occupy the entire field of view and, or sound.

In yet another embodiment of the invention, the a/v recognition block 804 determines a pixel color score 804c of the tagged event 804a by calculating an average hue score of the tagged event 804a using pixel data in a screen buffer by calculating a nearness coefficient, calculating an average of red & blue channels in the screen buffer, calculating an offset coefficient, calculating an average luminance in the screen buffer and deriving the average pixel score of the tagged event 804a based on an aggregation of the coefficients. Additionally, in an embodiment of the invention, the a/v recognition block 804 determines a pixel velocity score 804d of the tagged event 804a based on the coefficient by capturing a series of frames, and calculates a coefficient related to pixel velocity 804d by testing the per-frame and per-range delta in any one of, or combination of hue, luminance, brightness, saturation and, or color value.

Further yet, in an embodiment of the invention, the a/v recognition block 804 determines an audio score 804e of the tagged event 804a based on a coefficient by capturing an audio buffer and calculating an Average Energy, Immediate Energy, Immediate Energy Delta & Immediate Energy Mean Deviation and further, calculating a coefficient related to broad and narrow changes in a frequency spectrum.

Further yet, in an embodiment of the invention, the haptic conversion block 805 of the haptic engine 803 applies a scoring rule 805a for the conversion of at least one threshold-grade scored event into a haptic output command 805b. Further yet, the haptic a/v conversion block 804 is further coupled to a haptic conversion block 805 and the haptic controller 806 which further, processes the haptic output command 805b for actuating a fan and, or temperature element disposed within the modular haptic tower. Finally, based on the haptic output command 805b, the haptic controller 806 may control an intensity 806b of an actuator 806a coupled to the at least one fan assembly and, or temperature element, resulting in a variable displacement and, or temperature of air through the at least one duct and at least one outlet of the modular haptic tower corresponding to the virtual environment comprising the user.

In yet another embodiment of the invention, the haptic engine system 803 may comprise a feed-forward and, or back-propagated neural network trained to trigger a haptic output 805b based on any one of, or combination of, a stored data input, stored tagged event 804a, stored coefficient value, stored event proximity score value 804b, stored pixel color score value 804c, stored pixel velocity score value 804d, stored audio score value 804e, and, or haptic output command 805b. For example, consider a scenario of a campfire, wherein the haptic output commands 805b configured by the system are based on any one of, or a combination of, but not limited to, heat, crackling sound, wind velocity, burning sensation, sudden impact. If the tagged event in a virtual environment proximal to the user is of a heavily burning campfire, then the a/v recognition block 804 will generate a unique tag for an event 804a, compute a pixel proximity score 804b, pixel color score 804c, pixel velocity score 804d, and an audio score, which corresponds to a series of haptic outputs commands comprising of a burning sensation, hot air and a crackling sound.

Further yet, if the campfire is under control and, or if the user moves farther away from the site, or if it would start to rain, then the a/v recognition block 804 will generate another unique tag for an event 804a, compute another pixel proximity score 804b, pixel color score 804c, pixel velocity score 804d, and, or an audio score 804e, which may corresponds to a series of another set of haptic outputs commands 805b thus, comprising a less burning sensation, warm air and a fainter crackling sound. Furthermore, as the user in the virtual environment continues to move farther away from the campfire or if it would start to rain heavily, the burning campfire event may eventually be scored across all parameters below a predefined threshold, thereby no longer commanding any one of a haptic effect commands. In an alternative embodiment of the invention, an odor recognition tag may be incorporated into the a/v recognition block 804 to score an odor haptic output 805*b*.

Additionally, in another embodiment of the invention, the system, may comprise a feed-forward and, or back-propagated neural network to use a series of externally captured buffers containing known audio-visual sources to aid in real-time recognition of the audio and video input by using a probabilistic approach to determine presence in a captured buffer. The audio/video input events may be tracked in a current frame and stored in a computer processor database for machine learning objectives. A classification algorithm may be based on supervised machine learning techniques such-as SVM, Decision Tree, Neural Net, Ada Boost, and the like. Further, the classification may be performed by analyzing one or more features based on any one of, or combination of, a stored data input, stored tagged event 804*a*, stored coefficient value, stored event proximity score value 804*b*, stored pixel color score value 804*c*, stored pixel velocity score value 804*d*, stored audio score value 804*e*, and, or haptic output command 805*b*.

In another embodiment of the present invention, the classification algorithm may employ an unsupervised machine learning to learn the features from the image input data itself. For example, a Neural Network Autoencoder can be used to learn the features and then to train a Deep Neural Network or a Convolutional Neural Network. The classification algorithm may be based on a supervised or an unsupervised machine learning technique, and the classification is performed by analyzing one or more features of the tracked objects. Examples of the one or more features include, but are not limited to, a size, an aspect ratio, a location in the scene, and other generic features such as color, HoG, SIFT, Haar, LBP, and the like. Typically, the object classification algorithm is executed on top of object tracking algorithm and it allows to localize search region, thus decreasing the amount of computation. Such approach results in reducing power consumption and/or increase the detection speed and accuracy.

Figure 9:
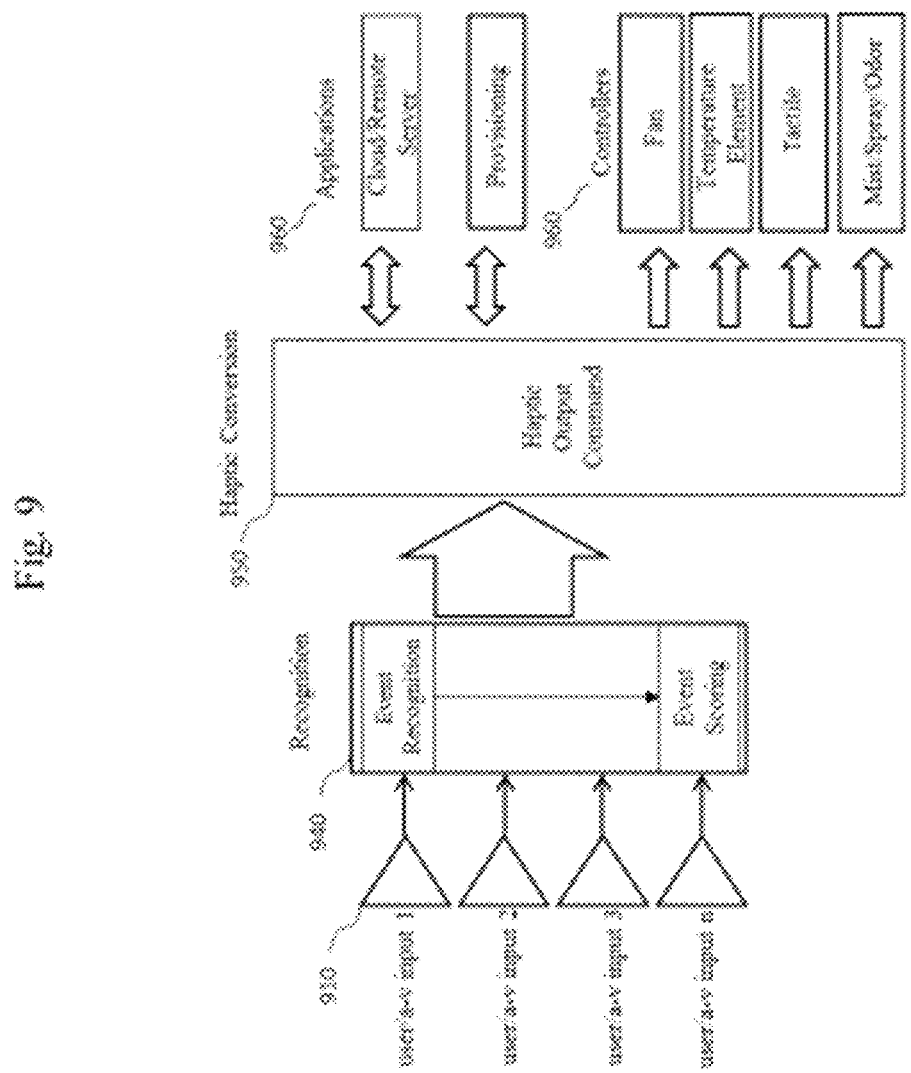
FIG. 9 is an interaction flow diagram in accordance with an aspect of the invention.
Figure 10:
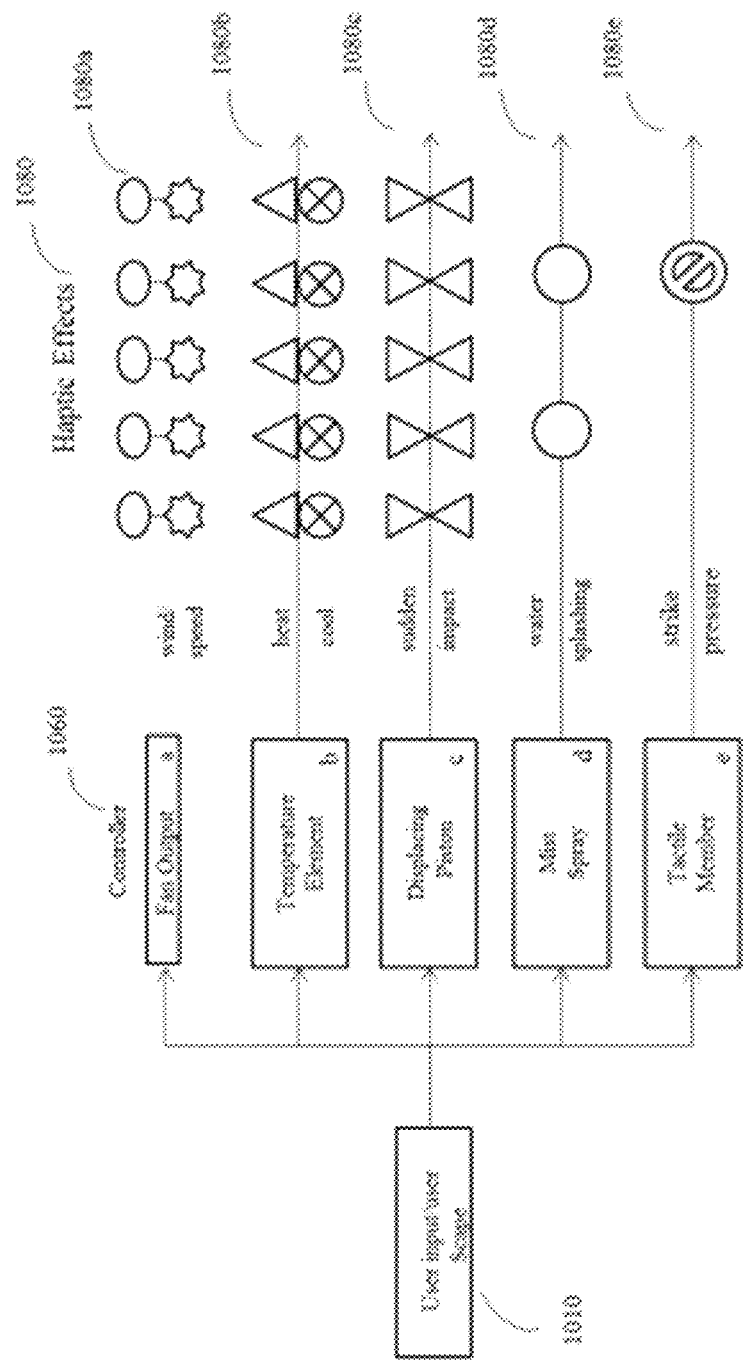
FIG. 10 is an interaction flow diagram in accordance with an aspect of the invention.

FIGS. 9 and 10 shows the overall interaction flow of the haptic engine, according to an embodiment of the present invention. Both figures illustrate a system for processing an audio and video input 910, 1010 in a point of view program for haptic delivery, said system comprising: a modular haptic tower; a processor; a memory element coupled to the processor; a haptic engine comprising: an audio and video (a/v) buffer recognition block; a program executable by the haptic engine and configured to: recognize a data input from any one of, or both, a user and a virtual environment comprising the user, and determine for at least one event: any one of, or combination of, an event proximity score, a pixel color score of the event, a pixel velocity score of the event, and an audio score of the event 940 by the a/v buffer recognition block; and convert the at least one scored event into a haptic output command 950 and based on the haptic output command 950, control an intensity of an actuator 960, 1060 resulting in a variable displacement of any one of, or combination of, air, temperature, mist, pressure and, or impact corresponding to the virtual environment comprising the user 1080.

The various haptic effects commanded by the haptic output command 950 may be any one of, or combination of wind/speed 1080*a*, heat/cool 1080*b*, sudden impact 1080*c*, water effects 1080*d*, and, or strike/pressure 1080*e*. For instance, if the event proximal to the user is a heavy flowing, cold, water fall, then the haptic engine will compute a pixel proximity score, color score, velocity score, and audio score, which corresponds to a series of haptic outputs comprising a strong burst of cold air, followed by a heavy spray of cold water—simulating a heavy wind 108*a* and a heavy mist 1080*d*. Conversely, if the same heavy flowing and cold water fall is not proximal to the user, the ensuing pixel color score, velocity score, and audio score may correspond to a series of haptic outputs 950 comprising of just a light air flow from a fan assembly 960, 1060 and a light water spray from the water spray unit 960, 1060—simulating a light wind 1080*a* and a light mist 1080*d*. As the user in the virtual environment is walking away from the water fall event, and it is distancing in the frame, the scores will be reflected, leading to a winding down of actuator intensity 960 and haptic effect. As the user in the virtual environment continues to walk away, the water fall event may eventually be scored across all parameters below a predefined threshold, thereby no longer commanding any one of a haptic effect 1080.

While not shown in FIG. 9 or 10, the haptic engine may be coupled to a feed-forward and, or back-propagated neural network trained to trigger a haptic output based on any one of, or combination of, a stored data input, stored tagged event, stored coefficient value, stored event proximity score value, stored pixel color score value, stored pixel velocity score value, stored audio score value, and, or haptic output command. The feed-forward or back-propagated neural network may further use a series of externally captured buffers containing known audio-visual sources to aid in real-time recognition of the audio and video input by using a probabilistic approach to determine presence in a captured buffer.

For instance, when the user walks away from the water fall event in the previous scenario and walks toward another scenario featuring an event including rushing water, such as white-water rafting, the engine may use the machine learning techniques to use at least one of the scoring values of the white-water rafting event to predict the other scoring values based on the similarities of the first scoring values with the earlier stored waterfall event. This predictive scoring may ensure quicker haptic output response time, in addition to reducing computing resources. Likewise, the machine-learning coupled system needs to be discriminative enough to avoid false positives. For instance, if the user walks away from the water-fall event and soon stumbles upon a fast-flowing creek (another event featuring rushing water), it needs to be able to discriminate between this and a rushing white-water rafting scenario. Despite the fact that perhaps all three water featuring events may score for pixel color similarly, they may each have varying pixel velocity scores, thereby commanding for varying wind intensities. In such a scenario, the system may have to root through the larger cache of similar events and do a deeper stage calculation of each paired or matched event. In such scenarios, wherein multiple cached events may be implicated due to their similarity, the system may require a two-parameter checkpoint in order to trigger predictive scoring values and a haptic command output.

In one embodiment, the machine learning systems may differentiate between background events and foreground events dynamically. Input frames may correspond to complex scenes that include areas with significant background variations/continuous movements. However, these variations and continuous movements should not trigger a haptic expression since they are background events, and not foreground events, such as flying birds, swaying tree branches, moving clouds, etc. The system, referencing a background event cache, can label the event as a background event, bypassing the need for the a/v recognition block to tag and compute the event (event proximity score). Furthermore, based on this background event referencing, events may be labeled as background, even if they appear in the foreground and score a threshold-grade proximity score. For instance, a moving cloud passing over a rushing waterfall should not interfere with the haptic expression profile of the rushing waterfall, despite the fact that the moving cloud may impair the pixel color score of the rushing waterfall. The moving cloud would be detected as a background event based on background event cache referencing, and subsequently, the final pixel color score of the rushing waterfall would account for the moving cloud. The background event cache may further differentiate between static background events and dynamic background events. In an embodiment, a different algorithm/s may be applied for depending on the background event be labeled as static or dynamic.

In an embodiment, once the background event is extracted out, then remaining events in the input frame may be referenced from a foreground event cache, once at least one parameter triggers the event. As with the background event referencing, an algorithm/s may be applied for a current triggered event in the input frame, and foreground event bins with similar event/score features as the current event are identified. Event triggering and haptic output expression based on the a/v recognition block or machine learning may be based on threshold calculations employing a Local Adaptive Thresholds (LAT) technique and the threshold may be adapted dynamically.

In one embodiment, the cache of events or scores corresponding to events are constantly updated over time. For example, the cache is updated to handle gradual time variations (such as night/day changes), and a plurality of other background events (moving clouds/sun, shadows, weather, etc.). Moreover, the cache update may also involve spatial changes (neighboring pixel changes) within the input frames. To this end, background changes can be accounted for by the system using these learned approaches and not affect the haptic expressions of the targeted foreground events. For instance, the rushing waterfall should translate for a similar haptic expression or profile, irrespective of changes in lighting or color due to variations in time of day, weather, or cloud coverage, etc.

In other embodiments, in addition to classifying events as background or foreground, events may be further classified in terms of category, such as animal, human, projectile, natural phenomenon, crafts, vehicles, etc. Categorization may be based on at least one visual and, or audio aspect: color, size, aspect ratio, etc. In another embodiment of the present invention, the categorization algorithm categorizes the event, supervised by machine learning, and then inserts into categorized bins within either the background event cache or foreground event cache. Furthermore, machine learning approaches, such as a Deep Neural Network or a Convolutional Neural Network, may match a live event feature or score parameter to a cached event in any one of a category event bin within the background event cache or foreground event cache.

Figure 11:
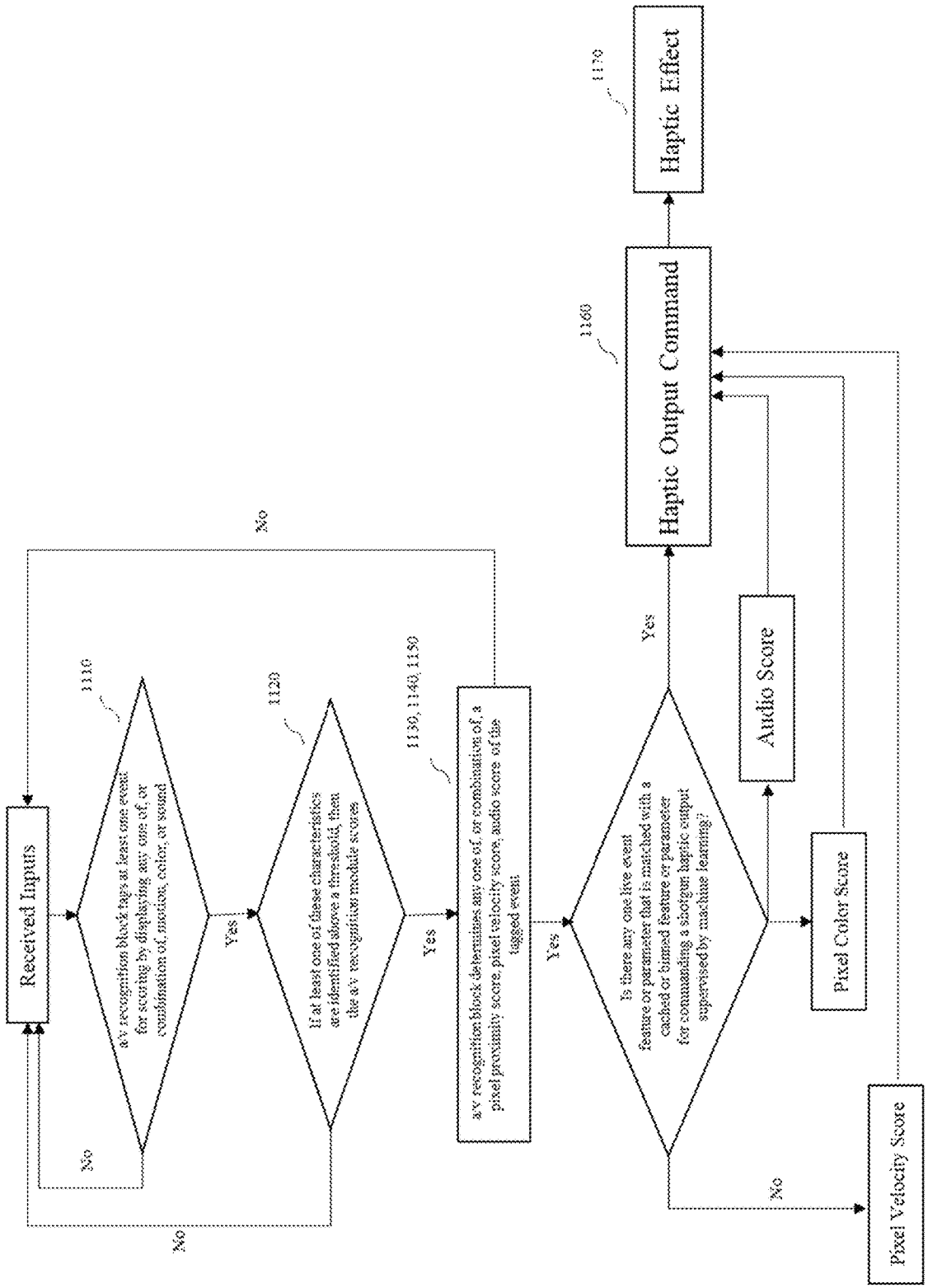
FIG. 11 is a process flow diagram according to an aspect of the invention.

FIG. 11 is a process flow diagram illustrating the steps involved from a data input to a haptic output, as the commands are passed down through the haptic engine. The a/v recognition block tags at least one event for scoring by displaying any one of, or combination of, motion, color, or sound 1110. If at least one of these characteristics are identified above a threshold, then the a/v recognition module tags the event for scoring 1120.

The a/v recognition block determines a proximity score of the tagged event by determining distance from any one a selected target zone comprising the event and a selected destination zone comprising the user, within a matrix of zones occupying the entire field of view and, or sound 1130. Once the tagged event is determined as proximal over a threshold, then a/v recognition block determines a pixel color score of the tagged event 1140 by calculating an average hue score of the tagged event using pixel data in a screen buffer, and calculate a nearness coefficient; calculate an average of red & blue channels in the screen buffer, and calculate an offset coefficient; calculate an average luminance in the screen buffer; and deriving the average pixel score of the tagged event based on an aggregation of the coefficients.

Simultaneously, the tagged proximal event is also processed by the a/v recognition block, which may determine a pixel velocity score of the tagged event 1150 by capturing a series of frames, and calculate a coefficient related to pixel velocity by testing the per-frame and per-range delta in any one of, or combination of hue, luminance, brightness, saturation, and, or color value; and deriving the pixel velocity score of the tagged event based on the coefficient.

Simultaneously, the a/v recognition block determines an audio score of the tagged event 1160 by capturing an audio buffer and calculate an Average Energy, Immediate Energy, Immediate Energy Delta, and Immediate Energy Mean Deviation, and calculate a coefficient related to broad and narrow changes in a frequency spectrum; and deriving the audio score of the tagged event based on the coefficient.

Upon scoring of any one of, or combination of, the video and audio aspects of the tagged event, the scored-tagged events may be referenced against cached/binned scores/events to translate into a haptic output command. In some embodiments, the scored-tagged events may input into a haptic conversion block, applying a scoring rule 1170, wherein any of a tagged and scored event is a threshold-grade scored event, and said threshold-grade scored event is converted into a haptic output command by the haptic conversion block. In other embodiments, a scoring rule or threshold calculation techniques, such as Local Adaptive Threshold (LAT) may be used to determine whether the scored event is in fact threshold-grade and warranting a haptic output command for haptic expression.

The haptic conversion block may be further coupled to a haptic controller, and said haptic controller processes the haptic output command for actuating any one of, or combination of, a fan, temperature element, displacement chamber, water mist unit, aroma unit, tactile member, and, or tactile projectile unit, disposed within the modular haptic tower. Alternatively, a series of haptic effects may be achievable employing the haptic engine, wherein the haptic effects are not disposed within the modular haptic tower. For instance, the haptic effects may be disposed within a haptic vest, glove, or any other wearable, and configured to actuate based on the audio-video input processed by the haptic engine.

Furthermore, the system may engage in processing shortcuts by employing a feed-forward and, or back-propagated neural network trained to trigger a haptic output based on any one of, or combination of, a stored data input, stored tagged event, stored coefficient value, stored event proximity score value, stored pixel color score value, stored pixel velocity score value, stored audio score value, and, or haptic output command. The system may reference a live tagged event to a cached or binned event by at least one point of event feature or score matching, and shotgun a haptic output command and, or haptic output expression. Furthermore, the feed-forward and, or back-propagated neural network may use a series of externally captured buffers containing known audio-visual sources to aid in real-time recognition of the audio and video input by using a probabilistic approach to determine presence in a captured buffer.

In yet other embodiments, a reiterative module may be further comprised in the haptic engine, wherein the reiterative module links and continuously reiterates the currently played haptic output, despite the haptic provoking event being out of the frame. For instance, even when the haptic provoking event is out of the frame and no longer registering a pixel color score, pixel velocity score, or audio score, the reiterative module may persist the haptic command and output, provided the pixel proximity score remains within the acceptable threshold. In keeping with our rushing waterfall scenario, after provoking the haptic expression for the rushing waterfall, the haptic expression may persist, despite the user turning around, and the waterfall no longer being in the frame. Once the user walks away by a threshold-dependent distance, the haptic expression corresponding to the rushing waterfall may cease—with or without the supervision of the reiterative module or machine learning.

Figure 12:
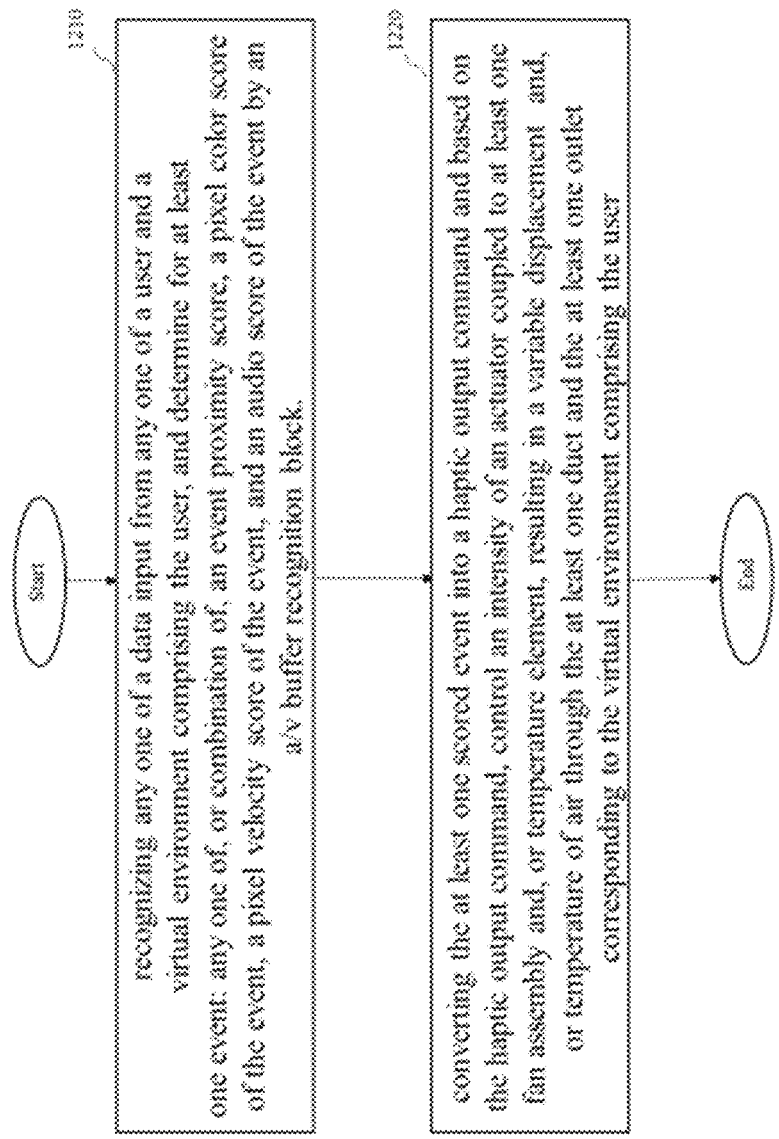
FIG. 12 is a method flow diagram in accordance with an aspect of the invention.

FIG. 12 illustrates a method for processing an audio and video input in a point of view program for haptic delivery, said method comprising the steps of: (step 1) recognizing any one of a data input from any one of a user and a virtual environment comprising the user, and determine for at least one event: any one of, or combination of, an event proximity score, a pixel color score of the event, a pixel velocity score of the event, and an audio score of the event by an a/v buffer recognition block 1210; and (step 2) converting the at least one scored event into a haptic output command and based on the haptic output command, control an intensity of an actuator coupled to at least one fan assembly and, or temperature element, resulting in a variable displacement and, or temperature of air through the at least one duct and the at least one outlet corresponding to the virtual environment comprising the user 1220.

Figure 13:
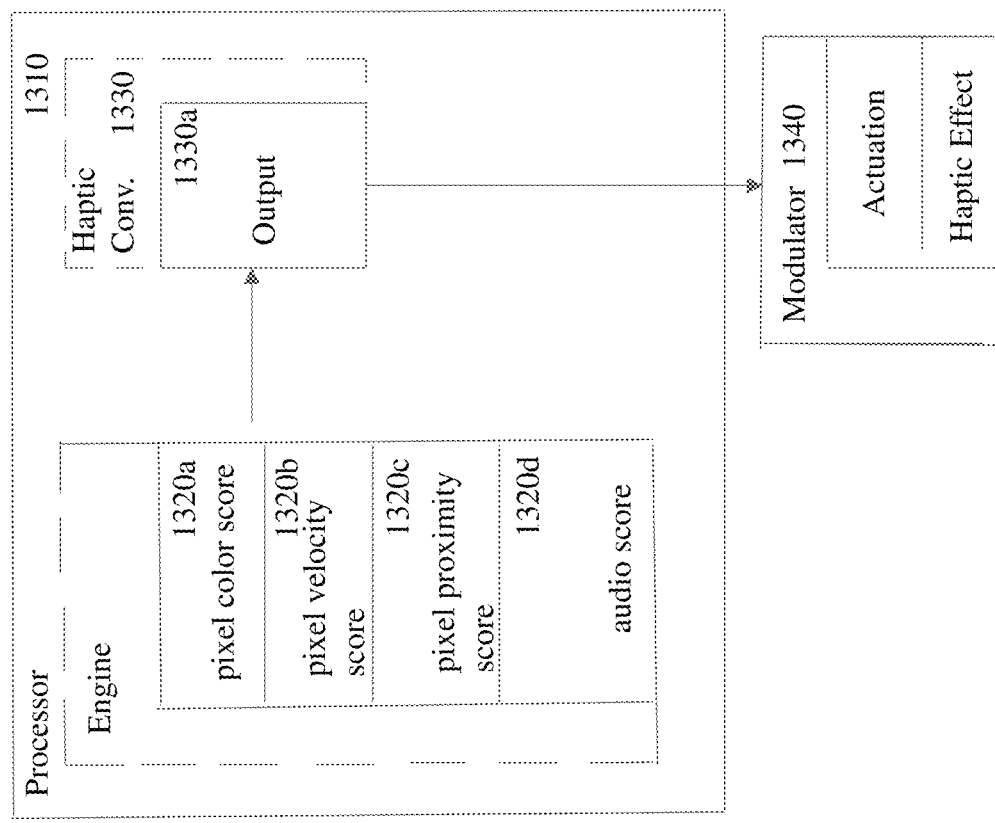
FIG. 13 is a system block diagram of the peripheral modulation of the unscripted feed in accordance with an aspect of the invention.

As shown in FIG. 13 (system block diagram of the peripheral modulation of the unscripted feed in accordance with an aspect of the invention), the processor 1310 may further comprise an engine 1320 (alternatively, a haptic engine) to be able to recognize at least one of the audio or video input from the at least one of the original programming feed or live feed, and determine for at least one tagged event, at least one of a pixel color score 1320a, a pixel velocity score 1320b, an event proximity score 1320c or an audio score 1320d. In a preferred embodiment, more than one score event will be accounted for to convert into an output command.

Once the scored events are tabulated, the processor 1310 (haptic conversion 1330/output 1330a) may convert the at least one scored event into at least one of an output command that triggers or controls a modulation effect of the at least one peripheral device in physical contact or free from the user in communication with the at least the first device playing the at least one of the original programming feed or live feed, thereby enabling modulation (controlled by the modulator 1340) of the at least one peripheral device based on any programming comprising at least one of an audio or video input and not requiring scripted modulation triggers.

In an embodiment (not shown), the processor may comprise of at least one of an a/v recognition block (engine 1320), a haptic conversion block (output 1330a) and a haptic controller (modulator 1340). The processor 1310 (engine 1320/recognition block) determines a proximity score 1320c of the tagged event by determining the distance from any one of, a selected target zone comprising the event and, or a selected destination zone comprising the user, within a matrix of zones that occupy the entire field of view and, or sound. The engine 1320 may further determine a pixel color score 1320a of the tagged event by calculating an average hue score of the tagged event using pixel data in a screen buffer by calculating a nearness coefficient, calculating an average of color channels in the screen buffer, calculating an offset coefficient, calculating an average luminance in the screen buffer and deriving the average pixel score of the tagged event based on an aggregation of the coefficients. Pixel velocity scores 1320b of the tagged event are calculated by the engine 1320 based on the coefficient by capturing a series of frames, and calculating a coefficient related to pixel velocity by testing the per-frame and per-range delta in any one of, or combination of, hue, luminance, brightness, saturation and, or color value. Further yet, the engine 1320 determines an audio score 1320d of the tagged event based on a coefficient by capturing an audio buffer and calculating an Average Energy, Immediate Energy, Immediate Energy Delta & Immediate Energy Mean Deviation and further, calculating a coefficient related to broad and narrow changes in a frequency spectrum.

Further yet, in an embodiment of the invention, the haptic conversion block (conversion block 1330/output 1330b) may apply a scoring rule for the conversion of at least one threshold-grade scored event into a haptic/output command. Further yet, the haptic/conversion block 1330 is further coupled to a haptic controller/modulator 1340, which further, processes the haptic output command for actuating modulating any peripheral device capable of modulation whether it be in physical contact or free the at least one user. In one embodiment, the haptic/output 1330b, the haptic controller/modulator 1340 may control a switch/intensity of an actuator coupled to a motor output or any other articulation/mechanized operation inherent in a peripheral device. For instance, the haptic controller/modulator 1340 may control a switch/intensity coupled to a motor output coupled to the at least one fan assembly and, or temperature element, resulting in a variable displacement and, or temperature of air through the at least one duct and at least one outlet of the modular haptic tower corresponding to the virtual environment comprising the user.

While not shown in FIG. 13, the processor/haptic/engine 1320 may comprise a feed-forward and, or back-propagated neural network trained to trigger an output 1330b based on any one of, or combination of, a stored data input, stored tagged event, stored coefficient value, stored event proximity score value, stored pixel color score value, stored pixel velocity score value, stored audio score value, and, or stored output command. For example, consider a scenario of an erupting volcano, wherein the output 1330b configured by the system are based on any one of, or a combination of, but not limited to, heat, erupting sound, flowing sound, wind velocity, burning sensation, sudden impact. If the tagged event in a programming environment proximal to the user is of a heavily erupting volcano, then the a/v recognition block/engine 1320 will generate a unique tag for an event, compute a pixel proximity score 1320c, pixel color score 1320a, pixel velocity score 1320b, and an audio score 1320d, which corresponds to a series of output commands comprising of a light effect, burning sensation, hot air, wind effects, crackling sound, eruption sound, flowing sound, and rumbling modulated from any one of a peripheral device: Interactive chair, home integrated speakers, controller devices, heat lamp, fan, modular haptic tower, home integrated light sources, gloves, vest, etc.

Further yet, if the volcano eruption is under control and, or if the user moves farther away from the site, or if it would start to rain, then the a/v recognition block/engine 1320 will generate the counter effect with low latency: Another unique tag for the event, compute another pixel proximity score 1320*c*, pixel color score 1320*a*, pixel velocity score 1320*b*, and, or an audio score 1320*d*, which may corresponds to a series of another set of output commands 1330*b* thus, comprising a less burning sensation, less warm air and a fainter eruption, flowing, or crackling sound. Furthermore, as the user experiences a character from the program moving farther away from the volcano or if it would start to rain heavily, the erupting volcano event may eventually be scored across all parameters below a predefined threshold, thereby no longer commanding any one of the modulating effects. In an alternative embodiment of the invention, an odor recognition tag may be incorporated into the a/v recognition block/engine 1320 to score an odor haptic output from an odor dispersing device. Also, alternatively, latency may improved between effect and counter effect by simply commanding an inverse voltage applied to a motor output of any of the relevant peripheral devices to effectuate the counter effect with a quicker response time and reducing the latency between the effect-counter effect user experience.

Additionally (also not shown), in another embodiment of the invention, the system, may comprise a feed-forward and, or back-propagated neural network to use a series of externally captured buffers containing known audio-visual sources to aid in real-time recognition of the audio and video input by using a probabilistic approach to determine presence in a captured buffer. The audio/video input events may be tracked in a current frame and stored in a computer processor database for machine learning objectives. A classification algorithm may be based on supervised machine learning techniques such-as SVM, Decision Tree, Neural Net, Ada Boost, and the like. Further, the classification may be performed by analyzing one or more features based on any one of, or combination of, a stored data input, stored tagged event, stored coefficient value, stored event proximity score value, stored pixel color score value, stored pixel velocity score value, stored audio score value, and, or haptic output command 1330*b*.

In another embodiment of the present invention, the classification algorithm may employ an unsupervised machine learning to learn the features from the image input data itself. For example, a Neural Network Autoencoder can be used to learn the features and then to train a Deep Neural Network or a Convolutional Neural Network. The classification algorithm may be based on a supervised or an unsupervised machine learning technique, and the classification is performed by analyzing one or more features of the tracked objects. Examples of the one or more features include, but are not limited to, a size, an aspect ratio, a location in the scene, and other generic features such as color, HoG, SIFT, Haar, LBP, and the like. Typically, the object classification algorithm is executed on top of object tracking algorithm and it allows to localize search region, thus decreasing the amount of computation. Such approach results in reducing power consumption and/or increase the detection speed and accuracy.

In one embodiment, the machine learning systems may differentiate between background events and foreground events dynamically. Input frames may correspond to complex scenes that include areas with significant background variations/continuous movements. However, these variations and continuous movements should not trigger a modulation since they are background events, and not foreground events, such as flying birds, swaying tree branches, moving clouds, etc. The system, referencing a background event cache, can label the event as a background event, bypassing the need for the a/v recognition block to tag and compute the event (event proximity score). Furthermore, based on this background event referencing, events may be labeled as background, even if they appear in the foreground and score a threshold-grade proximity score. For instance, a moving cloud passing over a rushing waterfall should not interfere with the haptic expression profile of the rushing waterfall, despite the fact that the moving cloud may impair the pixel color score of the rushing waterfall. The moving cloud would be detected as a background event based on background event cache referencing, and subsequently, the final pixel color score of the rushing waterfall would account for the moving cloud. The background event cache may further differentiate between static background events and dynamic background events. In an embodiment, a different algorithm/s may be applied for depending on the background event be labeled as static or dynamic.

In an embodiment, once the background event is extracted out, then remaining events in the input frame may be referenced from a foreground event cache, once at least one parameter triggers the event. As with the background event referencing, an algorithm/s may be applied for a current triggered event in the input frame, and foreground event bins with similar event/score features as the current event are identified. Event triggering and haptic output expression based on the a/v recognition block or machine learning may be based on threshold calculations employing a Local Adaptive Thresholds (LAT) technique and the threshold may be adapted dynamically.

In one embodiment, the cache of events or scores corresponding to events are constantly updated over time. For example, the cache is updated to handle gradual time variations (such as night/day changes), and a plurality of other background events (moving clouds/sun, shadows, weather, etc.). Moreover, the cache update may also involve spatial changes (neighboring pixel changes) within the input frames. To this end, background changes can be accounted for by the system using these learned approaches and not affect the haptic expressions of the targeted foreground events. For instance, the rushing waterfall should translate for a similar haptic expression or profile, irrespective of changes in lighting or color due to variations in time of day, weather, or cloud coverage, etc.

In other embodiments, in addition to classifying events as background or foreground, events may be further classified in terms of category, such as animal, human, projectile, natural phenomenon, crafts, vehicles, etc. Categorization may be based on at least one visual and, or audio aspect: color, size, aspect ratio, etc. In another embodiment of the present invention, the categorization algorithm categorizes the event, supervised by machine learning, and then inserts into categorized bins within either the background event cache or foreground event cache. Furthermore, machine learning approaches, such as a Deep Neural Network or a Convolutional Neural Network, may match a live event feature or score parameter to a cached event in any one of a category event bin within the background event cache or foreground event cache.

Figure 14:
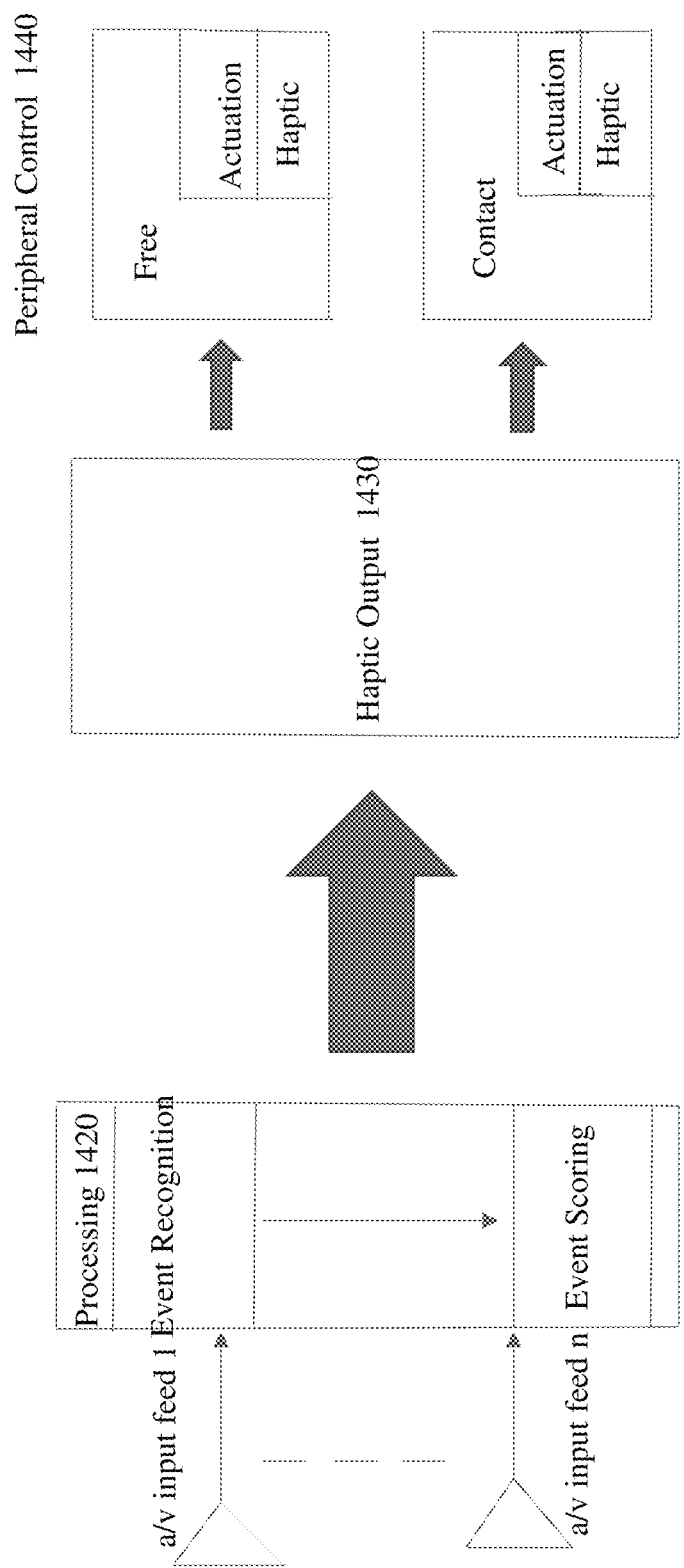
FIG. 14 is an interaction flow diagram of the peripheral modulation of the unscripted feed in accordance with an aspect of the invention.

Now in reference to FIG. 14. FIG. 14 shows the overall interaction flow of the recognition engine 1420, output 1430, and peripheral device controls 1440, in accordance with an embodiment of the present invention. The figure illustrates a system for processing an audio and video input from an unscripted programming feed (original programming and, or live feed) for modulating a peripheral device (in physical contact or free from at least one user), the system comprising: at least a first device and at least one peripheral device in short-range or networked communication with one another, wherein the engine 1420 is configured to receiving at least one of a video or audio signal from at least one of an original programming feed or live feed; and generating a triggering signal in response to the at least one of the video or audio signal from the at least one of the original programming source or live feed that match or exceed a threshold score for a scored event and triggering or controlling at least one modulation of the at least one peripheral device by the output 1430, thereby enabling modulation of the at least one peripheral device 1440 corresponding to at least one of the programming feed or live feed not scripted with a modulation trigger.

While not shown in FIG. 14, the at least first device may be coupled to a display screen for user viewing and the at least first device may be in communication to the at least one peripheral device in physical contact with the at least one user or free from the at least one user for triggering at least one of a modulation (actuation or haptic effect) 1440. In a preferred embodiment, the at least one peripheral device is a device for controlling viewing operation of the at least one of the original programming feed or live feed displayed on the screen coupled to the at least first device. At least one of the audio or video input from at least the first device that outputs an audio and, or video signal during operation is in its original programming feed form or live feed form for triggering or controlling at least one of a modulating effect (actuation or haptic effect) from a peripheral device 1440 in physical contact with the at least one user or free from the at least one user, wherein the at least first device and peripheral device are the same device. For instance, the first device and peripheral device 1440 may be the same mobile phone or tablet giving off a tactile feedback, sound feedback, or light feedback in response to a programming event, without having triggering cues embedded in the programming corresponding to said feedback.

Alternatively, the system may further comprise a plurality of peripheral devices (similar or heterogenous) 1440 with at least one in physical contact with the at least one user or free from the at least one user and in communication to the same original programming feed or live feed from the at least first device. The plurality of peripheral devices 1440 may be modulated to disperse a synergistic effect or heterogenous effect delivering an enhanced immersive experience corresponding to the programming.

In one embodiment, the at least first device is playing a programming feed comprising audio signals with a frequency imperceptible to a human ear (sub-audio), whereby the sub-audio signal triggers or controls the modulation effect from the at least one peripheral device in physical contact with the user or free from the user.

Preferably, the at least first device is at least one of a computing, gaming, streaming, television, or audio or video playback device playing an original programming feed and the at least one peripheral device 1440 in physical contact with the at least one user is at least one of a haptic triggering glove, thimble, vest, jacket, wearable, watch, mobile phone, tablet, joystick, toy, erotic toy, game controller, interactive seat, head phones, or head gear. Modulating effects may range from tactile feedback, sound feedback, light feedback, air feedback, motion feedback, temperature feedback, olfactory feedback, etc. In another embodiment, the at least first device is at least one of a computing, gaming, streaming, television, or audio or video playback device playing an original programming feed and the peripheral device 1440 is free from the user and is at least one of a stand-alone haptic tower, heat lamp, fan, light source, light fixture, house alarm, or IoT hub. Modulating effects may range from tactile feedback, sound feedback, light feedback, air feedback, motion feedback, temperature feedback, olfactory feedback, etc.

In other embodiments, the at least first device is at least one of a camera, microphone, sensor, or audio or video capture for playing a live feed and the peripheral device 1440 in physical contact with the user is at least one of a mobile phone, biomedical tool, erotic toy, steering wheel, or automobile pedal. Modulating effects similarly range from tactile feedback, sound feedback, light feedback, air feedback, motion feedback, temperature feedback, olfactory feedback, etc. In yet other embodiments, the at least first device is at least one of a camera, microphone, sensor, or audio or video capture for playing a live feed and the peripheral device 1440 free from the user is at least one of an automobile alarm, house alarm, stand-alone haptic tower, heat lamp, fan, light source, light fixture, thermostat, or IoT hub. Modulating effects also similarly range from tactile feedback, sound feedback, light feedback, air feedback, motion feedback, temperature feedback, olfactory feedback, etc.

For instance, the at least one peripheral device 1440 may be an erotic device intended for sexual pleasure for at least one of a male or female comprising at least one of a sleeve-lined tube or phallic-shaped member with modulation to mimic at least one of a sexual act displayed from the programming played on the at least first device. For example, a user may engage the erotic device and experience the same pleasure experienced by the sex-engaged character from the programming in real-time. Therefore, the erotic device feedback mirroring sex-engaged characters is not limited to a trigger-embedded library of content, but rather, may be plug-n-played with any sex-driven programming. Alternatively, erotic devices may be in communication with each other and be engaged by remote users and receiving corresponding feedback in real-time.

In another example, the at least one peripheral device 1440 is at least one of a removable or fixed fixture of a light source with modulation to correspond to at least one of a display or audio of programming played on the at least first device. This may apply to home use or a larger venue setting with a congregation of people experiencing the same programming from the same first device (speakers, display wall, or live event). For instance, the lighting system and display system may be in coordination with the sound system without modulating triggers being embedded in the audio input. Therefore, the lighting and display for the club may plug-n-play with any audio output, without being restricted to a trigger-embedded library of content.

In yet another example, the at least one peripheral device 1440 is a mobile phone with modulation to correspond to at least one of a display or audio of programming played on the at least first device; and wherein the at least one peripheral device and the at least one first device are the same device. For instance, a user's mobile phone may vibrate every time a user's favorite team scores a goal while live streaming a soccer match. In this scenario, the user may configure output parameters to instruct the engine/system 1420 to drive the tactile/vibrational feedback strictly upon a user-selected team scores. In another scenario, output parameters may instruct the engine 1420 to drive the tactile/vibrational feedback upon a user-selected team scoring a goal, and drive a lighting/sound feedback upon a user-selected player scoring a goal.

In another embodiment, the at least one peripheral device is an interactive seat or chair with modulation to correspond to at least one of a display or audio of programming played on the at least first device. The interactive seat may be intended for home use or as part of a collection in a venue, such as a movie theater, concert hall, stadium, etc. The chair may vibrate, rock, pitch, yaw, roll, etc. as expressions of modulation in response to the system event recognition/scoring 1420/output 1430. In other words, the interactive seat/chair may provide motion and tactile/vibrational feedback corresponding to any programming, and not just to a library of content curated with embedded modulation triggers.

Audio input (sub-audio or supra-audio) may be visualized using computer vision aspects by converting the audio into a visual representation using FFT and STFT. Transforming a time-based signal into a frequency-based signal using the fast fourier transform (FFT) or short-time fourier transform. (STFT). Alternatively, a predefined buffer or 'wavelet' (snapshot of a waveform) may be used to search for the presence of a given frequency or signature in a time-based signal also. One may also look at the first and second derivatives of the individual frequencies. Instantaneous change, and rate of change. For all calculated coefficients, we calculate the 1st derivative, 2nd derivative, and sometimes 3rd derivatives. Computer vision may then look for patterns and feeding that data into machine learning to identify specific failure cases that may have non-linearities. For example, a failing ball bearing will have an audio pattern that will change over time. For industrial applications, you could listen to an oil pump or a fracking drill and be able to determine material hardness for rock you are drilling, or if you have a clog for when oil is being pumped through a pipe. As another example, FFT and STFT could convert an audio input into a visual representation for purposes to diagnose a mechanical or physiological ailment, in addition to driving a modulation of a peripheral device.

Figure 15:
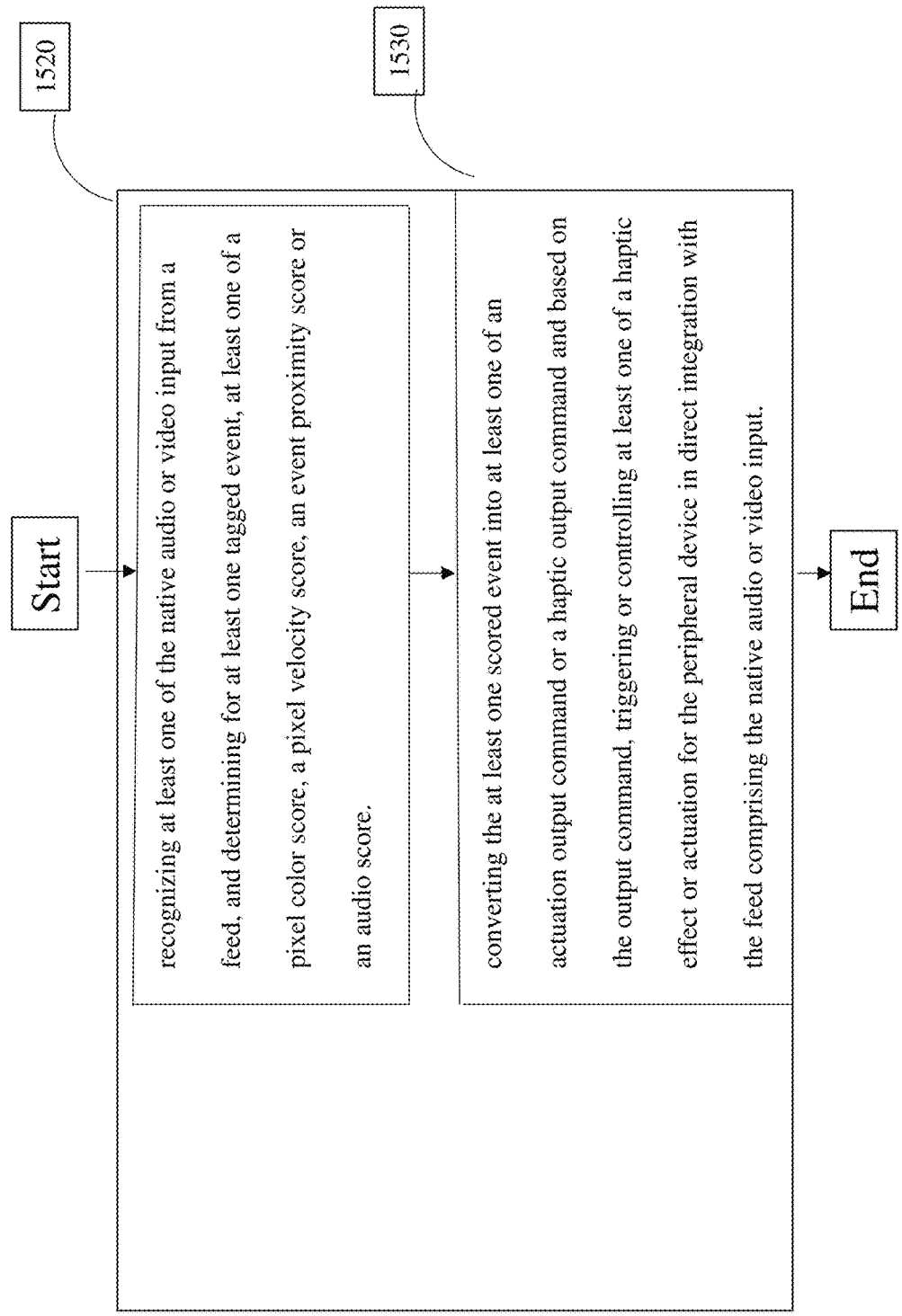
FIG. 15 is a method flow diagram of the peripheral modulation of the unscripted feed in accordance with an aspect of the invention.

In reference to FIG. 15, which depicts a method for processing at least one of an audio or video input for non-scripted modulation of at least one peripheral device, the method comprises the steps of: (1) recognizing at least one of the audio or video input from the at least one of the original programming feed or live feed, and determining for at least one tagged event, at least one of a pixel color score, a pixel velocity score, an event proximity score or an audio score 1520; and (2) converting the at least one scored event into at least one of an output command that triggers or controls a modulation effect of the at least one peripheral device in physical contact or free from the user in communication with the at least the first device playing the at least one of the original programming feed or live feed, thereby enabling modulation of the at least one peripheral device based on any programming comprising at least one of an audio or video input and not requiring scripted modulation triggers 1530.

In summation, modulation effects of peripheral devices are not triggered by embedding triggering cues via a developer kit or after-market coding (scripted programming feed), but rather, directly integrative to the original programming feed or live feed in a plug-n-play fashion via computer vision processing (unscripted programming feed)—thereby obviating content hurdles and opening the full library of a/v based programming in communication with a peripheral device. Content no longer needs to be limited to within provider and developer silos in order to be coupled to a fully immersive experience.

Figure 16:
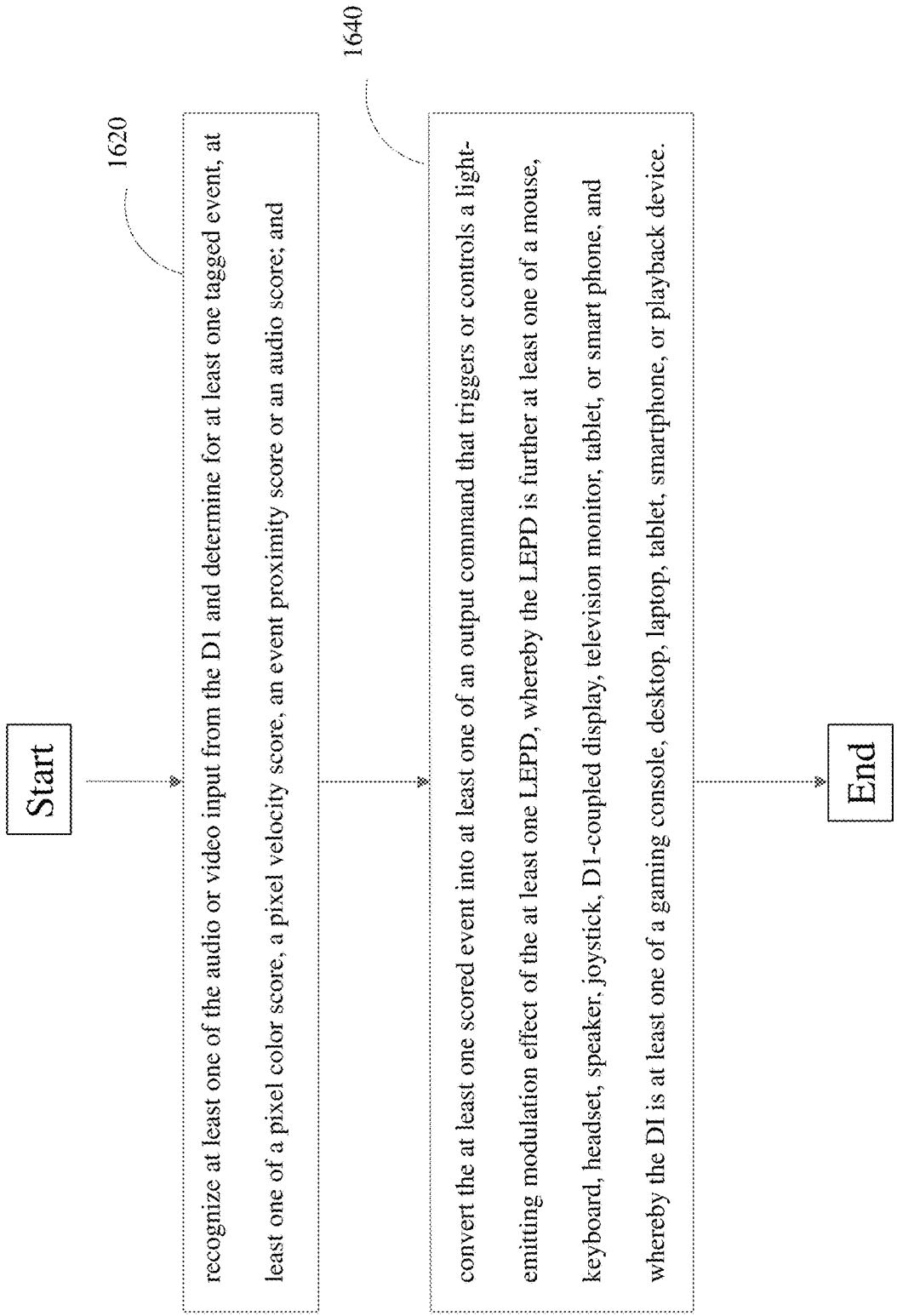
FIG. 16 is a method flow diagram of the light-emitting peripheral modulation of the unscripted feed in accordance with an aspect of the invention.

Now in reference to FIG. 16, which depicts a method flow diagram of the light-emitting peripheral modulation of the unscripted feed in accordance with an aspect of the invention. In a preferred embodiment, a method for processing at least one of an audio or video input for non-scripted light modulation of at least one light-emitting peripheral device (LEPD) comprises the steps of: (1) recognizing at least one of the audio or video input from at least one first device (D1) and determine for at least one tagged event, at least one of a pixel color score, a pixel velocity score, an event proximity score or an audio score 1620; and finally (2) converting the at least one scored event into at least one of an output command that triggers or controls a light-emitting effect of the at least one LEPD, whereby the LEPD is further at least one of a mouse, keyboard, headset, speaker, joystick, D1-coupled display, television monitor, tablet, smart phone, room light source, or home IoT (Internet-of-Things) hub, and whereby the DI is at least one of a gaming console, desktop, laptop, tablet, smartphone, playback device, television monitor, display, or home IoT hub 1640.

In other embodiments, the method may entail a first step of: recognizing at least one of the audio or video input from at least one first device (D1) and determine for at least one tagged event, at least one of a pixel color score, a pixel velocity score, an event proximity score or an audio score; and the last step of commanding a trigger or control over a light-emitting effect of the at least one light-emitting peripheral device (LEPD) upon a threshold-grade score. Examples of an LEPD may be at least one of a mouse, keyboard, headset, speaker, joystick, D1-coupled display, television monitor, tablet, smart phone, room light source, or home IoT (Internet-of-Things) hub. Examples of a D1 may be a gaming console, desktop, laptop, tablet, smartphone, playback device, television monitor, display, or home IoT hub. The LEPD and D1 may be in communication with one another using any number of short-range wireless or wired communication. Communication between the LEPD and D1 may additionally be achieved with a transit hub, such as a router, home automation hub, display, or any other communication interface. While LED's are a preferred light-emitting source, other sources may be disposed on any one of LEPD's, such as CFL's, Halogens, Incandescents, or any other light-emitting source to effectuate any number of light-mitting effects from a LEPD (described below).

Additionally, a system may be provided for processing at least one of an audio or video input for non-scripted light modulation of at least one light-emitting peripheral device (LEPD). The system comprises at least one LEPD in at least one of physical contact or free from at least one user and in communication with at least a first device (D1) playing programming; a processor; a memory element coupled to the processor; a program executable by the processor to: recognize at least one of the audio or video input from the D1 and determine for at least one tagged event, at least one of a pixel color score, a pixel velocity score, an event proximity score or an audio score; and convert the at least one scored event into at least one of an output command that triggers or controls a light-emitting effect of the at least one LEPD, whereby the LEPD is further at least one of a mouse, keyboard, headset, speaker, joystick, D1-coupled display, television monitor, tablet, smart phone, room light source, or home IoT (Internet-of-Things) hub, and whereby the DI is at least one of a gaming console, desktop, laptop, tablet, smartphone, playback device, television monitor, display, or home IoT hub.

In yet other system embodiments, a system may be provided for processing at least one of an audio or video input for non-scripted light modulation of at least one light-emitting peripheral device (LEPD), wherein the at least one LEPD in at least one of physical contact or free from at least one user and in communication with at least a first device (D1) playing programming; a processor; a memory element coupled to the processor; a program executable by the processor to: recognize at least one of the audio or video input from the D1 and determine for at least one tagged event, at least one of a pixel color score, a pixel velocity score, an event proximity score or an audio score; and command at least one of a trigger or control over a light-emitting effect of the at least one LEPD upon a threshold-grade score.

In some embodiments, the at least one LEPD may be a device for controlling operation of at least one of an original programming feed or live feed displayed on the screen coupled to the at least one D1, such as keyboard, mouse, tablet, or joystick. The at least one D1 and the at least one LEPD may be the same device. In some configurations, a plurality of LEPD's may be in communication to the at least one D1, such as an array of lighting sources/fixtures. Further, the arrayed configuration may comprise a plurality of LEPD's with at least one in physical contact with the at least one user and in communication to the at least one D1. For instance, the array of lights may emit light in synchrony or in concert with a light-configured keyboard or joystick for a heightened sensory experience. In yet other configurations, a plurality of LEPD's with at least one free from the at least one user and in communication to the at least one D1 may be possible. For instance, a headset and keyboard may emit light in synchrony or in concert with a light source/fixture or an array of light sources/fixtures to achieve the heightened sensory experience.

In some embodiments, the at least one D1 may further comprise at least one of a camera, microphone, sensor, or audio or video capture for playing a live feed and the at least one LEPD in physical contact with the user is at least one of a mobile phone, biomedical tool, erotic toy, steering wheel, or automobile pedal. In yet other embodiments, the at least one D1 is at least one of a camera, microphone, sensor, or audio or video capture for playing a live feed and the at least one LEPD is free from the user and is at least one of an automobile alarm beacon, house alarm beacon, stand-alone haptic tower, heat lamp, light source, light fixture, thermostat, or IoT hub.

In some embodiments, a processor may further be configured with specific modules to perform the recognition of the input for the tagged event, and then trigger or control the light-emitting effect of the at least one LEPD based on the scored tagged event being above a pre-defined threshold. In an embodiment (not shown), the processor may comprise of at least one of an a/v recognition block (recognition block), a conversion block, and a controller (modulator). The recognition block (engine) determines a proximity score of the tagged event by determining the distance from any one of, a selected target zone comprising the event and, or a selected destination zone comprising the user, within a matrix of zones that occupy the entire field of view and, or sound. The recognition block may further determine a pixel color score of the tagged event by calculating an average hue score of the tagged event using pixel data in a screen buffer by calculating a nearness coefficient, calculating an average of color channels in the screen buffer, calculating an offset coefficient, calculating an average luminance in the screen buffer and deriving the average pixel score of the tagged event based on an aggregation of the coefficients. Pixel velocity scores of the tagged event are calculated based on the coefficient by capturing a series of frames, and calculating a coefficient related to pixel velocity by testing the per-frame and per-range delta in any one of, or combination of, hue, luminance, brightness, saturation and, or color value. Further yet, an audio score of the tagged event may be determined based on a coefficient by capturing an audio buffer and calculating an Average Energy, Immediate Energy, Immediate Energy Delta & Immediate Energy Mean Deviation and further, calculating a coefficient related to broad and narrow changes in a frequency spectrum.

Further yet, in an embodiment of the invention, the conversion block (engine) may apply a scoring rule for the conversion of at least one threshold-grade scored event into a light-emitting output command. Further yet, the conversion block is further coupled to a controller (modulator), which further, processes the light-emitting output command for actuating at least one of a trigger or control of a light emitting effect of any peripheral-whether it be in physical contact or free the at least one user. Furthermore, the processor/recognition block/conversion block/controller/modulator/engine may comprise a feed-forward and, or back-propagated neural network trained to trigger an output based on any one of, or combination of, a stored data input, stored tagged event, stored coefficient value, stored event proximity score value, stored pixel color score value, stored pixel velocity score value, stored audio score value, and, or stored output command. In some embodiments, the recognition block may tag at least one event for scoring by at least one of, motion, shape, color or sound. In yet other embodiments, the recognition block may score at least one event for at least one of a pixel color score, pixel velocity score, pixel proximity score, or audio score.

The following is an exemplary list of displayed events that can be recognized to trigger lighting effects (LEDs) on any host of LEPD's to augment the experience:

Displayed Events:
1. Fire
2. MotionFlow—visualizing motion through space: flying, sky diving, walking, running, etc.
3. Lightening
4. Looking down gun barrels
5. Being underwater
6. Getting health or using a health pack
7. Getting into a vehicle
8. Recognizing a vehicle
9. Recognizing a flying vehicle
10. Recognizing a motorcycle
11. Recognizing objects—frying pan (Pubg), camp fire (fortnite), Bouncy launcher (fortnite)
12. Taking damage
13. Special attack indicator
14. Looking at menus
15. Looking at inventory Specific Displayed Events/Elements:
1. Apex Legends/Razer Chroma
   a. Opening Apex packs and rewards
   b. Notifications as you fire, heal and take damage
   c. Alerts when your ultimate is ready
   d. Smoke trails when skydiving (Apex Legends)
   e. Pick up loot of different rarity (i.e. white, blue, purple, gold)
2. Assassin's Creed/MSI Ambient Link
   a. Blocking an attack
   b. Skill effects
   c. Health skill use
   d. In game events
   e. Looting stuff f. Getting hit, etc.
3. Call of Duty: Black Ops 4/Asus Aura
   a. Under water elements detected with blue keyboard
   b. Timer count down on keyboard LED's
   c. Meters for life, etc., indicated by light on any keyboard keys
   d. Blackout circle flashes keyboard white
   e. Player death results in red keyboard Light-Emitting Effects Driven:
1. Output a nova on the keyboard
2. Output a sparkle on the keyboard
3. Raining effect
4. Outward "spiral" effect
5. Wave effect
6. Inward collapsing effect
7. Rainbow effect
8. Emojis (smiley face lit on the keyboard upon a victory; poop emoji lit upon a defeat)
9. Slashing sword effect across the keyboard
10. Strip sliding across the keyboard Now in reference to FIG. 17—an exemplary process flow diagram illustrating the customizable and immersive effect delivery in accordance with an aspect of the invention. In one embodiment, the end-user of the customizable immersive effect from a rendered web-page begins by entering a script input from any one of a basic script language (HTML, HTML5, Javascript (JS), or any graphics element using Javascript, such as Canvas) for custom-tuning effects from an end peripheral device (EEPD/LEPD) 1702. Any one of a low-coding language, other than HTML or JS, may be used as well, provided the rendering module is configured with an interpreter for it. This end-user script (EUS) input may be performed on a layer imported, loaded or exported onto a browser page. The end-user may enter any one of the aforementioned script—each with a low-barrier of coding-allowing for the end-user to ad-hoc create an effect, ad-hoc create an interface switch or control for an effect, or post-hoc refine/augment an existing interface switch or control 1706. Certain meta-information in the EUS may command for this. For example, an end-user may input a meta-tag to create a slider or slide bar as a color gradient for choosing the specific color to be rippled onto the end peripheral-enhancing/tuning the already existing limited text-based listing of colors. This switch/control creation or tuning may be performed prior to or after the rendering module renders the web-browser page-post EUS.

In one embodiment, a processor (rendering module) is configured to interpret the EUS 1704 and render the web-browser page or web-page into at least a two-dimensional effects plane 1707 subject to a geo-positional transform/scaling of virtual EEPD/LEPD and screen region grabbing 1708 by a transformer/grabber module. Any one of these modules, interpreters, compilers, etc. may be any one of, or combination of, software, firmware, or hardware, performing at least one of parsing or executing stored pre-compiled machine-independent code, linked at run-time, resulting in the rendered effects plane or stage-subject for transforming and screen region grabbing—for translating the virtual effect/device into the physical environment surrounding the end-user. Traditional methods are heavy and typically need to be compiled. For example, C/C++ logic is converted to machine code and carries all the weight and complexity of the target application with it. Interpreted languages do not require 'compilation', but rather, are loaded on the fly. While performance may be effected when 'loaded on the fly', all signal processing and analytics may be performed in C/C++, and then exposed to a browser (where rendering has been the primary focus for a long time, and the technology is fast for drawing), thus availing of the best of both worlds. Furthermore, there isn't a need to install an interpreter or virtual machine (as you would with python, java, or some other interpreted languages).

In one embodiment, a method for controlling at least one light-emitting peripheral device (LEPD) for an immersive light effect comprises the steps of: providing a web-browser page interface configured for script input (EUS) 1702 for adjusting any one of an aspect of the immersive light effect 1706 from the at least one LEPD; rendering the script-inputted web-browser page to an off-screen buffer 1704 visualized as at least a two-dimensional effects plane 1707; applying a geo-positional transform and scaling of virtual LEPD's within the effects plane and capturing at least a region of the rendered webpage 1708; and controlling a light effect emitted from the at least one LEPD 1709 corresponding to the effects plane transformed/scaled virtual LEPD and captured region of the rendered web-browser page.

Figure 17:
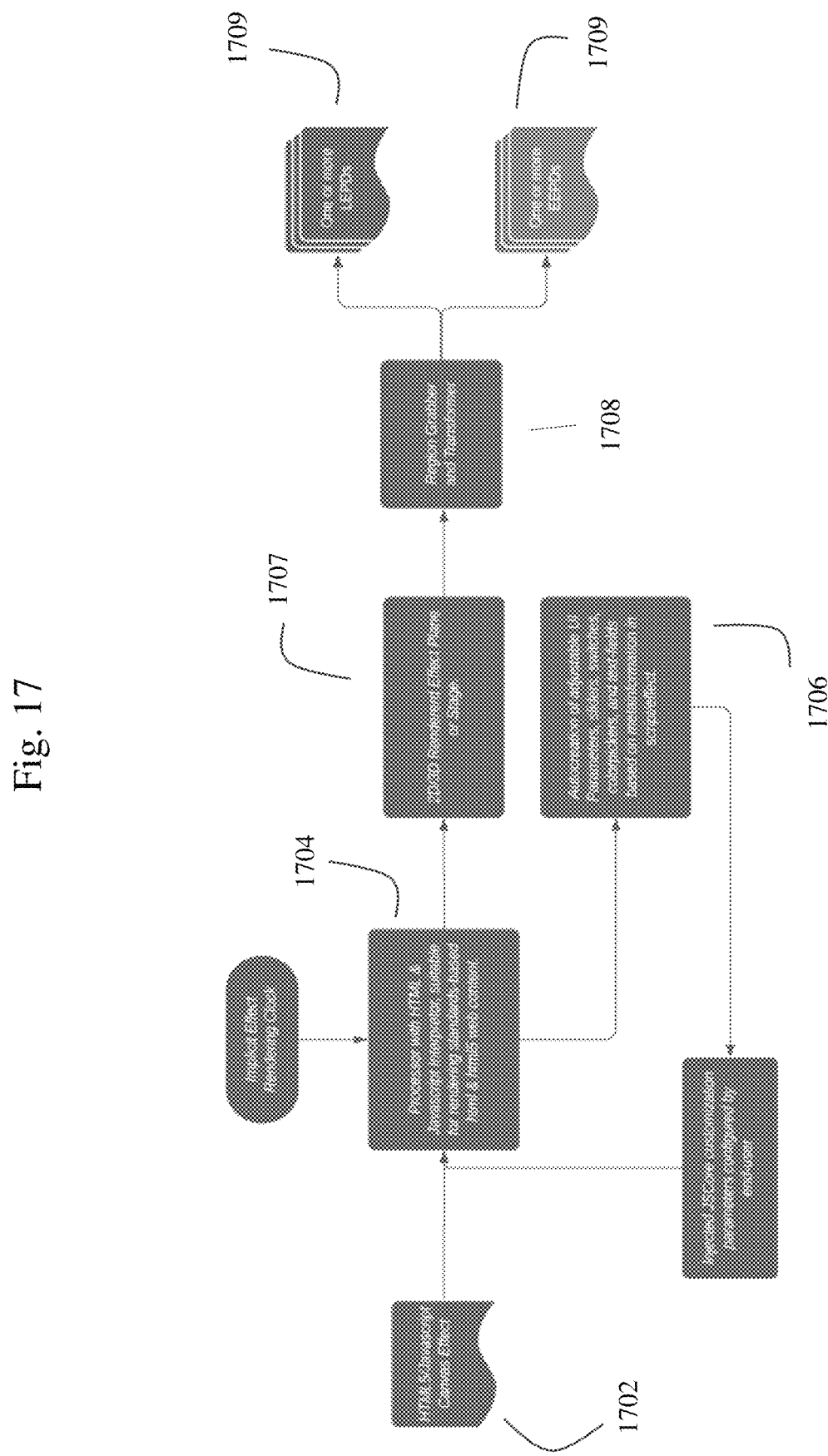
FIG. 17 is an exemplary process flow diagram illustrating the customizable and immersive effects delivery in accordance with an aspect of the invention.

As shown in FIG. 17, the end peripheral devices 1706 may include for any effect-emitting peripheral device that may be geo-positionally tracked and scaled on the at least two-dimensional effects plane for physical surrounding correspondence. This may include for LEPD's, such as light-emitting (LED) strips, keyboards, bulbs, along with EEPD's, such as haptic vests, and heated air-dispensing devices. The interface for EUS (optionally, script layer) may be an application running on a processor or microcontroller and may be imported, exported, or pre-loaded onto the web-browser page.

Figure 18:
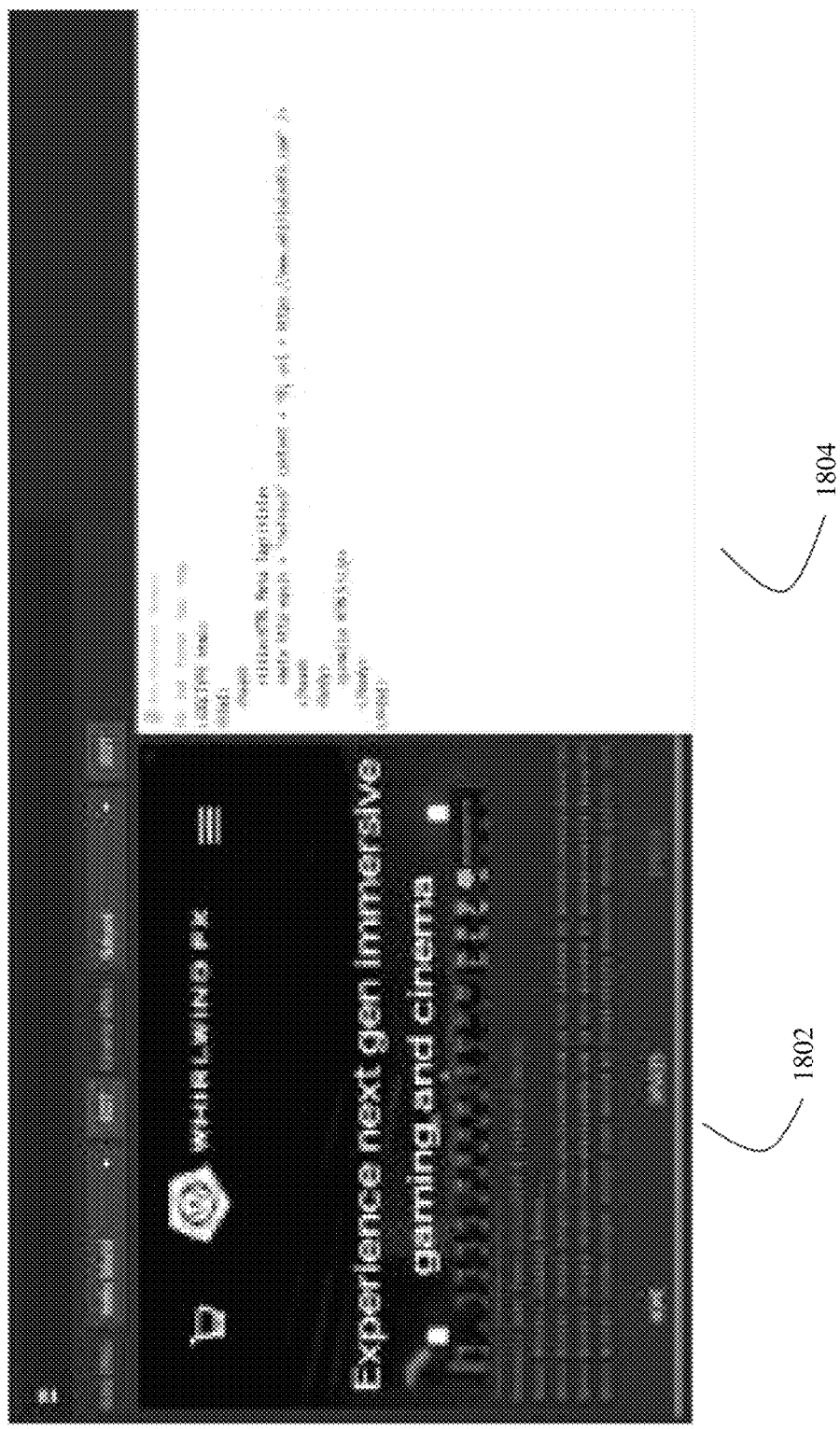
FIG. 18 is a screenshot illustrating an exemplary script layer on a web-browser page for delivery of the customizable and immersive effects in accordance with an aspect of the invention.

The script layer 1804 may appear as a split-screen with the directed/imported/loaded web-browser page 1802 (see FIG. 18—screen shot illustrating an exemplary script layer on a web-browser page for delivery of the customizable and immersive effects in accordance with an aspect of the invention). While somewhat difficult to ascertain from FIG. 18, shown to illustrate the point, an end-user may load the script layer "Hello World.html" which contains the text "Hello World" 1804. The end-user would then load a local html file that redirects to the homepage for Whirlwind VR for content 1802 displayed adjacent to the script layer. For all intents and purposes, the method is rendering a webpage that may orchestrate or ripple any number of immersive effects on any type of end peripheral (LED strips, keyboards, game-play controllers, etc.) based on the transform/scale/content within the region grab. The web browser page may be any processing block rendering websites by processing script input and converting it to user-facing content on a local client. The script layer 1804 is plugging in custom features to this 'web browser' for handling controllable parts of the effect. For example, if you add a special tag to the html effect it automatically ripples into the application UI and is exposed to the end-user as an option-either de novo or an enhanced add-on. For example, if the end-user inputs the following EUS:

<meta property="speed" label="Rainbow Speed" type="number" min="1" max="10" default="0">

The above EUS creates a slider control in the UI for the end-user to achieve a desired effect. Additionally, a corresponding object in JavascriptCore called 'speed' may be created, and may be subsequently queried it to ascertain how fast the effect runs. Other controls that may be scripted for in the UI may be drags, drops, clicks, dials, color pickers, color wheels, switches, coordinates, text fields, or any visual depiction of effect choices to select from. The visual depictions of effect choices may be adjustable for at least one of a color, hue, effect, effect speed, threshold-based, or audio-based. The advantage with the EUS and rendering of a scripted webpage is that the end-user can create customized complex effects in their physical surrounding, all while created from a single file. Furthermore, the control software/system and ensuing methods does not need to be recompiled to render the effect. Lastly, the system/method can load the desired effect from a remote URL if desired, with no local script required. In one embodiment of this, a library of effects may be stored, previewed, and loaded, without the need to EUS de novo.

While not shown in FIG. 17 or 18, in other embodiments, an EUS layer or EUS is not required, and just content from the grabbed rendered web-page and the basic UI effects controls without scripted customization may ripple the desired effects. The content may be static (pre-scripted with effect triggers), dynamic (not pre-scripted with effect triggers, rather relying on a computer vision-CV-analysis of at least one of pixel color score, pixel proximity score, pixel velocity score, pixel motion, zone color, zone motion, audio score, audio intensity score, audio spectral density, etc.), or inert (neither pre-scripted with triggers, nor relying on CV techniques to determine triggers). In yet other embodiments, EUS and content from a grabbed rendered webpage may not be required, and simply grabbed rendered webpage of standard effects.

Figure 19:
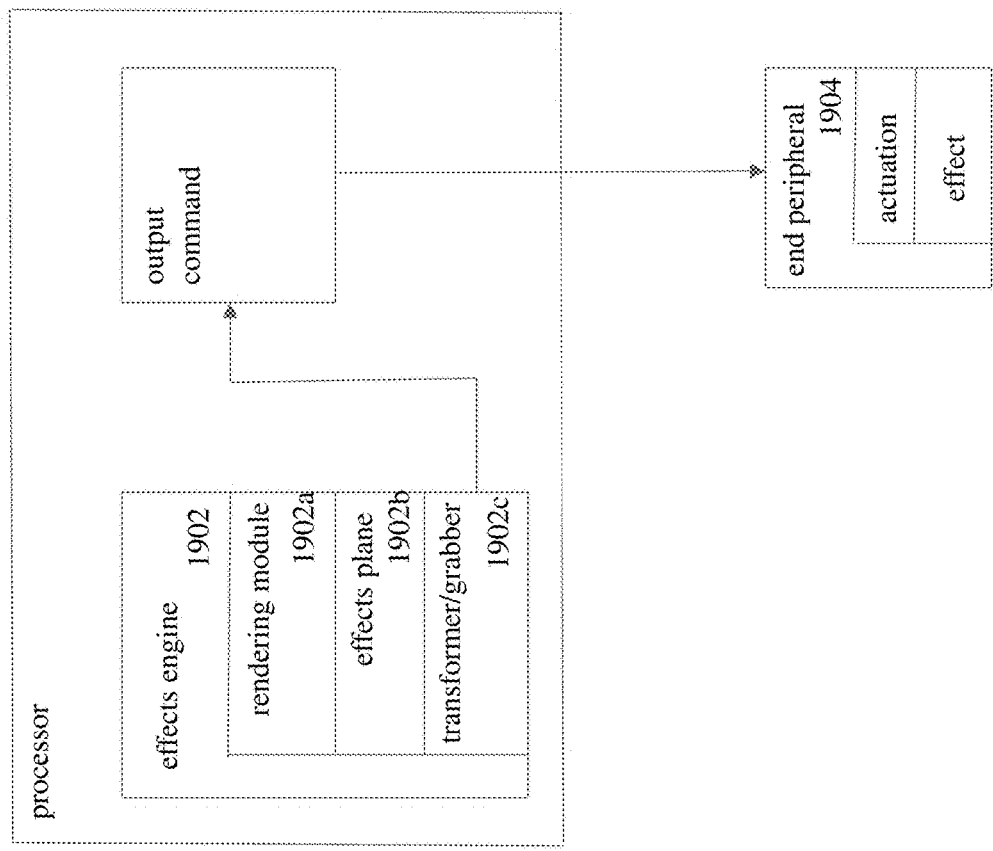
FIG. 19 illustrates a block diagram of an exemplary system in accordance with an aspect of the invention.

Now in reference to FIG. 19, which illustrates a block diagram of an exemplary system in accordance with an aspect of the invention. As shown, the system comprises a processor (effects engine 1902) further comprising a rendering module 1902a, an effects plane 1902b, a transformer/grabber 1902c. The modules interact to achieve a specific routine/sub-routine for controlling at least one effect-emitting peripheral device (EEPD) for a customizable and immersive effect. The effects engine layers at least one of a static, inert or dynamic content from a web-browser page with at least one of an end-user script (ESU) input for custom effects or standard effect requests via a standard user-interface input. The rendering module 1902a renders the scripted web-browser page to an off-screen buffer visualized as at least a two-dimensional effects plane 1902b. In one embodiment, the transformer/grabber 1902c enables the end-user to apply geo-positional transform and scaling of virtual LEPD's within the effects plane and capture or grab at least a region of the rendered webpage. In an embodiment, a customized EUS effect is emitted from the at least one EEPD or end peripheral 1904 corresponding to the captured/grabbed region of the web-browser page featuring an effect or content and the corresponding effects plane 1902b transformed/scaled.

For example, consider a scenario of an erupting volcano within a grabbed region of the rendered web-browser page, wherein the grabbed content is EUS/transformed/scaled/CV-recognized by the system to ripple a gradient of red-orange light in an irregularly cascading fashion starting from a top right corner of a back-display adhered LED strip down to the right portion of the end-users keyboard and finally trailing down to an LED strip adhered to a wall-floor mold behind the user. Based on the following EUS for a cascading effect to correspond to volcanic eruption/lava flow; and geo-positioning/scaling of LED strips, keyboard, and heated air-dispensing device for maximal dramatic effect for devices or portions of devices positioned on top, to the right, and behind the user, the visual scene of a volcanic eruption and lava flow within the grabbed region will be CV analyzed to perceive heat, eruption sound, flowing sound, rumbling sound, crackling sound, eruption color, lava flow color, wind velocity, burning sensation, flying debris, and sudden impact, etc. to ripple the rendered effect from the real-world end peripheral devices Furthermore, as the red-orange light cascades from top to bottom in an irregular fashion—along the right side of the user, the heated-air dispensing device positioned on the right of the user will activate as the virtual volcanic eruption is closest to the virtual user or character from the viewing experience. Further yet, if the volcano eruption is under control and, or if the user/character moves farther away from the eruption site, then the effects engine will counter-effect by restoring the base-line (pre volcanic eruption) conditions (less warm air dispensed, fainter eruption, crackling, or lava flowing sounds, and a restoration of the ambient lighting).

Figure 20:
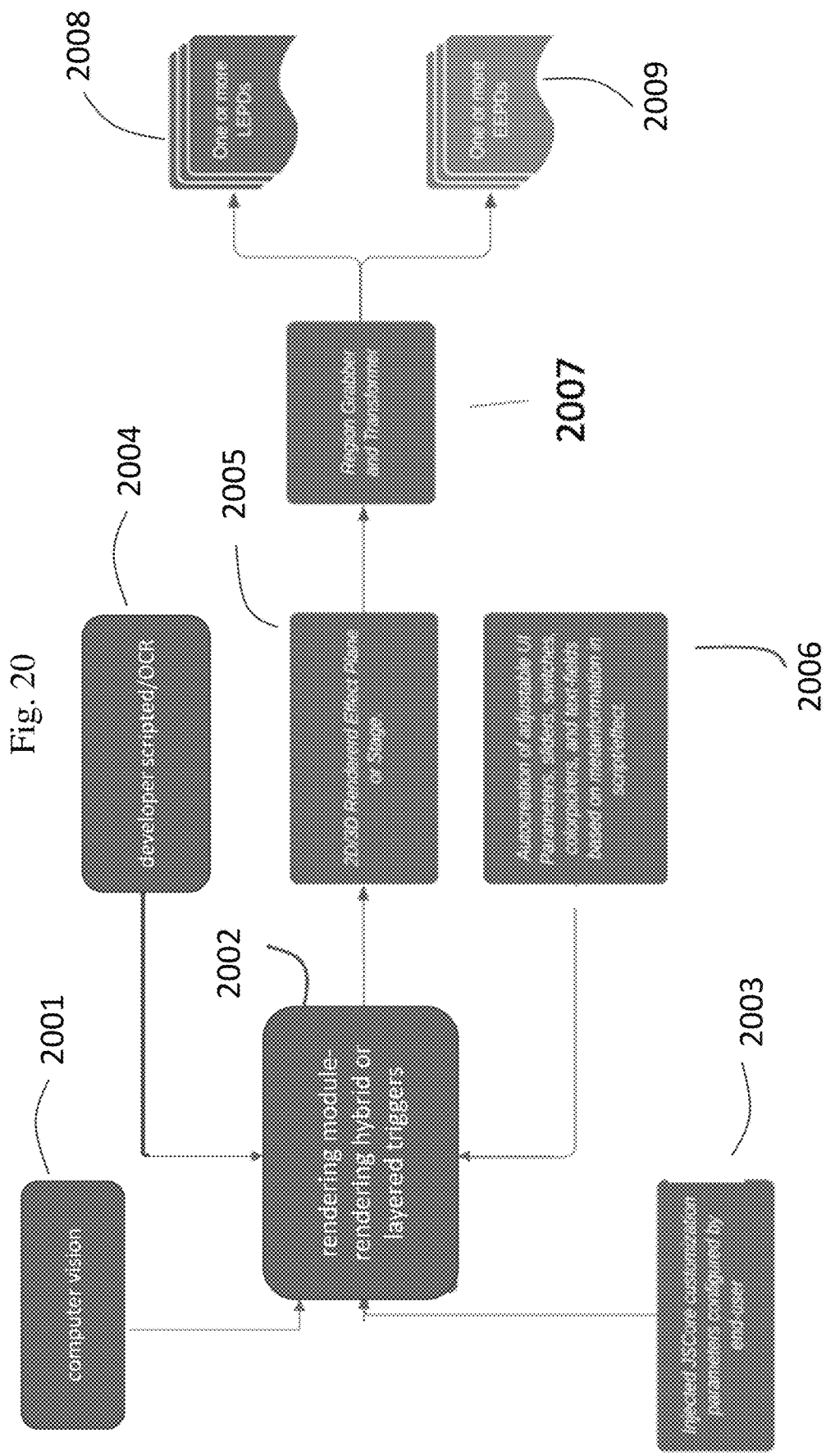
FIG. 20 is an exemplary process flow diagram illustrating the customizable and immersive effects delivery in accordance with an aspect of the invention.

Now in reference to FIG. 20—illustrating an exemplary process flow of the effects engine in accordance with an aspect of the invention. The effects engine/rendering module renders combinatorial/layered effects mirrored onto end-devices (light-emitting devices, inter alia) based on hybrid triggers (combination of different triggers in any sequence and/or concurrence) embedded/coded/scripted/computer-vision (cv) activated from an audio/video game/video output. As shown in FIG. 20, the system comprises a rendering module and a transform/scale module, and optionally, a peripheral device controller or control system. Collectively, the system or method provides for coordinated delivery of effects onto an end peripheral device based on a captured region and transformed/scaled application 2007. The end peripheral device, or effects-emitting peripheral device (EEPD), may encompass the LEPD (RGB-keyboard, mouse, head-set, PC/console tower, PC/console tower components, light-diode strip, bulb, etc.), along with any one of a haptic device, such as a controlled air-dispensing device, haptic vest, etc. 2008.

As a result, an end-user, with just minimal coding/scripting (html, Java) experience, may script customized and complex effects 2003—layered with other triggers such as developer-coded triggers for specific elements/events/alpha-numeric characters 2004, user-adjusted/dialed/slid basic effects 2006, or computer vision techniques (pixel analysis) 2001—driving combinatorial/layered effects from EEPD's 2009 mirroring a grabbed region of the rendered, transformed, and scaled display of the digital canvas-positioned virtual device 2005 of the physical EEPD 2009. The end result of the combinatorial/layered effects from this hybrid trigger approach (Hy-Fx) is the countering of false positives and latency of effects from an end-device during a viewing/gaming experience—both of which severely restrain a user from experiencing total immersion. To this end, the Hy-Fx solution additionally offers options for delivery of complex combinatorial/layered effects that may be rippled from end-devices mirroring/corresponding to key elements/events from the engaged content.

Figure 21:
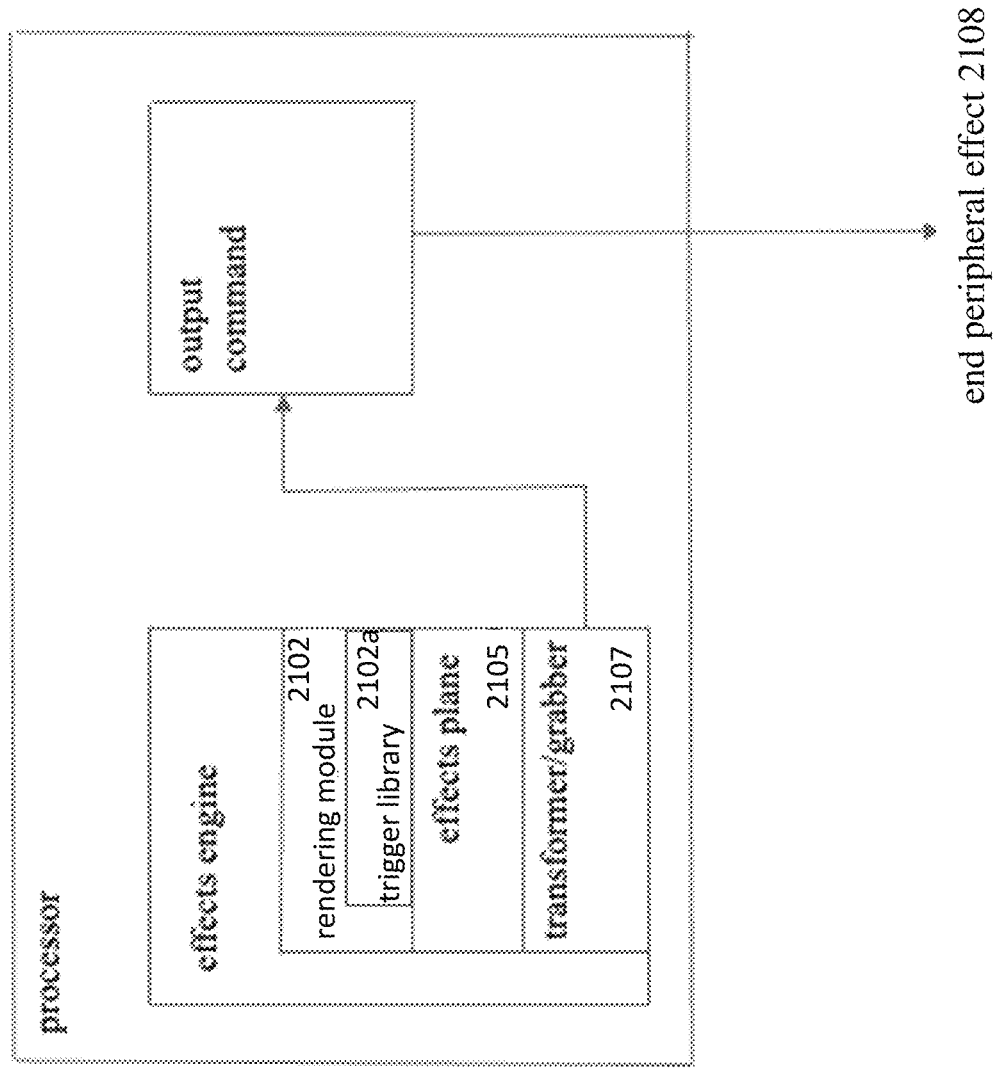
FIG. 21 illustrates a block diagram of an exemplary system in accordance with an aspect of the invention.
Figure 22:
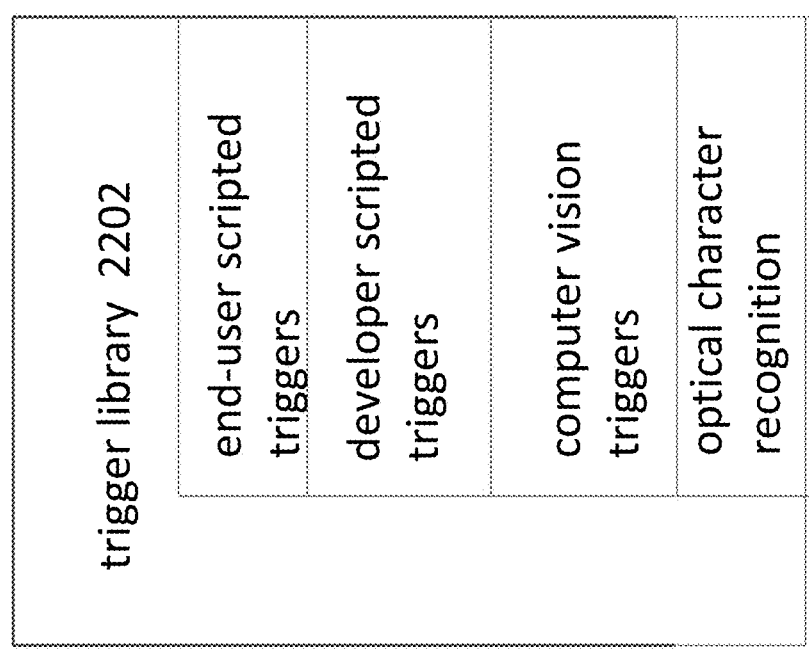
FIG. 22 illustrates a block diagram of an exemplary system in accordance with an aspect of the invention.

FIGS. 21 and 22 illustrate a block diagram of an exemplary system in accordance with an aspect of the invention. In a preferred embodiment, the Hy-Fx system comprises at least one end-device (E-D) or peripheral device in communication with at least a first device (D1) outputting audio/video programming; a processor; a memory element coupled to the processor; a program executable by the processor to: position a virtual representation of the E-D on a digital canvas displayed on a D1-coupled display representing a user's physical and virtual space; and capture from a corresponding region of the virtual space for modulating an effect 2108 on a corresponding portion of the E-D based on a combination of at least two different triggers 2102a/2202 recognizing the a/v element (health meter icon/alpha-numeric (circle, needle, bar, range, etc.), score, kill meter icon/alpha-numeric, ammunition level icon, etc.).

Alternatively, the capturing from a corresponding region of the virtual space for modulating an effect 2108 on a corresponding portion of the E-D may be based on a combination of different triggers 2102*a*/2202 recognizing a/v events in the gaming/viewing experience (volcanic explosion, weapon firing, shots taken, etc.).

In other embodiments, the capturing from a corresponding region of the virtual space for modulating an effect 2108 on a corresponding portion of the E-D may be based on a combination of different triggers 2102*a*/2202 recognizing a/v events and a/v elements in the gaming/viewing experience (health meter icon/alpha-numeric, score, kill meter icon/alpha-numeric, ammunition level icon volcanic explosion, weapon firing, shots taken, etc.). In yet other embodiments, the capturing from a corresponding region of the virtual space for modulating an effect 2108 on a corresponding portion of the E-D may be based on a single trigger 2102*a*/2202 recognizing either an a/v event or an a/v element. It should be appreciated by a person of ordinary skill in the art that any sequence or temporal scheme of a/v events and/or elements triggering the combinatorial/layered effects (light modulation) 2108 from the E-D (RGB-keyboard, mouse, console/PC tower) may be possible by the Hy-Fx system/engine. To reiterate, the combinatorial/layered effects resulting from the single, combination, or combination of different a/v element—a/v event triggers from the Hy-Fx engine delivers a versatile array of complex, multi-dimensional effects (dynamic lighting, etc.) on any one of an E-D (RGB-keyboard, etc.) to further enhance the immersive experience during content engagement (role-play video gaming, etc.).

As depicted in FIG. 21/22, the effects engine/rendering module 2102/trigger library 2102*a*/2202 may comprise at least one of the following a/v-element/event recognizing triggers: optical character recognition (alpha-numeric characters-meters, gauges, scores, shields, warnings, informationals, etc); end-user scripted triggers (supra, para. 175-183); developer scripted triggers (embedded cues and/or graphical adjusters); computer vision triggers (analysis of real-time events based on at least one of pixel color score, pixel velocity score, pixel proximity score, or an audio score, supra, para. 166-174).

Figure 23:
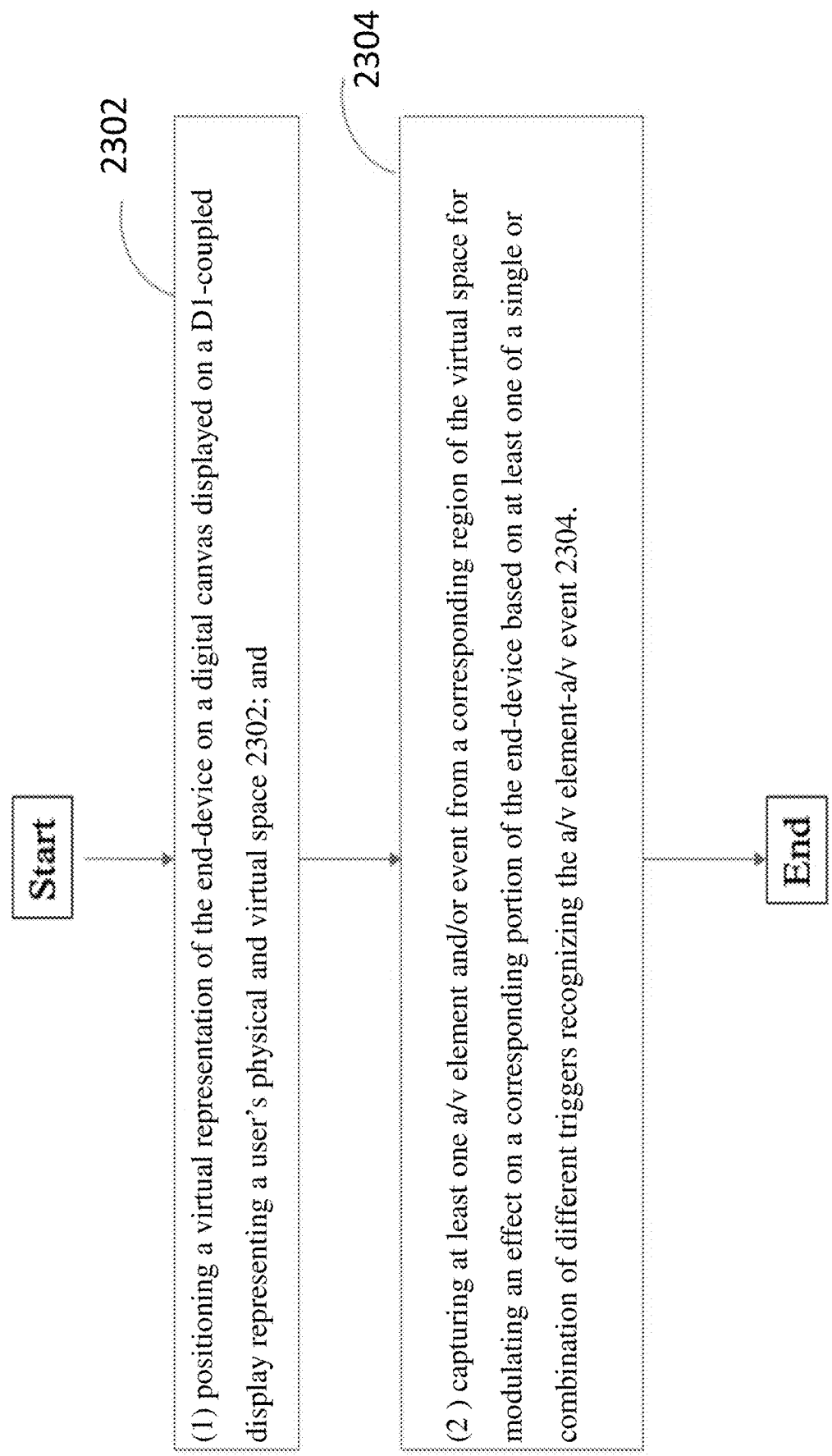
FIG. 23 is a method flow diagram in accordance with an aspect of the invention.
Figure 24:
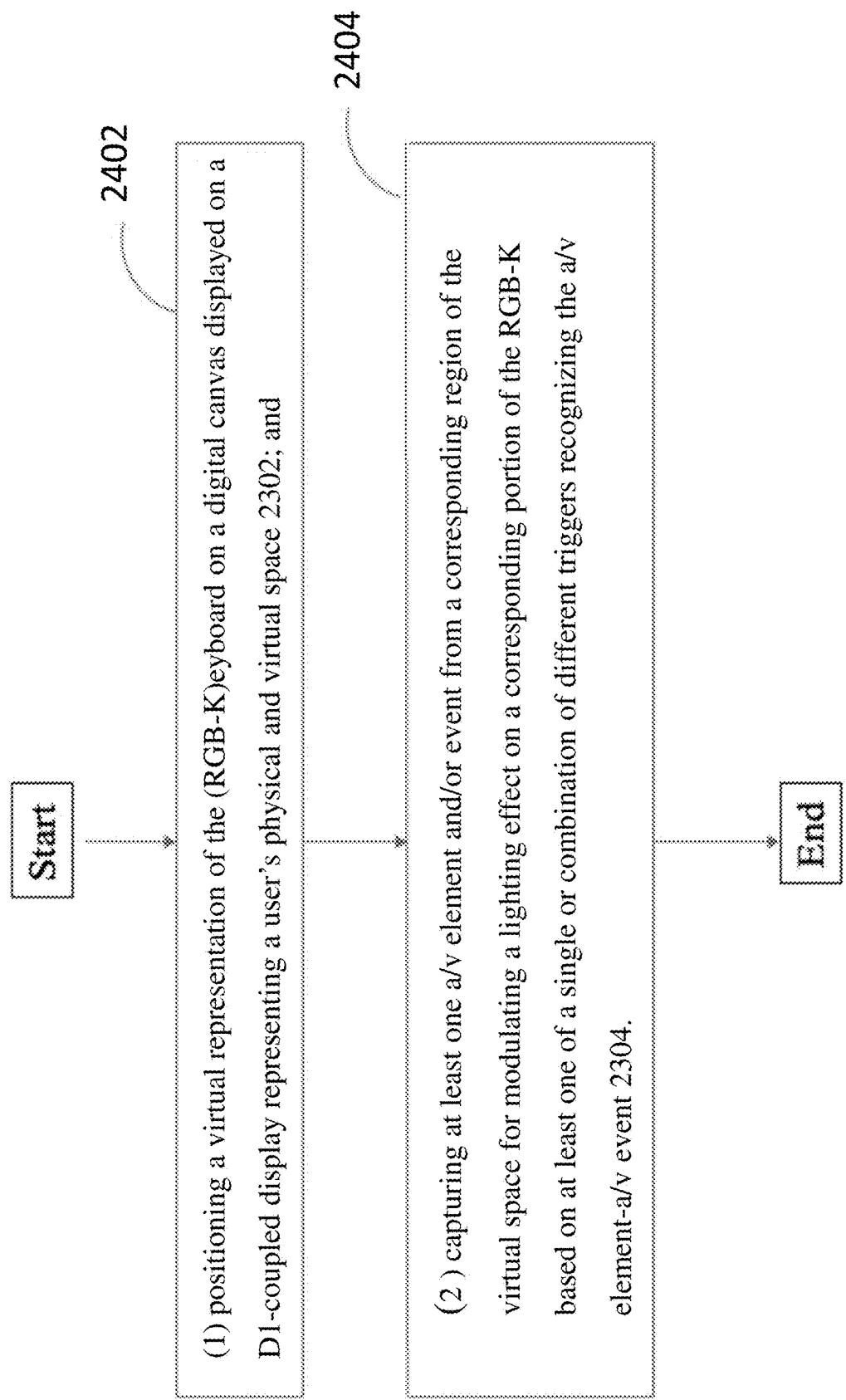
FIG. 24 is a method flow diagram in accordance with an aspect of the invention.

Now in reference to FIGS. 23 and 24—illustrating an exemplary method flow of the Hy-Fx engine. As shown in FIG. 23, the method for processing an audio/video element and/or event from an audio/video input for end-device modulation may be based on a trigger, triggers, and/or different triggers comprising the step of: (1) positioning a virtual representation of the end-device on a digital canvas displayed on a D1-coupled display representing a user's physical and virtual space 2302; and (2) capturing at least one a/v element and/or event from a corresponding region of the virtual space for modulating an effect on a corresponding portion of the end-device based on at least one of a single or combination of different triggers recognizing the a/v element-a/v event 2304.

In reference to FIG. 24, which depicts the method for processing an audio/video element from an audio/video input for light modulation of an RGB-keyboard based on at least one of a single, combination of triggers, or combination of different triggers. The method may comprise the steps of: (1) positioning a virtual representation of the RGB-keyboard on a digital canvas displayed on a D1-coupled display representing a user's physical and virtual space 2402; and (2) capturing at least one a/v element from a corresponding region of the virtual space for modulating a lighting effect on a corresponding portion of the RGB-keyboard based on at least one of a single, combination of triggers, or combination of different triggers recognizing at least one of an a/v element or a/v event.

Figure 25:
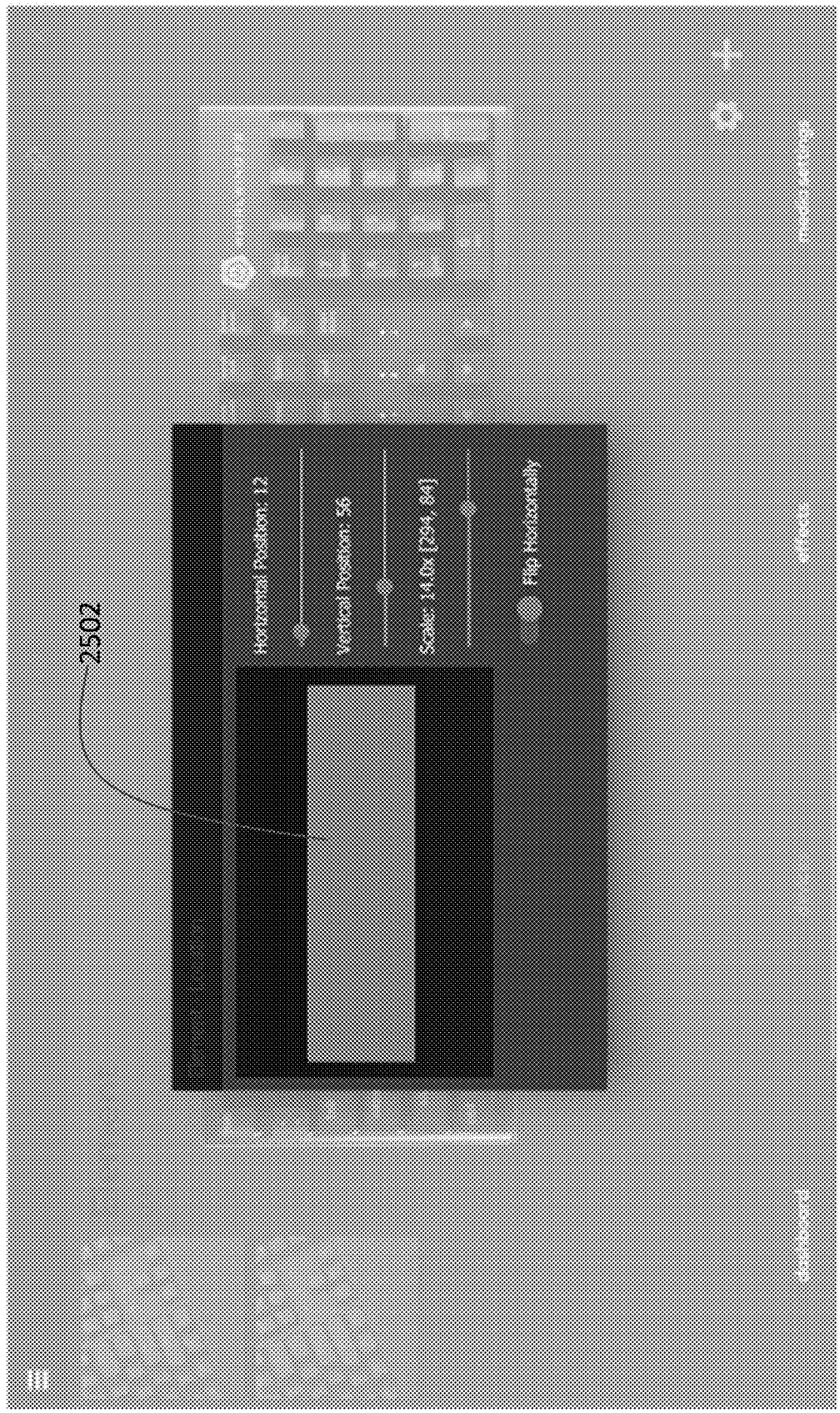
FIG. 25 is a screen-shot illustrating an exemplary layer of the hybrid-triggered effects in accordance with an aspect of the invention.

FIG. 25-31 represent screen-shots of exemplary sequence of events during a representative game-play. FIG. 25 illustrates a user being prompted to geo-position his desired end-device into the virtual space. As shown, the white rectangle 2502 (corresponding to a RGB-keyboard for the user) is positioned in the lower center of the digital canvas since the RGB-keyboard in the users physical space is positioned in a substantially lower center area in relation to the display. In the event that the right-handed user also wants to Hy-Fx activate his mouse, he would canvas-position a small square corresponding to the mouse on the right of the canvas-positioned RGB-K, and vice-versa if left-handed, rippling effects onto the RGB-K and mouse mirrored from the captured/grabbed digital canvas/screen/display.

Figure 26:
FIG. 26 is a screen-shot illustrating an exemplary layer of the hybrid-triggered effects in accordance with an aspect of the invention.

FIG. 26 represents a screen-shot of an exemplary user-end script layer for triggering end-device effects (end-user scripted effects). The end-user may load a local html file that redirects to the homepage for Whirlwind VR for content 1802 displayed adjacent to the script layer. For all intents and purposes, the method is rendering a webpage that may orchestrate or ripple any number of immersive effects on any type of end peripheral (LED strips, keyboards, game-play controllers, etc.) based on the transform/scale/content within the region grab. The web browser page may be any processing block rendering websites by processing script input and converting it to user-facing content on a local client. The script layer is plugging in custom features to this 'web browser' for handling controllable parts of the effect. For example, if you add a special tag to the html effect, it automatically ripples into the application UI and is exposed to the end-user as an option-either de novo or an enhanced add-on. For example, if the end-user inputs the following EUS:

<meta property="speed" label="Rainbow Speed" type="number" min="1" max="10" default="0">

The above EUS creates a slider control in the UI for the end-user to achieve a desired effect. Additionally, a corresponding object in JavascriptCore called 'speed' may be created, and may be subsequently queried to ascertain how fast the effect runs. Other controls that may be scripted for in the UI may be drags, drops, clicks, dials, color pickers, color wheels, switches, coordinates, text fields, or any visual depiction of effect choices to select from. The visual depictions of effect choices may be adjustable for at least one of a color, hue, effect, effect speed, threshold-based, or audio-based. The advantage with the EUS and rendering of a scripted webpage is that the end-user can create customized complex effects (with minimal coding experience) in their physical surrounding, all while created from a single file. Furthermore, the control software/system and ensuing methods does not need to be recompiled to render the effect. Lastly, the system/method can load the desired effect from a remote URL if desired, with no local script required. In one embodiment of this, a library of effects may be stored, previewed, and loaded, without the need to EUS de novo.

Figure 27:
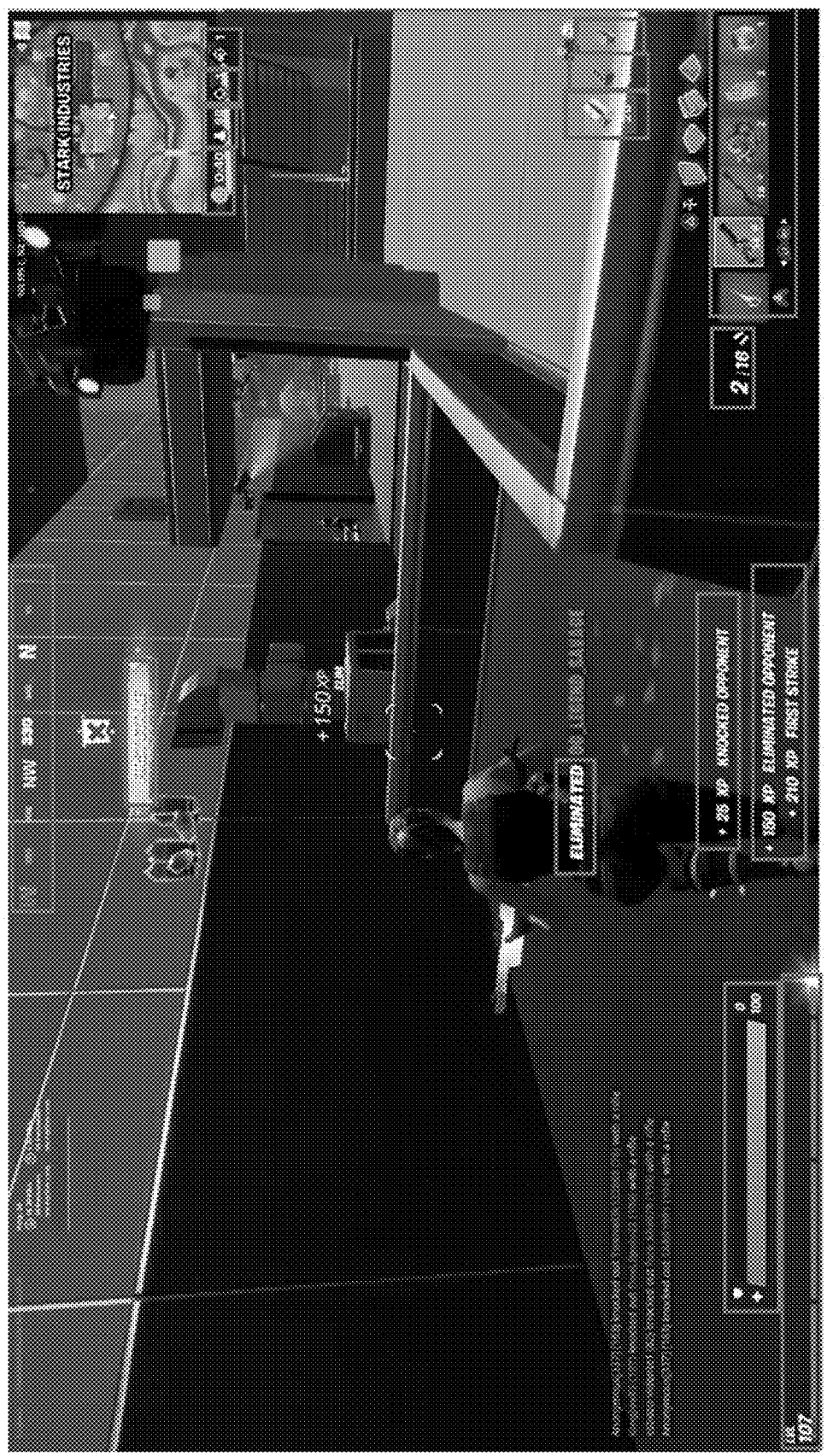
FIG. 27 is a screenshot illustrating an exemplary layer of the hybrid-triggered effects in accordance with an aspect of the invention.

FIG. 27 illustrates a screen-shot of an exemplary scene from the popular video game "Fortnite" (Epic Games). As shown, starting from the top center and working clockwise around the edge of the scene, each red box contains vital information related to the user/player. For example, the top is the compass or direction the player is facing. The next box below that is the "First Strike" pop-up that informs the player that he/she got the first kill of the match. The four boxes in the top right corner are the time until the circle perimeter closes; the number of players left in the match; the number of kills that the player has; and the number of kills the team has. The next three boxes are resources. The bottom left corner is the player's level and above that is the health and shield meters. Once a light-script developer has identified which element he/she wants to capture and what he/she wants to happen when certain thresholds are met, the developer thinks about what the experience should look like. For instance, the developer may identify a number change in a top-right corner, which typically registers/displays upon a "kill". Similarly, the developer could look for the letters/word "First Strike" and that could trigger a special golden wave effect. By using this Optical Character Recognition (OCR) trigger look-up, the light-script developer will identify the coordinates of the letters, words, meter on the screen and then use OCR to look for "First Strike" in those predictable locations.

Figure 28:
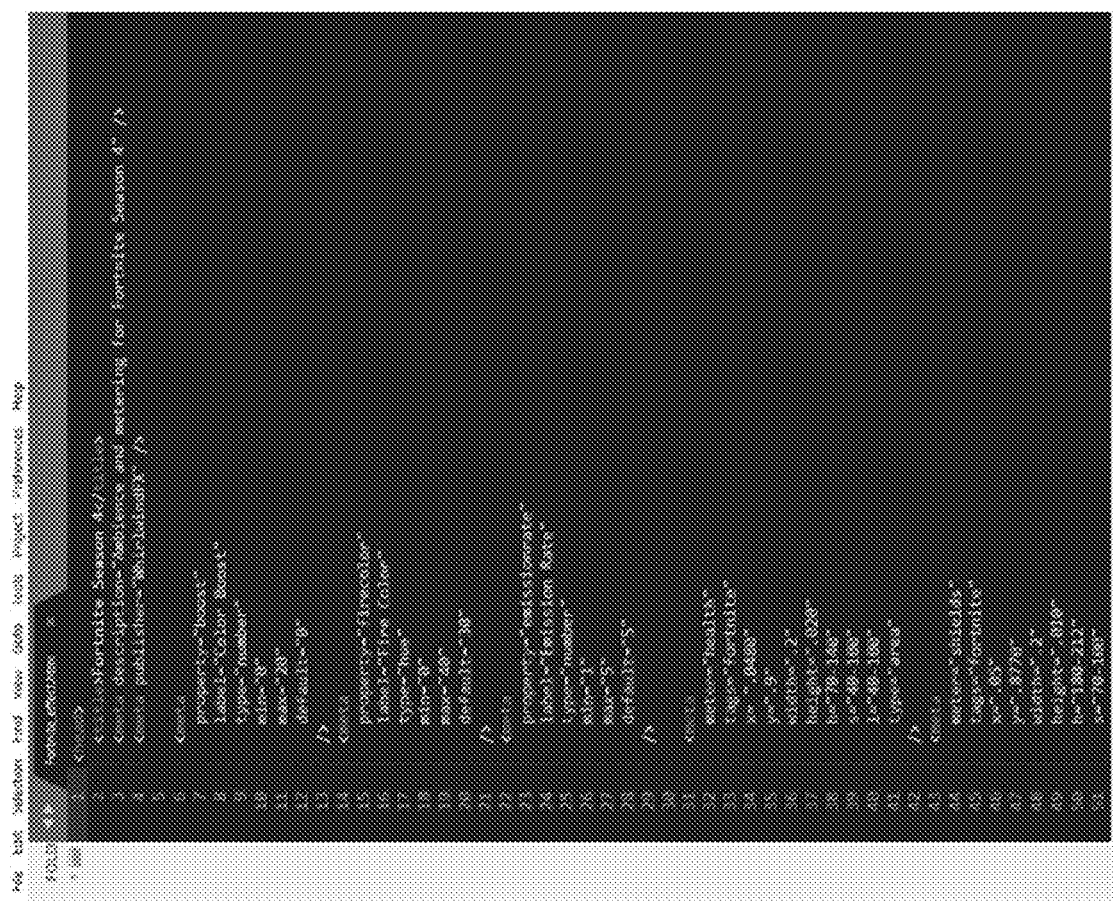
FIG. 28 is a screenshot illustrating an exemplary layer of the hybrid-triggered effects in accordance with an aspect of the invention.
Figure 29:
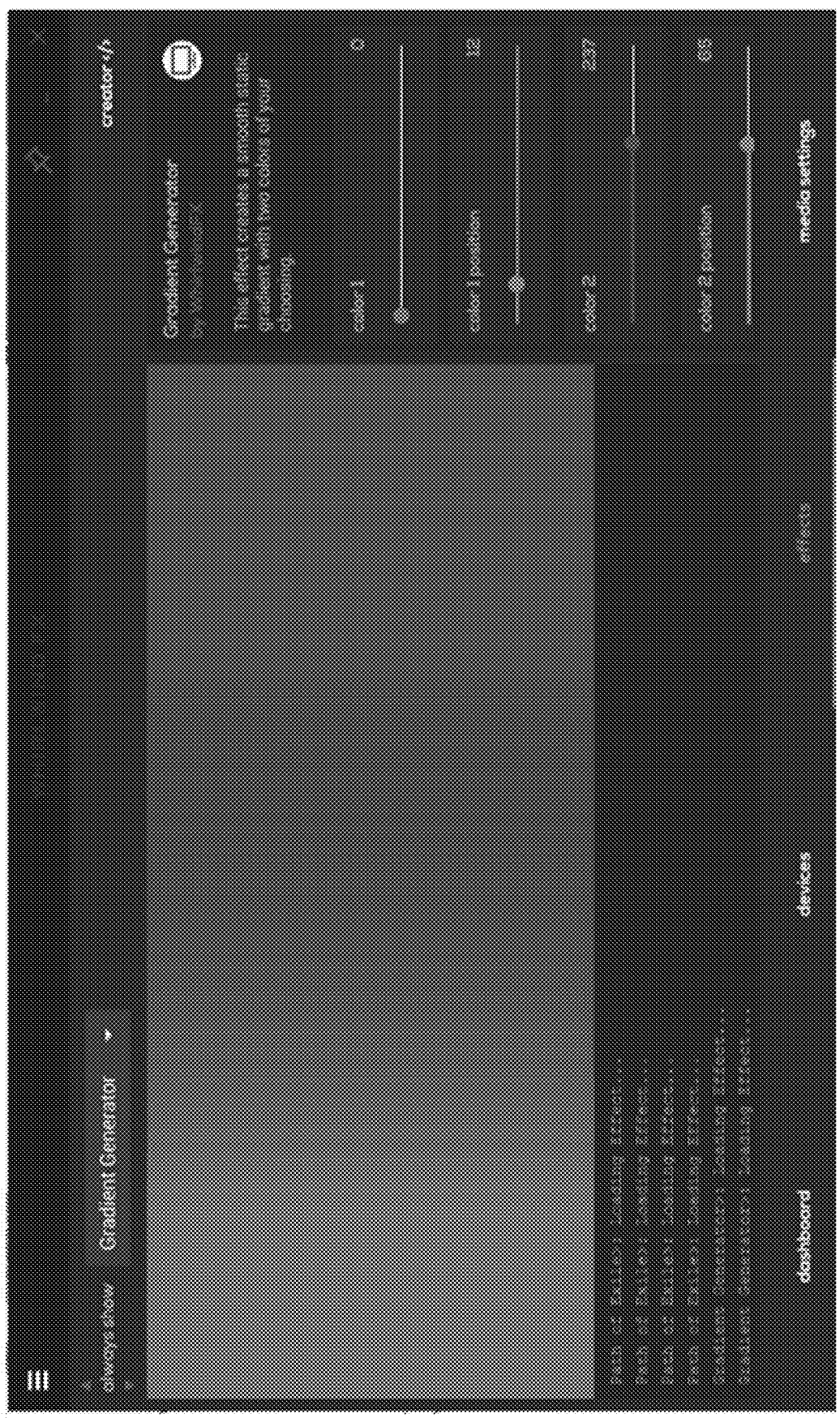
FIG. 29 is a screenshot illustrating an exemplary layer of the hybrid-triggered effects in accordance with an aspect of the invention.

Upon identifying, the developer may program the special golden wave effect in an HTML/Javascript as shown in FIG. 28 (illustration of a screen-shot of an exemplary HTML/Javascript document in accordance with an aspect of the invention). In continuing reference to FIG. 28, meta tags are evident assigning "meter/health" with a predictable position on the screen. Optionally, tags may be assigned to symbols/elements/icons representing "meter/health", or any other vital player-related info. Also evident is an HSL value or color value that we have to scrape or identify from the game in real-time (computer vision trigger). Once the values are determined, the light-script developer can code colored effects that ripple or occur on the canvas as shown in FIG. 29 (Illustrating a screen-shot of an exemplary digital canvas projection of RGB-keyboard light emission in accordance with an aspect of the invention). Those effects can be sweeps in any direction and the peripherals or end-devices automatically capture the region set on the canvas for rippling or emitting the effect-providing enhanced immersion to the player. The following list represent typical "look-up" triggers that may be combined for additional complexity and accuracy:
 a. Window title.
 b. OCR=Optical Character Recognition=reading words, letters, numbers in real time.
 c. Meter recognition=linear meters, circle meters, arc meters, segmented meters, etc.
 d. Icon recognition=placards of a static image or indicator.
 e. Audio recognition=specific sounds like footsteps, explosions, or any kind of specific audio cue.

Figure 30:
FIG. 30 is a screen-shot illustrating an exemplary layer of the hybrid-triggered effects in accordance with an aspect of the invention.
Figure 31:
FIG. 31 is a screen-shot illustrating an exemplary layer of the hybrid-triggered effects in accordance with an aspect of the invention.

The Hy-Fx approach may combine any number of triggers (developer-end "look-ups", end-user scripted, CV, etc.), in addition to the combination of the above "look-up" triggers to create the layered/complexity of effects. Additionally, the Hy-Fx approach (using a layered/combinatorial trigger approach) ensures against false positives that may normally occur under a single trigger scheme. For instance, a player roaming through a grassy field, whereby the grassy field appears on a portion of the frame co-located with a predicted frame position of a typically green health shield/meter, should not trigger an effect coded for a heath meter since the player has not changed his health meter by taking a hit or improving his health status. In addition to ensuring against false positives, the Hy-Fx approach, with the combination of triggers, adds complexity to the effects by layering effect onto another. (FIGS. 30 and 31 depict exemplary RGB keyboards rippling the complex/layered/accurate effects mirrored from the key/targeted a/v events and/or a/v elements).

Therefore, the foregoing is considered as illustrative only of the principles of the invention. Further, since numerous modifications and changes will readily be apparent to those skilled in the art, all suitable modifications and equivalents may be considered as falling within the scope of the invention.

The invention claimed is:
1. A system for end-device modulation, said system comprising:
 at least one end-device (E-D) in communication with at least a first device (D1) outputting audio/video (a/v) programming;
 a processor;
 a memory element coupled to the processor;
 a program executable by the processor to:
  provide an interface configured for end-user script input loaded onto a web-browser page, wherein the end-user script input is any one of a basic programming language, including HTML, HTML5, or Javascript (JS) for adjusting of an aspect of the immersive light effect from the at least one E-D during real-time play of a graphical content;
  render the the inputted script to an off-screen buffer and then visualize the inputted script as at least a two-dimensional effects digital canvas;
  position a virtual representation of the E-D on the digital canvas displayed on a D1-coupled display representing a user's physical and virtual space;
  apply a geo-positional transform and scaling of the virtual E-D within the digital canvas; and
  control a light effect emitted from the at least one E-D corresponding to a captured region of the transformed/scaled digital canvas based on the scripted input and a combination of different triggers recognizing at least one of an a/v element or a/v event from the a/v program, wherein the different triggers are at least one of active-play end-user scripting, computer vision score, audio score, or Optical Character Recognition.

2. The system of claim 1, wherein the E-D is a vibro-tactile or haptic device.

3. The system of claim 1, wherein the E-D is a light-emitting peripheral device (LEPD).

4. The system of claim 3, wherein the LEPD is a RGB-Keyboard.

5. The system of claim 3, wherein the LEPD is a light-emitting gaming device comprising at least one of a display/monitor, mouse, game controller, head-set, computing tower, game console, any portion and/or component of a computing tower, light-strip, bulb.

6. The system of claim 4, wherein the RGB-keyboard lighting effects triggered by at least one of the a/v element or a/v event from the program is at least one of a nova, sparkle, rain, spiral, wave, collapse, rainbow, emoji, slash, sliding strip, cascade.

7. The system of claim 1, wherein the a/v element recognized is at least one of opening packs/rewards, notifications as you fire, strike, block strikes, take damage, heal, death, health alerts, health meters, timers.

8. The system of claim 1, wherein the trigger is a computer vision analysis of an a/v event comprising at least one of a pixel color score, pixel velocity score, pixel proximity score, or audio score.

9. The system of claim 1, wherein the a/v event recognized is at least one fire, explosion, lava, lightening, freezing, taking a hit, gaining health, flying, sky diving, walking, running, falling, jumping, looking down a gun barrel, being underwater, getting into a vehicle, a flying vehicle, objects-frying pan, camp fire, launcher, special attack indicators, menus, inventory.

10. The system of claim 1, wherein the trigger is an audio score.

11. The system of claim 1, wherein the trigger is a collection of alphabet and/or numerical recognized by an Optical Character Recognition (OCR).

12. The system of claim 1, wherein the trigger is a user-end-scripted trigger corresponding to at least one of an a/v element or a/v event from the program.

13. A system for processing an audio-video element in an audio-video output for light modulation of an RGB-keyboard, said system comprising:
 the RGB-keyboard in communication with at least a first device (D1) outputting video programming;
 a processor;
 a memory element coupled to the processor;
 a program executable by the processor to:
  provide an interface configured for end-user script input loaded onto a web-browser page, wherein the end-user script input is any one of a basic programming language, including HTML, HTML5, or Javascript (JS) for adjusting an aspect of the immersive light effect from the at least one E-D during real-time play of a graphical content;
  render the inputted script to an off-screen buffer and then visualize the inputted script as at least a two-dimensional effects digital canvas;
  position a virtual representation of the RGB-keyboard on a digital canvas displayed on a D1-coupled display representing a user's physical and virtual space;
  apply a geo-positional transform and scaling of the virtual E-D within the digital canvas; and
  capture at least one a/v element from a corresponding region of the virtual space for modulating a lighting effect on a corresponding portion of the RGB-keyboard based on the scripted input and a combination of triggers recognizing the a/v element program, including active-play end-user scripting, computer vision score, audio score, or Optical Character Recognition.

14. The system of claim 13, wherein the RGB-keyboard lighting effects are at least one of a nova, sparkle, rain, spiral, wave, collapse, rainbow, emoji, slash, sliding strip, cascade.

15. The system of claim 13, wherein the a/v element recognized is at least one of 1 opening packs/rewards, notifications as you fire, strike, block strikes, take damage, heal, death, health alerts, health meters, timers.

16. The system of claim 13, wherein the trigger is a collection of alphabet and/or numerical recognized by an Optical Character Recognition (OCR).

17. A system for end-device modulation, said system comprising:
 at least one end-device (E-D) in communication with at least a first device (D1) outputting audio/video programming;
 a processor;
 a memory element coupled to the processor;
 a program executable by the processor to:
  provide an interface configured for end-user script input loaded onto a web-browser page, wherein the end-user script input is any one of a basic programming language, including HTML, HTML5, or Javascript (JS) for adjusting an aspect of the immersive light effect from the at least one E-D during real-time play of a graphical content;
  render the the inputted script to an off-screen buffer and then visualize the inputted script as at least a two-dimensional effects digital canvas;
  position a virtual representation of the E-D on the digital canvas displayed on a D1-coupled display representing a user's physical and virtual space;
  apply a geo-positional transform and scaling of the virtual E-D within the digital canvas; and
  modulate an effect on a corresponding portion of the canvas-positioned E-D based on the scripted input and a combination of active-play end-user scripting and at least one different type of triggering a/v event program, including computer vision score, audio score, or Optical Character Recognition.

18. The system of claim 17, wherein the E-D is a vibro-tactile or haptic device.

19. The system of claim 17, wherein the E-D is a light-emitting peripheral device (LEPD).

20. The system of claim 19, wherein the LEPD is a RGB-Keyboard.

21. The system of claim 19, wherein the LEPD is a light-emitting gaming device comprising at least one of a display/monitor, mouse, game controller, head-set, computing tower, game console, any portion and/or component of a computing tower, light-strip, bulb.

22. The system of claim 20, wherein the RGB-keyboard lighting effects triggered by the a/v event from the program is at least one of a nova, sparkle, rain, spiral, wave, collapse, rainbow, emoji, slash, sliding strip, cascade.

23. The system of claim 17, wherein the trigger is a computer vision analysis of an a/v event comprising at least one of a pixel color score, pixel velocity score, pixel proximity score, or audio score.

24. The system of claim 17, wherein the a/v event recognized is at least one of a fire, explosion, lava, lightening, freezing, taking a hit, gaining health, flying, sky diving, walking, running, falling, jumping, looking down a gun barrel, being underwater, getting into a vehicle, a flying vehicle, objects—frying pan, camp fire, launcher, special attack indicators, menus, inventory.

25. The system of claim 17, wherein the trigger is an audio score of a certain threshold or range.

* * * * *